(«12») United States Patent
Rabenko et al.

(10) Patent No.: US 7,961,712 B2
(45) Date of Patent: Jun. 14, 2011

(54) SYSTEM AND METHOD FOR SUPPORTING MULTIPLE VOICE CHANNELS

(75) Inventors: Theodore F. Rabenko, Duluth, GA (US); Matthew J. Fischer, Mountain View, CA (US); Robert M. Lukas, Burnaby (CA)

(73) Assignee: Broadcom Corporation, Irvine, CA (US)

( * ) Notice: Subject to any disclaimer, the term of this patent is extended or adjusted under 35 U.S.C. 154(b) by 1049 days.

(21) Appl. No.: 09/851,722

(22) Filed: May 8, 2001

(65) Prior Publication Data

US 2002/0006137 A1 Jan. 17, 2002

Related U.S. Application Data

(60) Provisional application No. 60/203,057, filed on May 8, 2000, provisional application No. 60/214,932, filed on Jun. 29, 2000.

(51) Int. Cl.
*H04L 12/56* (2006.01)

(52) U.S. Cl. ......................... 370/352; 370/392; 370/466

(58) Field of Classification Search .................. 370/352, 370/389, 392, 401, 431, 432, 462–466, 471, 370/475, 402, 485, 467; 709/203, 225, 217–219, 709/238, 245; 725/74–82
See application file for complete search history.

(56) References Cited

U.S. PATENT DOCUMENTS

| | | | | |
|---|---|---|---|---|
| 6,507,647 B1 * | 1/2003 | Mandalia | ....................... | 379/219 |
| 6,526,581 B1 * | 2/2003 | Edson | ............................. | 725/74 |
| 6,563,816 B1 * | 5/2003 | Nodoushani et al. | ......... | 370/352 |
| 6,584,096 B1 * | 6/2003 | Allan | ............................. | 370/352 |
| 6,661,785 B1 * | 12/2003 | Zhang et al. | ................... | 370/352 |
| 6,711,138 B1 * | 3/2004 | Pai et al. | ........................ | 370/257 |
| 6,731,627 B1 * | 5/2004 | Gupta et al. | .................. | 370/352 |
| 6,732,315 B2 * | 5/2004 | Yagil et al. | .................... | 714/755 |
| 6,747,996 B2 * | 6/2004 | Holloway et al. | ............. | 370/503 |
| 6,868,072 B1 * | 3/2005 | Lin et al. | ....................... | 370/276 |
| 6,889,385 B1 * | 5/2005 | Rakib et al. | ................... | 725/119 |
| 6,904,037 B2 * | 6/2005 | Oran et al. | .................... | 370/352 |
| 6,912,209 B1 * | 6/2005 | Thi et al. | ....................... | 370/286 |

(Continued)

FOREIGN PATENT DOCUMENTS

WO    WO 00/62522    10/2000

(Continued)

OTHER PUBLICATIONS

Minassian, G., "Home Phone Line Networks: The Next Networking Challenge," Electronic Product Design, GB, XP000981685, Nov. 1998, 4 pages, vol. 19, No. 11.

(Continued)

*Primary Examiner* — William Trost, IV
*Assistant Examiner* — Roberta A Shand
(74) *Attorney, Agent, or Firm* — Sterne, Kessler, Goldstein & Fox P.L.L.C.

(57) ABSTRACT

A communications system is configured with a plurality of media terminal adapters, a telephone line, and a gateway configured to exchange voice and data packets between a network and each of the media terminal adapters over the telephone line. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

18 Claims, 24 Drawing Sheets

U.S. PATENT DOCUMENTS

| | | | |
|---|---|---|---|
| 6,954,454 B1* | 10/2005 | Schuster et al. | 370/352 |
| 7,007,296 B2* | 2/2006 | Rakib | 725/111 |
| 7,035,270 B2* | 4/2006 | Moore et al. | 370/401 |
| 7,068,668 B2* | 6/2006 | Feuer | 370/401 |
| 7,149,474 B1* | 12/2006 | Mikhak | 455/41.2 |
| 7,164,694 B1* | 1/2007 | Nodoushani et al. | 370/467 |
| 2001/0030950 A1* | 10/2001 | Chen et al. | 370/329 |
| 2001/0055311 A1* | 12/2001 | Trachewsky et al. | 370/445 |
| 2002/0037004 A1* | 3/2002 | Bossemeyer et al. | 370/356 |
| 2003/0005450 A1* | 1/2003 | Smith | 725/78 |
| 2003/0192053 A1* | 10/2003 | Sheppard et al. | 725/81 |

FOREIGN PATENT DOCUMENTS

WO      WO 01/86914 A2     11/2001

OTHER PUBLICATIONS

Waring, et al., "A Newly Emerging Customer Premises Paradigm for Delivery of Network-Based Services," XP004304491, Computer Networks, NL, Feb. 1999, vol. 31 No. 4), pp. 411-424.

Huitema, et al., "An Architecture for Residential Internet Telephony Service," IEEE Network, US, May/Jun. 1999, vol. 13, No. 3, pp. 50-56.

\* cited by examiner

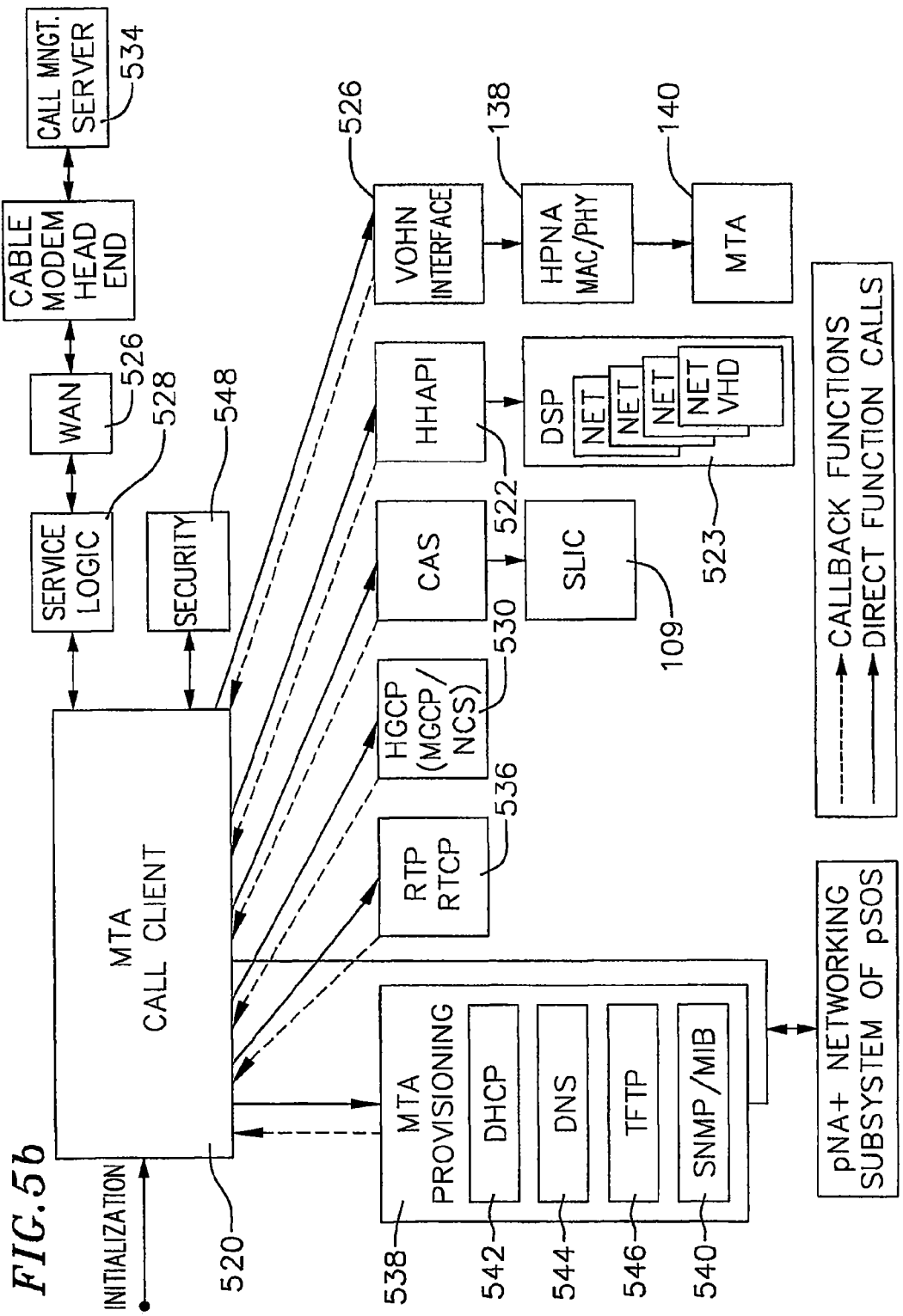

FIG.5f

| CALL STATE | PROXY GATEWAY | MEDIA ADAPTER |
|---|---|---|
| IDLE | CAS: LCF → | |
| | | ← CAS: LO (ONHOOK) |
| OFFHOOK | | ← CAS: LC (OFFHOOK) |
| DIALTONE | CAS: LCF →<br>CPTONE: DIALTONE | |
| DIALING | | ← CAS: LC<br>DIGIT: ON |
| | CAS: LCF →<br>CPTONE: OFF | |
| | | ← CAS: LC<br>DIGIT: OFF |
| | | ← CAS: LC<br>DIGIT: ON |
| | | ← CAS: LC<br>DIGIT: OFF |
| WAITING | CAS: LCF →<br>CPTONE: RINGBACK | |
| REMOTE ANSWER | CAS: LCF →<br>CPTONE: OFF<br>MODE: G729A | |
| TALK | CAS: LCF ←→<br>MODE: G729A<br>VOICE: G729A | CAS: LC<br>VOICE: G729A |
| | | |

SYSTEM AND METHOD FOR SUPPORTING MULTIPLE VOICE CHANNELS

CROSS-REFERENCE TO RELATED APPLICATION(S)

The present application claims priority to provisional Application No. 60/203,057, filed May 8, 2000, and provisional Application No. 60/214,932 filed on Jun. 29, 2000, under 35 U.S.C. §119. These applications are expressly incorporated herein by referenced as though fully set forth in full.

FIELD

The present invention relates generally to telecommunications systems, and more particularly, to telecommunications systems supporting voice and data services on a shared medium.

BACKGROUND

Subscribers today are demanding additional capability of their telephone service. An outcome of this demand is that the telephone service providers must install additional lines in the home to support this demand. The challenge faced by the providers is that the existing home wiring is limited in many cases to a single wire pair. This means that additional wire pairs must be pulled through walls in the home to add the requested new service. The wire installation procedure is both expensive for the service provider and disruptive for the subscriber because drywall must be cut and potentially repaired in the home.

SUMMARY

In one aspect of the present invention, a communications system includes a plurality of media terminal adapters, a telephone line, and a gateway configured to exchange voice and data packets between a network and each of the media terminal adapters over the telephone line.

In another aspect of the present invention, a method of communication includes, comprising exchanging voice and data packets between a network and a plurality of media adapter terminals coupled to a telephone line.

It is understood that other embodiments of the present invention will become readily apparent to those skilled in the art from the following detailed description, wherein it is shown and described only embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

FIG. 5b is a block diagram of an exemplary architecture for interfacing a voice and data processor with a MIPS core processor in a residential gateway;

FIG. 5f is a table illustrating an exemplary call flow for an outgoing call origination;

DETAILED DESCRIPTION

An exemplary embodiment of a telecommunications system is directed to techniques and systems to support telephony and other services in the home using existing wire pairs already installed in the home. The exemplary telecommunications system may be implemented in numerous ways depending on the specific application, the overall design constraints imposed on the system, and other relevant factors. Moreover, those skilled in the art will appreciate that the techniques and systems disclosed herein for supporting telephony and other services in the home are applicable to a wide variety of telecommunications networks.

Figure 1A:
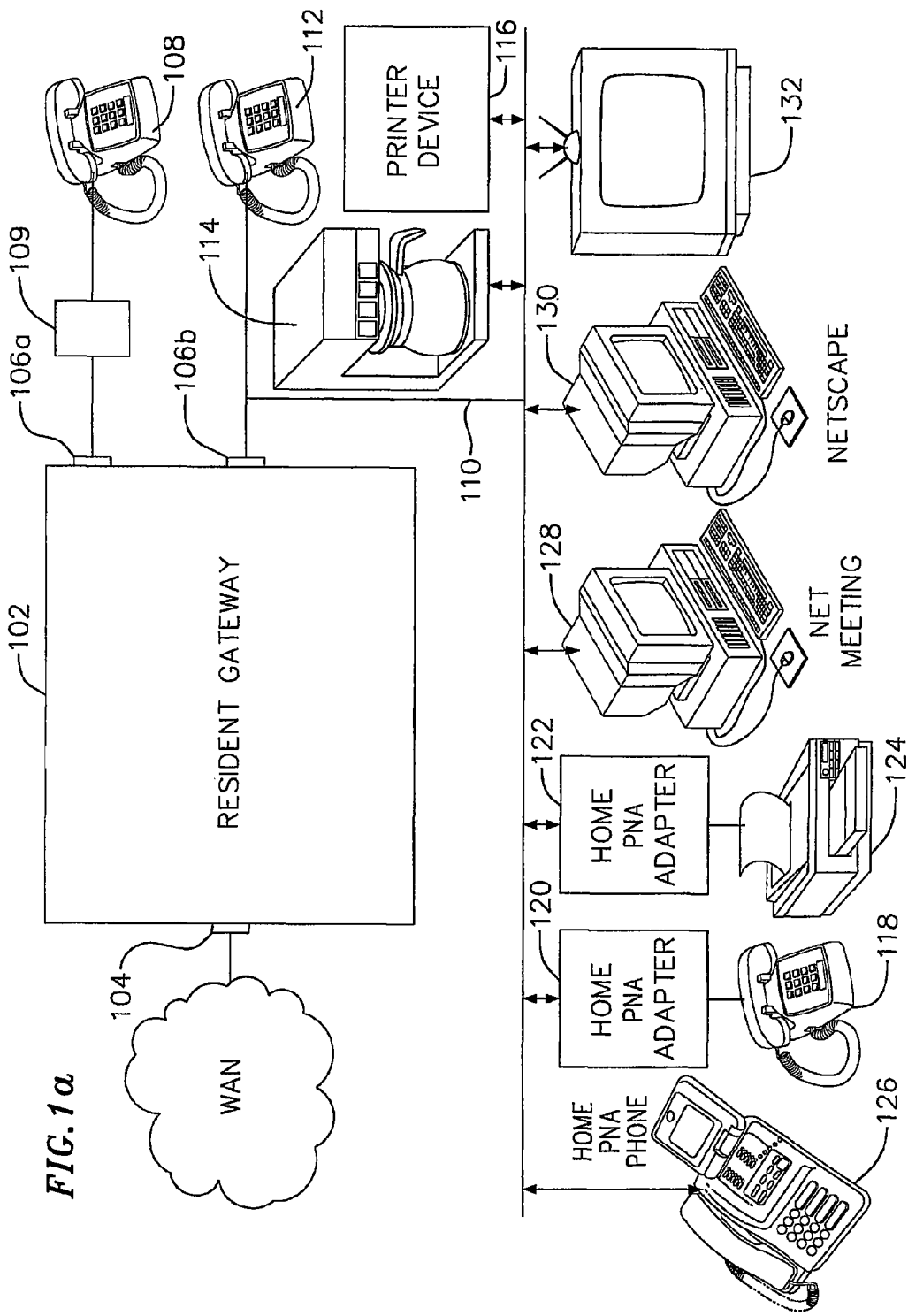
FIG. 1a is a system block diagram of an exemplary in home telecommunications system.

FIG. 1a is a block diagram of an exemplary telecommunications system for home applications. A residential gateway 102 may be installed at a location inside or outside the home. The residential gateway 102 can be a multi-port communications device. By way of example, one port 104 can provide a network pipe to communicate with a WAN (Wide Area Network), such as an IP (Internet Protocol) network that is capable of delivering IP services to the home. The residential gateway 102 can also have any number of subscriber ports to support in home telephony and services. In the described exemplary embodiment, two subscriber ports 106a and 106b are shown. The first subscriber port 106a is used to deliver POTS (Plain Old Telephone Service) to a conventional telephone 108 via a SLIC (Subscriber Line Interface Circuit) 109. The SLIC performs a voltage level conversion delivering the voltage levels required by the POTS telephone 108. An exemplary voice signal processor is disclosed U.S. patent application Ser. No. 09/579,932, entitled "SLIC Architecture and Interfaces," the contents of which is hereby incorporated by reference as though fully set forth herein. The second subscriber port 106b provides an interface to a LAN (Local Area Network) 110 in the home. The LAN can be the existing wire pairs in home that previously delivered POTS. The exact number of subscriber ports supported by the residential gateway 102 may vary depending upon the particular application, overall design constraints, or other relevant factors.

The exemplary residential gateway 102 provides a mechanism to convert the physical media and protocols used for the IP network to the physical media and protocols used on the home wire pairs. In the described exemplary embodiment, a DOCSIS (Data Over Cable Service Interface Specification) network is used for delivery of broadband services, such as IP services over the IP network (an HFC network), to the network port 104. A residential gateway 102 with a cable modem can be used to perform this function. Alternatively, the residential gateway 102 can include a fiber optics link, a DSL (Digital Subscriber Line) link, a PSTN (Public Switched Telephone Network) link, a fixed wireless link, or any other residential gateway known in the art. Moreover, the residential gateway 102 can be implemented with multiple network ports to support various combinations of network links.

In the exemplary residential gateway, a cable modem is used as described by the CableLabs DOCSIS specification except that the telephony and services delivered to the subscriber port 106b are not limited to Ethernet, but rather can support any physical media and protocol compatible with the specific in home LAN. In the described exemplary embodiment, the residential gateway 102 supports two protocols at the subscriber ports 106a and 106b. The first protocol is a baseband protocol to deliver POTS to the conventional telephone 108 via the first subscriber port 106a. This protocol is described by Bellcore (now Telcordia) in TR-NWT-000057, the contents of which is expressly incorporated herein by reference as though set forth in full. To this end, the exemplary residential gateway 102 may include high voltage circuits and processing elements to convert packetized voice delivered over IP network to the continuous analog voltages used for POTS. The second protocol is HomePNA (Home Phoneline Network Alliance) to deliver telephony and services over the LAN 110 via the second subscriber port 106b, and is described in the HomePNA Specification Version 2.0, the contents of which is expressly incorporated herein by reference as though set forth in full.

In the described exemplary embodiment utilizing a residential gateway 102 with a cable modem for delivery of telephony and services to a HomePNA LAN 110, the cable modem functions as a proxy for the voice over HomePNA devices connected to the LAN 110. The cable modem proxy can perform an interface conversion function at two levels, the first is a transport packet conversion and the second is the signaling protocol conversion.

In addition to the convention POTS telephone 108 coupled to the first subscriber port 106b of the residential gateway 102, a second conventional POTS telephone 112 can be coupled to the LAN 110 via the second subscriber port 106b. The residential gateway 102 could further be configured to bridge additional POTS telephones on the single wire pair. In this configuration, these bridged phones will behave as a bridged phone on a traditional POTS line. All bridged telephones are assigned to the same phone number and the ring/dial tone behavior is as described in TR-NWT-000057.

In the described exemplary embodiment, the HomePNA LAN 110 is configured to support a number of telephony and network devices. In addition to the conventional POTS telephone 112, a home appliance 114, such as a coffee maker, is shown attached to the HomePNA LAN 110. The concept here is to allow home appliance controllers on the HomePNA LAN 110 to access and control connected devices. By way of example, a personal computer connected to the HomePNA LAN might control the start time for the coffee maker.

Also shown connected to the HomePNA LAN is a printer device 116. This can be any type of computer peripheral that permits resource sharing from any one of multiple personal computers or other control devices connected to the HomePNA LAN.

An additional POTS telephone 118 can be connected to the HomePNA LAN via a HomePNA adaptor 120. The HomePNA adapter 120 communicates over the HomePNA LAN 110 to the HomePNA proxy function that resides within the residential gateway 102. A second HomePNA adapter 122 can be used to support a conventional facsimile machine 124. The facsimile machine 124 is a standard POTS device that could be used to receive service on the POTS connections via the first subscriber port 106a, or alternatively replace the POTS telephone 108 connected directly to the HomePNA LAN 110. In the described exemplary embodiment shown in FIG. 1a, the HomePNA adapters 118 and 120 provide two additional phone numbers that are different from the phone numbers assigned to the two POTS lines connected to the subscriber ports 106a and 106b of the residential gateway 102.

A HomePNA telephone 126 may also be connected directly to the HomePNA LAN 110. The HomePNA telephone is a device that integrates the function of the HomePNA adapter and the telephone. This HomePNA telephone 126 may look and work just like any conventional POTS telephone, the difference is that it uses an HomePNA interface to accomplish the voice transport and signaling functions instead of a POTS interface.

The connection of four telephones and one facsimile machine shown in FIG. 1a allows these devices to be connected with up to five independent telephone numbers. These five phone numbers can be supported using only two wire pairs. Using traditional POTS interfaces, five phone numbers requires five wire pairs. The four telephone and one facsimile connections are shown for ease of description only. Those skilled in the art will appreciate that various embodiments can be used to support any number of telephone and facsimile machines within the home.

In the described exemplary embodiment, two personal computers 128 and 130 are connected to the HomePNA LAN 110. One personal computer 128 is described as Net Meeting and the other personal computer 130 is described as Netscape. These describe two possible applications that are supported by personal computers connected to networks, in this case an HomePNA LAN. Those skilled in the art will appreciate that any computer application can be substituted or added.

The last item shown connected to the HomePNA LAN 110 is a television 132. This can be used to display television programming streamed from the external IP network or spooled from memory systems of an attached video server. This video server could be a dedicated device for this purpose or specialized programming on one of the attached personal computers.

Figure 1B:
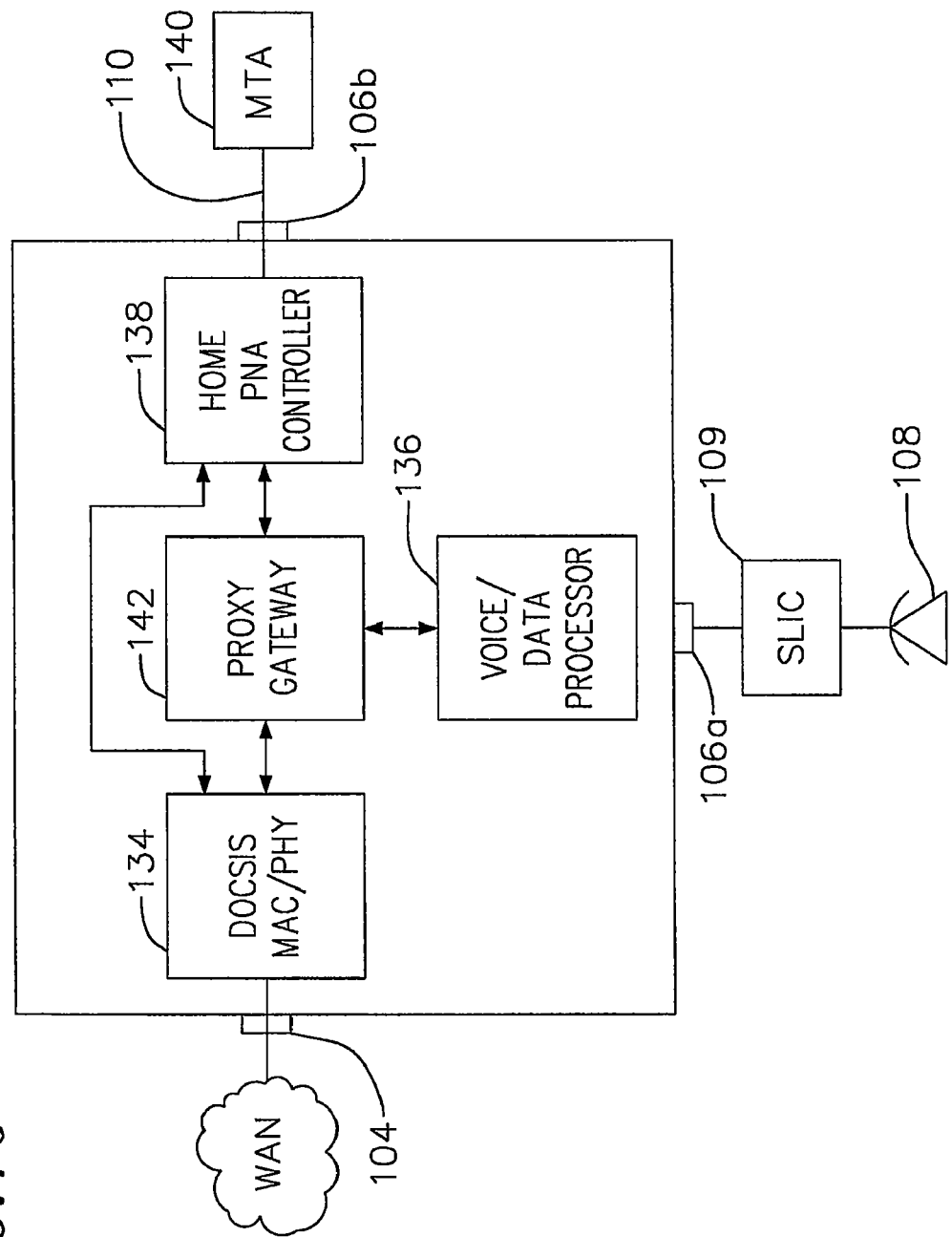
FIG. 1b is a system block diagram of the exemplary in home telecommunications system of FIG. 1 illustrating an exemplary signal flow path in a residential gateway.

FIG. 1b is an exemplary functional block diagram that describes the flow of packets in the residential gateway described in connection with FIG. 1b. A DOCSIS MAC/PHY 134 provides an interface to the WAN within the residential gateway 102. All packets that arrive to or leave from the residential gateway via the WAN must go through the DOCSIS MAC/PHY 134. The DOCSIS MAC/PHY 134 translates the packet format from DOCSIS to an internal format that, at least in some embodiments, is protocol independent.

In the downstream direction, the DOCSIS MAC/PHY 134 determines whether the packet payload is voice or data. If the packet payload is data, then the DOCSIS MAC/PHY 134 routes the packet directly to a HomePNA controller 138. The HomePNA controller 138 translates the data packet to a HomePNA packet and transmits the HomePNA packet to a media terminal adapter (MTA) 140 over the HomePNA LAN 110. The MTA 140 represents any HomePNA device shown connected to the HomePNA LAN in FIG. 1a. Conversely, if the DOCSIS MAC/PHY 134 determines that the packet payload is voice, the packet is routed to a proxy gateway 142 to be processed in a manner to be described in greater detail below. The proxy gateway 142 further determines whether the packet is destined for the HomePNA LAN 110 or the POTS telephone 108. If the packet is destined for the POTS telephone, the packet is routed to a voice and data processor 136 for decompression and depacketization in a manner to be described in greater detail below. The voice and data processor 136 generates an analog voice signal from the decompressed signal and delivers the analog voice signal to the POTS telephone 108 via the SLIC 109. If the proxy gateway 142 determines that the packet is destined for the HomePNA LAN 110, then the processed packet is routed to the HomePNA controller 138 for conversion to a HomePNA format for transmission to the MTA 140 over the HomePNA LAN 110.

In the upstream direction, the HomePNA controller 138 receives packets from the MTA 140 over the HomePNA LAN 110. The HomePNA controller 138 converts the HomePNA packet to a internal format which, in at least some embodiments, is protocol independent. The HomePNA controller 138 further determines whether packet payload contains voice or data. If the packet payload contains data, the packet is routed directly to the DOCSIS MAC/PHY 134 where it is converted to a packet format suitable for transmission on the WAN, such as VoIP. Conversely, if the packet payload is voice, the HomePNA controller 138 transmits the packet to the proxy gateway 142 for processing in a manner to be described in greater detail later. The proxy gateway 142 determines whether the voice packet is destined for the WAN or the POTS telephone 108. If the processed packet is destined for the POTS telephone 108, the packet is routed to the voice and data processor 36 for depacketization, decompression and digital-to-analog conversion. The analog voice signal is then routed from the voice and data processor 136 to the POTS telephone 108 via the SLIC. If the processed packet is destined for the WAN, it is routed to the DOCSIS MAC/PHY 134. The DOCSIS MAC/PHY 134 converts the packet to a format suitable for transmission on the WAN.

Analog voice signals from the POTS telephone 108 are transmitted to the voice and data processor 136 via the SLIC 109. The voice and data processor 136 samples the analog voice signal, compresses the voice signals and packetizes the compressed voice into the internal packet format. The voice packets from the voice and data processor 136 are coupled to the proxy gateway 142 for processing. The proxy gateway 142 further determines whether the voice packet is destined for the MTA 140 or the WAN. If the voice packet is destined for the WAN, it is routed to the DOCSIS MAC/PHY 134 for conversion to a format suitable for transmission over the WAN. Conversely, if the voice packet is destined for the MTA 140, it is routed to the HomePNA controller 138 for conversion to a HomePNA format for transmission over the HomePNA LAN 110 to the MTA 140.

1. Residential Gateway
1.1 Overview

Figure 2:
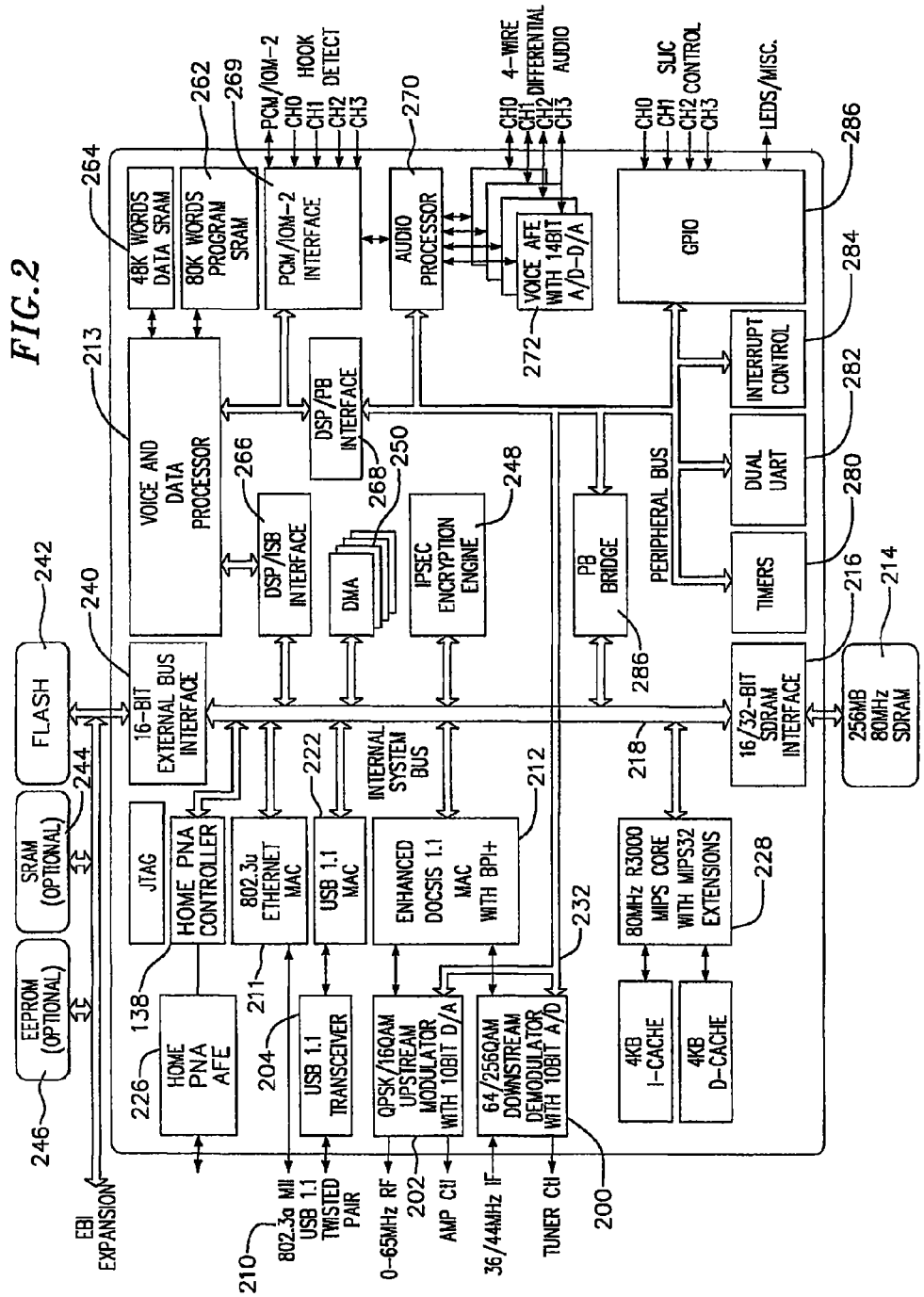
FIG. 2 is a system block diagram of an exemplary residential gateway.

An exemplary embodiment of the residential gateway is shown schematically in FIG. 2. The described exemplary embodiment may provide a highly integrated solution implemented in a single chip that is compliant with the Data Over Cable Service Interface Specification (DOCSIS). DOCSIS was developed to ensure that cable modem equipment built by a variety of manufacturers is compatible, as is the case with traditional dial-up modems. The described exemplary embodiment can provide integrated functions for communicating with a cable head (not shown) end via the network port 104. By way of example, a QPSK upstream modulator 202 is configured to transmit data to the cable head end, and a QAM downstream demodulator 200 is configured to receive data from the cable head end, and a QPSK out of band downstream demodulator 206 is configured to receive out of band MPEG-2 encoded messages from the cable head end.

In addition, the described exemplary embodiment can support multiple inputs in accordance with a variety of protocols. For example, a universal serial bus transceiver 204 can provide transparent bi-directional IP traffic between devices operating on a USB such as for example a PC (personal computer) workstation, server printer or other similar devices (not shown). Additionally, an I.EEE 802.3 compliant media independent interface (MII) 210 in conjunction with an Ethernet MAC 211 can also provide bi-directional data exchange between devices such as, for example a number of PCs and/or Ethernet phones (not shown).

In the exemplary embodiment residential gateway, the QAM downstream demodulator 200 may utilize either 64 QAM or 256 QAM in the 54 to 860 MHz bandwidth to interface with the cable modem head end. The QAM downstream demodulator 200 is configured to accept an analog signal centered at the standard television IF frequencies, and amplify and digitize the signal with an integrated programmable gain amplifier and A/D converter (not shown). The digitized signal is demodulated with a recovered clock. Matched filters (not shown) followed by adaptive filters (not shown) can be used to remove multi-path propagation effects and narrowband co-channel interference. Soft decisions can then be passed off to an ITU-T J.83 Annex A/B/C compatible decoder (not shown). The integrated decoder performs error correction and forwards the processed received data, in either parallel or serial MPEG-2 format to a DOCSIS Media Access Controller (MAC) 212.

The DOCSIS MAC 212 may include baseline privacy encryption and decryption as well as robust frame acquisition and multiplexing with MPEG2-TS compliant video and audio streams. The DOCSIS MAC 212 implements the downstream portions of the DOCSIS protocol. The DOCSIS MAC 212 extracts DOCSIS MAC frames from MPEG-2 frames, processes MAC headers, and filters and processes messages and data.

Downstream data packets and message packets may be then placed in system memory 214 by a SDRAM interface 216 via an internal system bus 218. The SDRAM interface 216 may interface to a number of off the shelf SDRAMs which are provided to support the high bandwidth requirements of the Ethernet MAC 211 and other peripherals. In the described exemplary embodiment, the SDRAM interface 216 may support multiple combinations of 8, 16 or 32 bit wide SDRAMs, allowing for external data storage in the range of about 2 to 32 MBytes. The DOCSIS MAC 212 may include a number of direct memory access (DMA) channels for fast data access to and from the system memory 214 via the internal system bus 218.

The DOCSIS MAC 212 can also implement the upstream portions of the DOCSIS protocol before transmission by the upstream modulator 202. The DOCSIS MAC 212 receives data from system memory 214 via a DMA channel, requests bandwidth and frames the data for TDMA with other modems on the same upstream frequency.

The upstream modulator 202 provides an interface with the cable head end. The upstream modulator 202 may be configured to operate with numerous modulation schemes including for example, QPSK and 16-QAM. In the described exemplary embodiment, the upstream modulator 202 supports bursts or continuous data, provides forward error correction (FEC) encoding and pre-equalization, filters and modulates the data stream and provides a direct 0-65 MHz analog output.

The DOCSIS MAC 212 interfaces with a processor, such as a MIPS core 228, via the ISB 218. An exemplary embodiment of the MIPS core 128 includes a high performance CPU operating at a speed of at least 80 MHz with 32-bit address and data paths. The MIPS core 228 may include two way set associative instruction and data caches on the order of about 4K bytes each. Further, the MIPS core 228 may provide standard EJTAG support with debug mode, run control, single step and software breakpoint instruction as well as additional optional EJTAG features.

The MIPS core 228 controls the upstream modulator 202 and the downstream demodulator 200 via a serial interface that is compatible with a subset of the Motorola M-Bus and the Philips I²C bus. The interface consists of two signals, serial data (SDA) and serial clock (SCL), which may control a plurality of devices on a common bus. The addressing of the different devices may be accomplished in accordance with an established protocol on the two wire interface.

The described exemplary embodiment of the residential gateway includes the full-speed universal serial bus (USB) transceiver 204 and a USB MAC 222 that is compliant with the USB 1.1 specification. The USB MAC 222 and USB transceiver 204 provide two way communication of information to a device operating on a USB, such as for example a PC on a USB 1.1 compliant twisted pair. In the described exemplary embodiment, the USB MAC 222 provides concurrent operation of control, bulk, isochronous and interrupt endpoints. The USB MAC 222 may also support standard USB commands as well as class/vendor specific commands. The USB MAC 222 includes integrated RAM that allows flexible configuration of the device. The USB MAC 222 can be arranged for hardware fragmentation of higher layer packets from USB packets with automatic generation and detection of zero length USB packets.

The USB MAC 222 may include DMA channels which are used to communicate received data to the system memory 214 via the ISB 218. Data stored in system memory 214 may then be processed and communicated to the cable modem head end (not shown) via the DOCSIS MAC 212 and the upstream modulator 202. Similarly data received from the cable modem head end and processed by the downstream demodulator 200 and stored in system memory 214 as higher layer packets can be retrieved by the USB MAC 222 via the ISB 218 and assembled into USB packets with automatic generation of zero length USB packets. USB packets may then be communicated to the external device operating on the USB via the USB transceiver 204.

In the described exemplary embodiment, the media independent interface (MII) 210 and Ethernet MAC 211 provide bidirectional communication with devices, such as, for example a personal computer (PC) operating on an Ethernet. The media independent interface 210 forwards data to and receives information from the Ethernet MAC 211. The Ethernet MAC 211 can also perform all the physical layer interface (PHY) functions for 100BASE-TX full duplex or half-duplex Ethernet as well as 10BBASE-T full or half duplex. The Ethernet MAC 211 may also decode the received data in accordance with a variety of standards such as for example 4B5b, MLT3, and Manchester decoding. The Ethernet MAC 211 can perform clock and data recovery, stream cipher descrambling, and digital adaptive equalization. The Ethernet MAC 211 may include DMA channels which are used for fast data communication of processed data to the system memory 214 via the ISB 218. Processed data stored in system memory 214 may then be communicated to the cable modem head end (not shown) via the upstream modulator 202. Similarly, data received from the cable modem head end can be processed by the downstream demodulator 200 and stored in system memory 214 as higher layer packets which can then be retrieved by the Ethernet MAC 211 via the ISB 218 and encoded into Ethernet packets for communication to the external device operating on the Ethernet via the MII 210. The Ethernet MAC 211 may also perform additional management functions such as link integrity monitoring, etc.

In addition to the SDRAM interface 216, the described exemplary embodiment of the residential gateway includes an external bus interface (EBI) 240 that supports connections to flash memory 242, external SRAM 244 or EPROMS 246. Additionally, the EBI 240 may be used to interface the exemplary residential gateway with additional external peripherals. The EBI 240 can provide a 24 bit address bus and a 16-bit bi-directional data bus. Separate read and write strobes can be provided along with multiple firmware configurable chip select signals. Each chip select can be fully programmable, supporting block sizes between about 4 K-bytes and 8 Mbytes, extended clock cycle access control and 8 or 16-bit selection of peripheral data bus width.

In the described exemplary residential gateway, the EBI 240 can support both synchronous and asynchronous transfers. Pseudonymous transfers may be supported through the use of read/write strobes to indicate the start and duration of a transfer. The EBI 240 can include DMA access capability to or from the SDRAM interface 216. The DMA operation may take one or more forms. For example, in EBI mode, an EBI bridge can act as a DMA controller, and perform all pointer and buffer management tasks during DMA operations. In an external mode, an external device can act as the DMA controller and the EBI 240 can serve as a simple bridge. In DMA mode the MIPS core 228 can be responsible for DMA setup.

The residential gateway may be vulnerable to network breaches due to peripheral devices such as PCs employing windows or network Macintosh computers. These operating systems include "file sharing" and "printer sharing" which allow two or more networked computers in a home or office to share files and printers. Therefore the exemplary embodiment of the residential gateway includes IP security module 248 which interfaces with ISB 218. In the described exemplary embodiment of the residential gateway, the MIPS core 228 can set-up and maintain all security associations. The MIPS core 228 can also filter all IP traffic and route any messages requiring security processing to the IP security module 248 via the ISB 218. The IP security module 248 may support single DES (CBC and ECB modes) triple DES (CBC and ECB modes) MD-5 and SHA authentication in hardware to provide support for virtual private networks.

The IP security module 248 can implement the basic building blocks of the developing IP Security Standard (IPsec). The security module 248 may also implement other security schemes that use the same basic two protocol technique as IPsec to provide traffic security. A first protocol, IP encapsulating security payload (ESP), provides private data privacy with encryption and limited traffic flow confidentiality. ESP may also provide connection less integrity, data source authentication and an anti-replay service. A second format, IP authentication header (AH), provides connection less integrity, data source authentication and an optical anti-replay service. Both protocols may be used to provide access based on the distribution of cryptographic keys and the management of traffic flows. The protocols may be used alone or in combination to satisfy the security requirements of a particular system. In addition, the security module 248 can support multiple modes of operation depending on a security association to the traffic carried by a simplex connection. For example, transport mode security association between two hosts, primarily protects protocols above the IP layer while tunnel mode security association provides security and control to a tunnel of IP packets.

An exemplary security module 248 addresses possible differences in packet format between IPsec and future security applications with a generalized scheme to determine where the authentication/encryption algorithms are applied within a data packet. The authentication/encryption algorithms consider each packet to consist of three parts, a header, body and trailer. The appropriate algorithm can be applied, using any specified parameters to the body section only.

In encryption mode, the security module 248 can add and initialize any necessary headers, determine necessary parameters, generate the associated control message and add the control and data message. In the authentication mode, the control fields of the received data packets are parsed, the parameters are determined via a security association lookup table, a control message is created and the control and data messages are queued.

The exemplary embodiment of the residential gateway includes a DMA controller 250 having a number of channels that enable direct access over the ISB 218 between peripherals and the system memory 214. With the exception of the IP security module 248, packets received by the residential gateway cause DMA transfers from a peripheral to memory, which is referred to as a receive operation. A DMA transfer from memory to a peripheral is referred to as a transmit operation. Programmable features in each channel can allow the DMA controller 250 to manage maximum ISB burst lengths for each channel, enable interrupts, halt operation in each channel, and save power when certain modules are not operational. The maximum ISB burst length may be programmed independently for each channel preferably up to sixty four 32 bit words.

In the described exemplary embodiment of the residential gateway, each channel may include maskable interrupts connected to the MIPS core 228 that indicate buffer complete, packet complete and or invalid descriptor detected. Busy DMA channels may be stalled or completely disabled by the MIPS core 228. Source clocks (not shown) for each channel can be connected to the channels based on the internal peripheral they service. For power reduction, these clocks may be turned off and on coincident with the respective peripheral's clock.

The DMA controller 250 can be operable in both non-chaining and chaining mode. In the non-chaining mode the DMA channel refers to its internal registers for the pertinent information related to a scheduled DMA burst transfer. The DMA controller can set-up the buffer start address, byte count, and status word registers before initiating the DMA channel for each allocated buffer. In the transmit direction, the DMA channels can send the specified number of bytes (preferably up to 4095) from the specified byte address. In the receive direction, the DMA channels can insert data into a specified memory location until a buffer has been completely filled or the end of a packet is detected.

Figure 3:
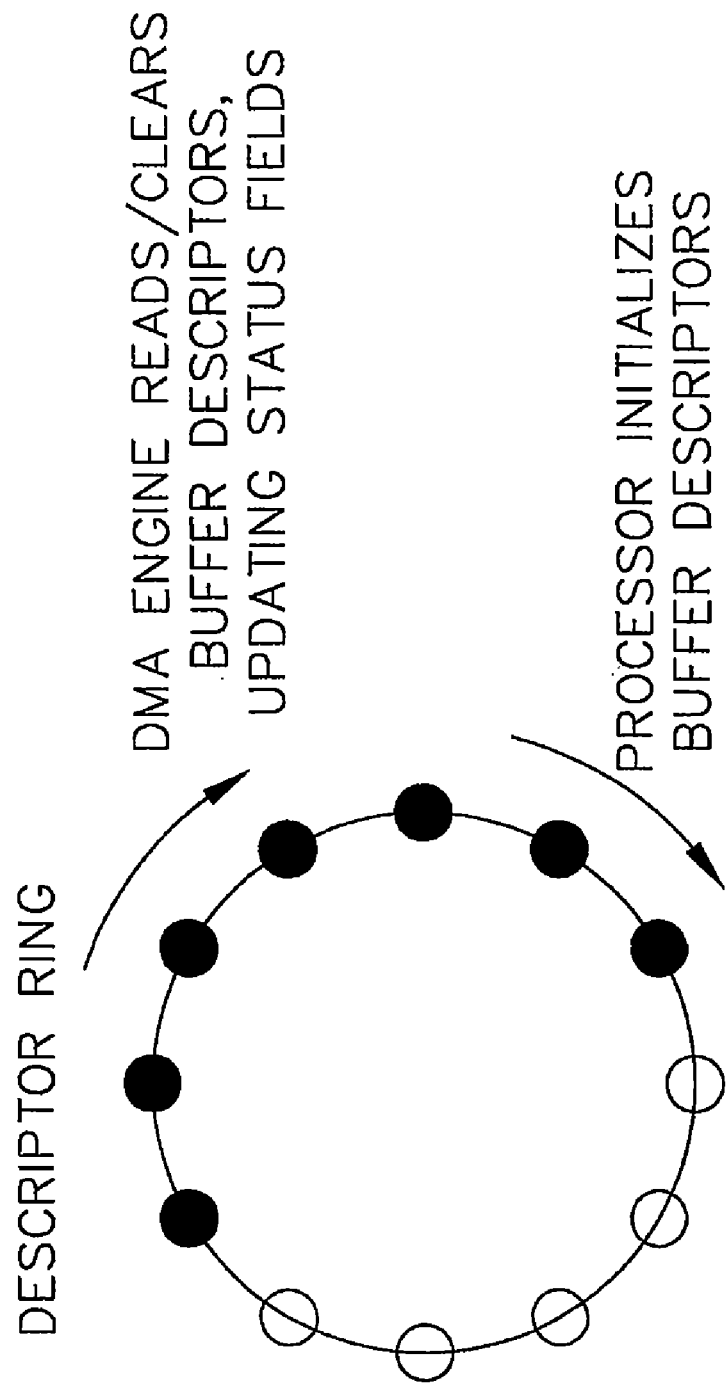
FIG. 3 is a graphical depiction of an exemplary chaining mode operation of the system direct memory access controller for the exemplary residential gateway of FIG. 2.

In the chaining mode, the system memory 214 can be partitioned as shown in FIG. 3 preferably using descriptor rings containing pointers to memory buffers as well as status information for each memory buffer. The MIPS core 228 can write the descriptor pointers while the DMA controller 250 follows by inserting/taking data into/from the location designated by the descriptor. Upon completion of the transfer of a buffer, the DMA controller 250 effectively clears the descriptor by updating the status to indicate that the data has been inserted/taken. Specific information may be added to the descriptor to indicate the length of data in the block, specifying whether the data is the first or last block of a packet, etc.

In the downstream direction, the MIPS core 228 can fill or recognize a data block for a particular DMA channel, then write the next unused descriptor in the ring indicating that the block is filled and where the downstream data exists in memory. The DMA controller 250 can follow a MIPS write to the descriptor ring, sending out data and clearing the descriptor when the transfer is complete. When the DMA controller 250 reads a descriptor that does not contain valid data, it can go idle until initiated by the MIPS core.

In the upstream direction, the MIPS core 228, allocates memory space for incoming data, then writes the descriptor with the start address for that buffer. The DMA controller 250 reads the base address and inserts data until either the buffer is full or an end of packet has been detected. The DMA controller 250 can update the descriptor, communicating to the MIPS core 228 that the block is full, indicating the length of the data on the block, and/or asserted first and or last buffer flags.

A voice and data processor 213 is used for processing and transporting voice over packet based networks such as PCs running network on a USB (Universal Serial Bus) or an asynchronous serial interface, LANs such as Ethernet, WANs such as IP, Frame Relay (FR), Asynchronous Transfer Mode (ATM), Public Digital Cellular Network such as TDMA (IS-13x), CDMA (IS-9x) or GSM for terrestrial wireless applications, or any other packet based system. The described embodiment of the voice and data processor 213 also supports the exchange of voice, as well as facsimile and modem, between the POTS telephone 108 (see FIG. 1a), or any number of telephony devices, and the cable head end. The voice and data processor 213 may be implemented with a variety of technologies including, by way of example, embedded communications software that enables transmission of voice over packet based networks. In the described exemplary embodiment, the voice and data processor 213 includes the proxy gateway function described in connection with FIG. 1b. Alternatively, the proxy gateway function could be implemented in the MIPS core 228. The functional partitioning of the voice and data processor 213 and the MIPS core 228 can take on various forms depending upon the particular application, the overall design constrains or other relevant factors.

The embedded communications software is preferably run on a programmable digital signal processor (DSP). In an exemplary embodiment the voice and data processor 260 utilizes a ZSP core from LSI Logic Core ware library for mid to high end telecommunications applications. The DSP core may include an internal instruction RAM 262 and an internal data RAM 264. The voice and data processor 213 interfaces with the ISB 218 via a DSP/ISB interface 266 and a peripheral bus 232 via a DSP/PB interface 268.

The voice and data processor 213 may include a grant synchronizer that insures timely delivery of voice signals to the MIPS core 228 for upstream transmission. In addition, a PCM interface 269 can provide the voice and data processor 213 with an interface to an internal audio processor 270 as well as an external audio processing circuits (not shown) to support constant bit rate (CBR) services such as telephony through the subscriber port 106a. The PCM interface 270 can provide multiple PCM channel controllers to support multiple voice channels. In the described exemplary embodiment of the residential gateway, there are four sets of transmit and receive FIFO registers, one for each of the four PCM controllers. However, the actual number of channels that may be processed may vary and is limited only by the performance of the DSP. The ISB 218 is used to transfer data, control and status messages between the voice and data processor 213 and the MIPS core 228. FIFO registers can be used in each direction to store data packets.

The internal audio processor 270 includes an analog front end 272 that interface the voice and data processor 213 with external subscriber line interface circuits (SLICs) for bidirectional exchange of voice signals via the subscriber port 106a. The audio processor 270 may include programmable elements that implement filters and other interface components for a plurality of voice channels.

In the transmit mode the analog front end 272 accepts an analog voice signal from the subscriber port 106a and digitizes the signal and forwards the digitized signal to the audio processor 270. The audio processor 170 decimates the digitized signal and conditions the decimated signal to remove far end echos. As the name implies, echos in telephone systems is the return of the talker's voice resulting from the operation of the hybrid with its two-four wire conversion. If there is low end-to-end delay, echo from the far end is equivalent to sidetone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user. The audio processor can apply a fixed gain/attenuation to the conditioned signal and forwards the gain adjusted signal to the voice and data processor 260 via the PCM interface 269. In the receive mode the audio processor 270 accepts a voice signal from the PCM interface 269 and may apply a fixed gain/attenuation to the received signal. The gain adjusted signal is then interpolated from 8 KHz to 96 KHz before being converted to an analog signal for communication through one of the subscriber ports of the residential gateway to a telephony device via a SLIC interface (not shown).

The described exemplary embodiment of the residential gateway may further include integrated peripherals such as independent periodic interval timers 280, a dual universal asynchronous receiver-transmitter (UART) 282 that handles asynchronous serial communication, a number of internal interrupt sources 284, and a GPIO module 286 that provides multiple, individually configurable input/output ports. In addition, multiple GPIO ports can be provided to drive various light emitting diodes (LEDs) and to control a number of external SLICs. A peripheral bus bridge 186 can be used to interface low speed peripherals to the ISB 218.

A HomePNA controller 138 enables a 4-32 Mbits/sec LAN using existing in home telephone wiring. The HomePNA controller 138 can be a fully integrated MAC/PHY device that provides bi-directional communication with devices such as for example a HomePNA phone, computer etc., operating on a HomPNA LAN via the subscriber port 106b of the residential gateway. The HomePNA controller 138 may include DMA channels which are used for fast data communication of processed data to the system memory 214 via the ISB 218. In the described exemplary embodiment, the HomePNA controller 138 includes a digital PHY having a FDQAM/QAM transmitter and receiver coupled to an analog front end (AFE) 226.

An exemplary cable modem without HomePNA capability is disclosed in U.S. patent application Ser. No. 09/548,400, entitled "Gateway with Voice," the contents of which is hereby incorporated by reference as though fully set forth herein.

1.2 Voice and Data Processor

The voice and data processor provides an interface between the WAN connected to the network port of the residential gateway and the subscriber ports of the residential gateway. In the described exemplary embodiment, the subscriber ports support a POTS telephone and an HomePNA LAN. In the downstream direction, the voice and data processor receives packets from the WAN and makes a routing decision based on the destination address within the packet. The destination of the packet will be one of two possibilities: (1) the HomePNA LAN, or (2) the POTS telephone. In the downstream direction, the packets from the HomePNA LAN and the voice signal from the POTS telephone are routed to the network port.

In the described exemplary embodiment, the voice and data processor performs a translation function between the packets in a HomePNA LAN format (VoHN) to packets in the VoIP format. The specific translation is direction dependent. Packets arriving from the HomePNA controller are translated to a VoIP format and delivered to the DOCSIS MAC. Packets arriving from the DOCSIS MAC are translated to a VoHN format and delivered to the HomePNA controller.

The voice and data processor also performs a media and protocol translation between VoIP formats and PCM voice samples which are delivered to or received from the audio processor. This transformation may include conversion from compressed audio formats as well as signaling transformations.

1.2.1. The Voice and Data Processor Architecture

Figure 4:
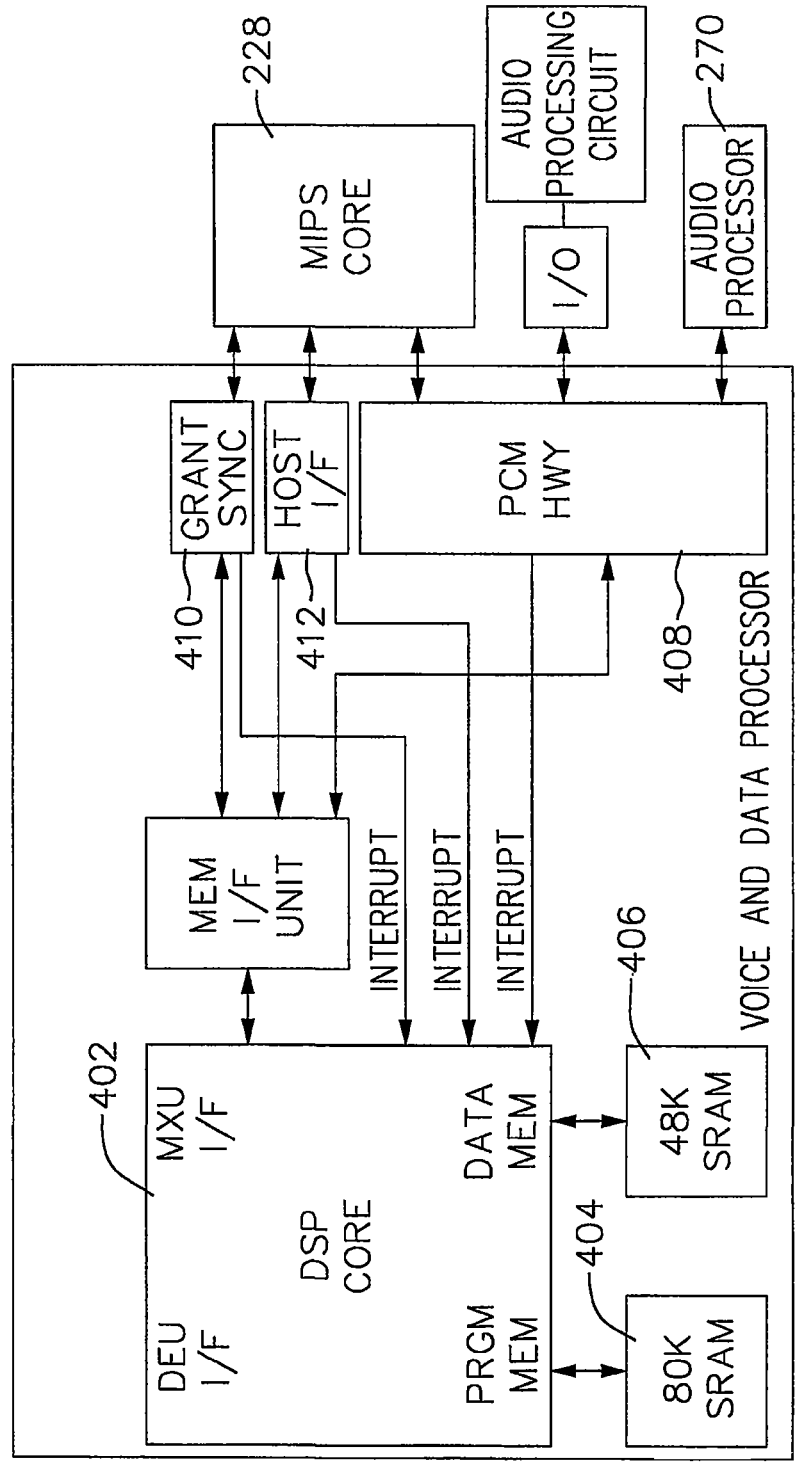
FIG. 4 is a system block diagram of an exemplary DSP based voice and data processor.

An exemplary voice and data processor may be implemented with a programmable DSP software architecture as shown in FIG. 4. This architecture includes a high speed DSP 402 with program memory 404, preferably on the order of about a 80K word SRAM, and data memory 406 preferably on the order of about a 48K word SRAM. A PCM highway 408 provides the voice and data processor access to the audio processor optional external audio processing circuits. A grant synchronizer 410 facilitates upstream transmission. The grant synchronizer 410 signals the DSP 402 that a pending grant is about to arrive at the residential gateway from the WAN so as to allow the DSP 402 to synchronize itself to scheduled grants at the residential gateway. A host interface 412 transfers data, control and status messages between the DSP 402 and the MIPS core.

1.2.2. The DSP Architecture and Software

Figure 5A:
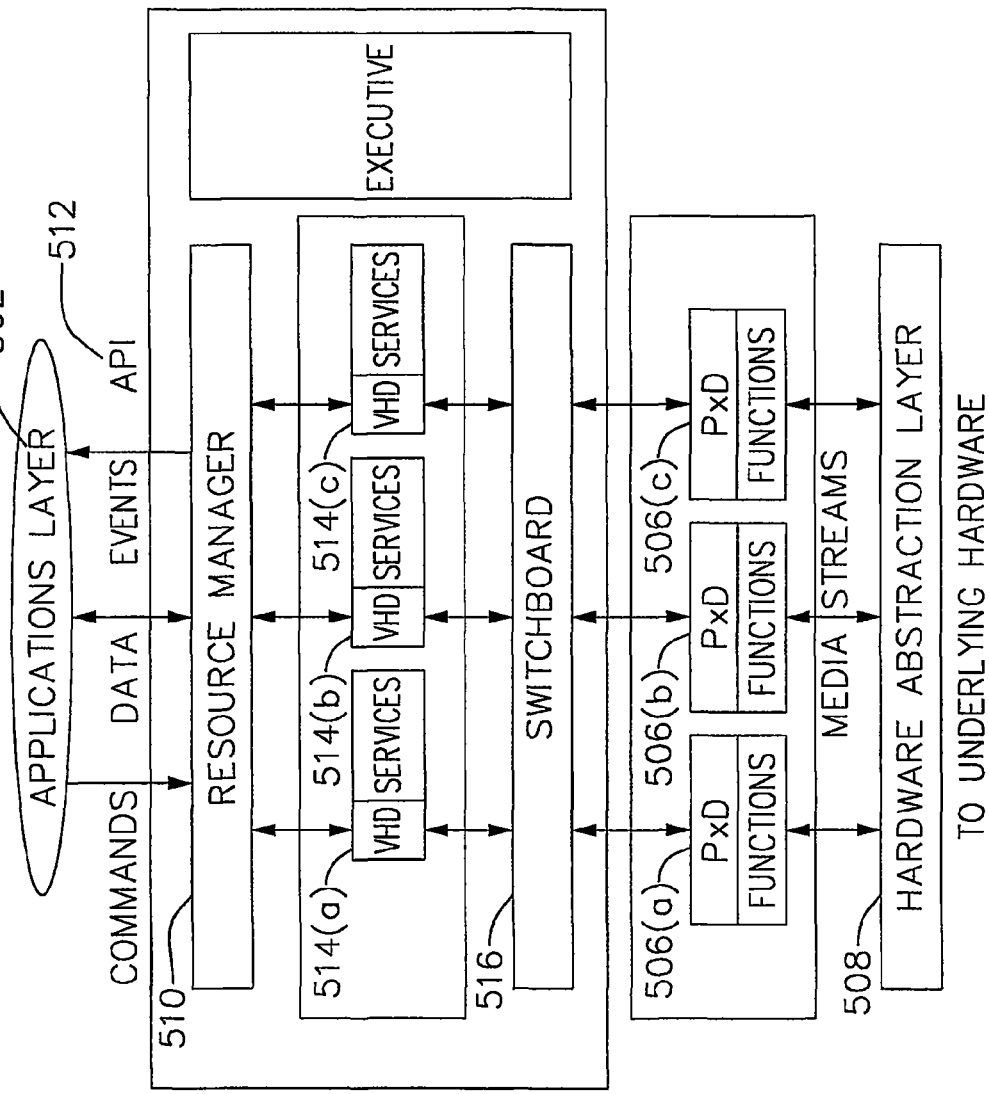
FIG. 5a is an exemplary software architecture operating on the DSP platform of FIG. 4.

The exemplary programmable DSP is effectively hidden within the embedded communications software layer. The software layer binds all core DSP algorithms together, interfaces the DSP hardware to the host, and provides low level services such as the allocation of resources to allow higher level software programs to run. An exemplary multi-layer software architecture loaded into the program memory for execution on the DSP platform is shown in FIG. 5*a*. An applications layer 502 provides overall executive control and system management, and directly interfaces a DSP server 504 to the MIPS core (see to FIG. 2). The DSP server 504 provides DSP resource management and telecommunications signal processing. Operating below the DSP server layer are a number of physical devices (PXD) 506*a*, 506*b*, 506*c*. Each PXD provides an interface between the DSP server 504 and an external telephony device (not shown) via a hardware abstraction layer (HAL) 508. In the described exemplary embodiment, the external telephony device is a POTS telephone (see FIG. 1*a*) support by a single PXD. In this case, the HAL 508 provides an interface between the single PXD and the audio processor.

The DSP server 504 includes a resource manager 510 which receives commands from, forwards events to, and exchanges data with the applications layer 502. An application programming interface 512 (API) provides a software interface between the user MTA call client 502 and the resource manager 570. The resource manager 570 manages the internal/external program and data memory of the DSP. In addition the resource manager dynamically allocates DSP resources, performs command routing as well as other general purpose functions.

The DSP server 504 also includes virtual device drivers (VHDs) 514*a*, 514*b*, 514*c*. The VHDs are a collection of software objects that control the operation of and provide the facility for real time signal processing. Each VHD 514*a*, 514*b*, 514*c* includes an inbound and outbound media queue (not shown) and a library of signal processing services specific to that VHD 514*a*, 514*b*, 514*c*. In the described exemplary embodiment, each VHD 514*a*, 514*b*, 514*c* is a complete self-contained software module for processing a single channel with a number of different telephony devices. Multiple channel capability can be achieved by adding VHDs to the DSP server 504. The resource manager 510 dynamically controls the creation and deletion of VHDs and services.

A switchboard 516 in the DSP server 504 dynamically inter-connects the PXDs 506*a*, 506*b*, 506*c* with the VHDs 514*a*, 514*b*, 514*c*. Each PXD 506*a*, 506*b*, 506*c* is a collection of software objects which provide signal conditioning for one external telephony device. For example, a PXD may provide volume and gain control for signals from a telephony device prior to communication with the switchboard 516. Multiple telephony functionalities can be supported on a single channel by connecting multiple PXDs, one for each telephony device, to a single VHD via the switchboard 516. Connections within the switchboard 516 can be managed by the applications layer 502 via a set of API commands to the resource manager 510. The number of PXDs and VHDs is expandable, and limited only by the memory size and the MIPS (millions instructions per second) of the underlying hardware.

The HAL 508 interfaces directly with the underlying DSP and exchanges telephony signals between the external telephony devices and the PXDs. The HAL 508 includes basic hardware interface routines, including DSP initialization, target hardware control, CODEC sampling, and hardware control interface routines. The DSP initialization routine is invoked by the MTA call client 512 to initiate the initialization of the signal processing system. The DSP initialization sets up the internal registers of the signal processing system for memory organization, interrupt handling, timer initialization, and DSP configuration. Target hardware initialization involves the initialization of all hardware devices and circuits external to the signal processing system. The HAL 508 is a physical firmware layer that isolates the communications software from the underlying hardware. This methodology allows the communications software to be ported to various hardware platforms by porting only the affected portions of the HAL 508 to the target hardware.

1.2.2.1. The Proxy Gateway

As indicated above, the proxy gateway function can be implemented in the voice and data processor. In the described exemplary embodiment, the proxy gateway function is implemented with embedded software at the applications layer. Referring to FIG. 5*b*, the applications layer includes an MTA call client 520 which provides overall control. A host application programming interface (HAPI) 522 provides a software messaging interface between the MIPS core 228 in the residential gateway (see FIG. 2) and the voice processor DSP. The HAPI 522 facilitates the issuing of commands from the MIPS core to the voice processor DSP as well the sending of events from the voice processor DSP to the MIPS core. In addition, the applications layer further includes a VoHN interface 524 which provides a software messaging interface between the MIPS core and the voice processor DSP via the HomePNA controller 138 (see FIG. 2). The VoHN interface 524 also facilitates the issuing of commands from the MIPS core to the voice processor DSP as well the sending of events from the voice processor DSP to the MIPS core.

In addition, the MTA call client 520 may provide all signaling and encapsulation elements required to support voice over the WAN, in this case a DOCSIS network 526 including media transport and call signaling via quality service logic 528. For example, gateway control protocol (GCP) logic 530 receives and mediates call-signaling information between the DOCSIS network and a PSTN. The GCP logic 530 maintains and controls the overall call state for calls requiring PSTN interconnection. The GCP logic 530 controls the voice processor DSP, via the MTA call client 5200 and the HAPI interface 522, as well as the MTA 140 and VoHN interface 524 by instructing it to create, modify, and delete connections that support the media stream over the DOCSIS network. The GCP logic 530 also instructs the voice and data processor and the MTA 140 to detect and generate events and signals. The GCP logic 530 also exercises attribute control over the voice and data processor and the MTA 140, providing instructions as to which attributes to apply to a connection, such as, for example, encoding method, use of echo cancellation, security parameters, etc.

The GCP logic 530 also interfaces with an external control element, such as, for example, a call agent or call management server (CMS) 534 to terminate and generate the call signaling from and to the network side of the residential gateway in accordance with the network-based call signaling (NCS) protocol specification. The NCS architecture places call state and feature implementation in the centralized the CMS 534, and places telephony device controls in the MTA call client 520. The MTA call client 520 passes device events to the CMS 534, and responds to commands issued from the CMS 534. The CMS 534, is responsible for setting up and tearing down calls, providing advanced services such as custom calling features, performing call authorization, and generating billing event records, etc.

For example, the CMS 534 instructs the MTA call client 520 to inform the CMS 534 when a phone goes off hook, and seven dual tone multi frequency (DTMF) digits have been entered. The CMS 534 instructs the MTA call client 520 to create a connection, reserve quality of service (QoS) resources through the access network for the pending voice connection, and to play a locally generated ringback tone. The CMS 534 in turn communicates with a remote CMS (or MGC) to setup the call. When the CMS 534 detects answer from the far end, it instructs the MTA call client 520 to stop the ringback tone, activate the media connection between the MTA call client 520 and the far-end MTA call client, and begin sending and receiving packets.

When a voice channel is successfully established, real time transport protocol (RTP) is used to transport all packets to guarantee interoperability. Real time transport protocol (RTP) provides end-to-end delivery services for data with real time characteristics, such as interactive audio and video. Those services include payload type identification, sequence numbering, timestamping and delivery monitoring of the quality of service (QoS) and conveys to participants statistics such as for example packet and byte counts for the session. RTP resides right above the transport layer. The described exemplary embedded MTA call client 520 includes RTP logic 536 that converts RTP packets (headers) to a protocol independent format utilized by the voice and data processor and vice versa.

The described exemplary embedded MTA call client 520 may include channel associated signaling (CAS) logic 538 that interfaces with the SLIC 109 (see FIG. 1*a*) via the GPIO interface 286 (see FIG. 2) to provide ring generation, hook-switch detection, and battery voltage control. The CAS logic 538 may support custom calling features such as for exam distinctive ringing. The CAS logic 538 can be implemented in the voice and data processor, or alternatively be resident on the MIPs core.

The described exemplary embedded MTA call client 520 may include MTA device provisioning logic 538 that enables the embedded MTA call client 520 to register and provide subscriber services over the DOCSIS network 526. The provisioning logic 538 provides initialization, authentication, and registration functions. The provisioning logic 538 also provides attribute definitions required in the MTA configuration file. The provisioning logic 6360 includes a SNMP logic 540 that exchanges device information and endpoint information between the MTA call client 520 and an external control element called a provisioning server (not shown). The MTA call client 520 also sends notification to the provisioning server that provisioning has been completed along with a pass/fail status using the SNMP protocol.

The provisioning logic 538 also includes DHCP logic 542 that interfaces with an external dynamic host configuration protocol (DHCP) server to assign an IP address to the MTA call client 520. The DHCP server (not shown) is a back office network element used during the MTA call client provisioning process to dynamically allocate IP addresses and other client configuration information. Further provisioning logic preferably includes domain name server (DNS) logic 544 which interfaces with an external DNS server (not shown) to obtain the IP address of a DOCSIS server given its fully qualified domain name.

The MTA configuration file is downloaded to the MTA call client 520 from an external trivial file transfer protocol (TFTP) server (not shown) through TFTP logic 546. The TFTP server is a back office network element used during the MTA call client provisioning process to download configuration files to the MTA call client. An HTTP server may be used instead of a TFTP server to download configuration files to the MTA call client 520.

Each of the protocol interfaces is subject to threats that could pose security risks to both the subscriber and service provider. The DOCSIS architecture addresses these threats by specifying, for each defined protocol interface, the underlying security mechanisms (such as IPSec) that provide the protocol interface with the security services it requires, e.g., authentication, integrity, confidentiality. Security logic 548 provides end-to-end encryption of RTP media streams and signaling messages, to reduce the threat of unauthorized interception of communications. The security logic 548 can provide additional security services such as, for example, authentication, access control, integrity, confidentiality and non-repudiation.

DOCSIS service logic 528 may provide the primary interface between the MTA call client 520 and the DOCSIS cable modem (i.e. DOCSIS MAC and modulator/demodulator) of the residential gateway. The DOCIS service logic 528 provides multiple sub-interfaces such as, for example, a control sub-interface that manages DOCSIS service-flows and associated QoS traffic parameters and classification rules. The DOCIS service logic 528 also provides a synchronization interface that is used to synchronize packet and scheduling prioritization for minimization of latency and jitter with guaranteed minimum constant bit rate scheduling. In addition, the DOCSIS service logic 528 is used to request bandwidth and QoS resources related to the bandwidth. The DOCIS cable modem features of the residential gateway then negotiate reserve bandwidth, guaranteed minimum bit rate etc, utilizing DOSCIS 1.1 quality of service feature. Similarly, DOCSIS service logic 528 may include a transport interface that is used to process packets in the media stream and perform appropriate per-packet QoS processing.

Figure 5C:
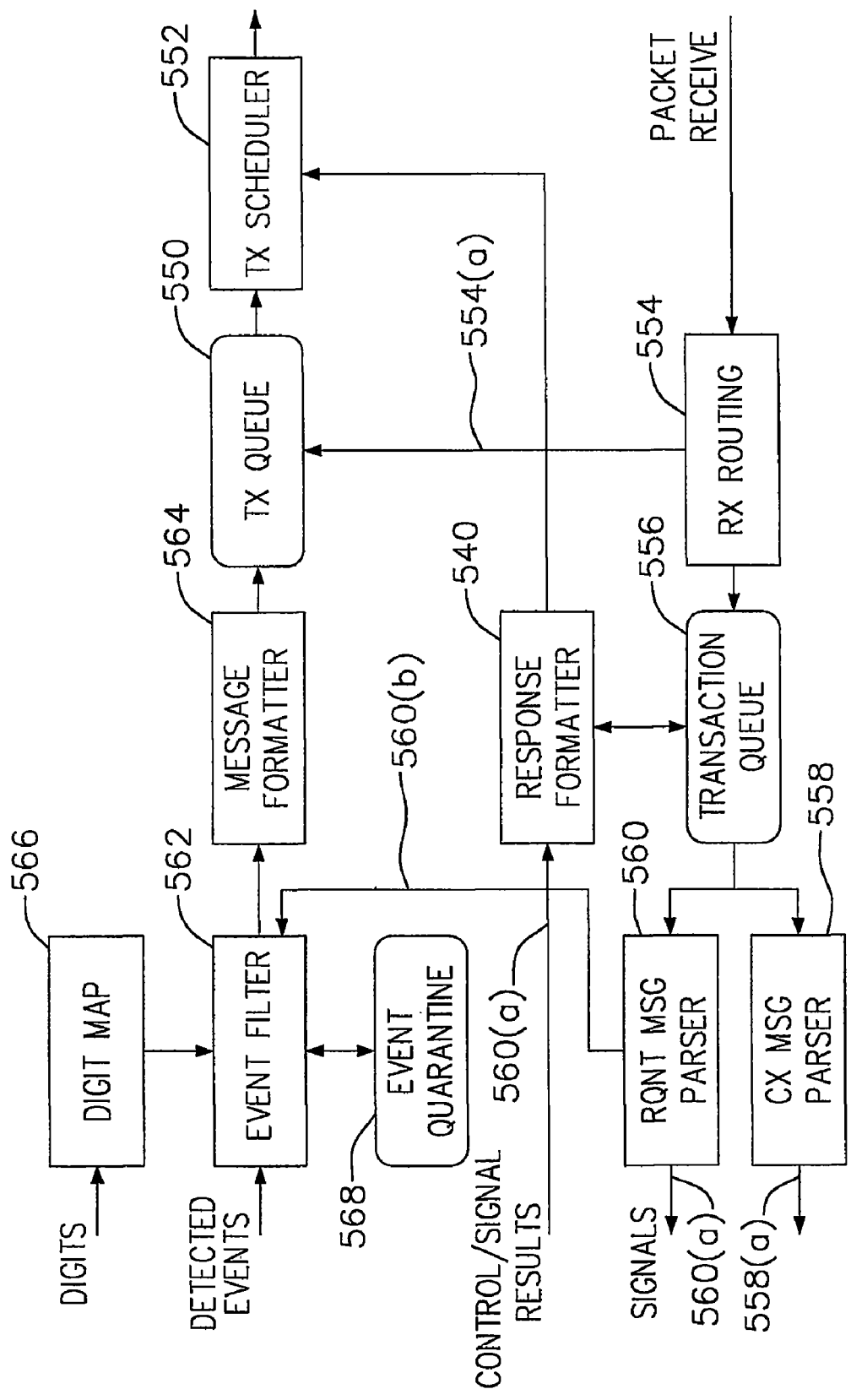
FIG. 5c is a block diagram of an exemplary architecture for a residential gateway control protocol logic which interfaces with an external control element, calls a call agent or call management server (CMS), to terminate and generate call signaling from and to a voice and data processor in compliance with the network-based call signaling (NCS) protocol specification.

Referring to FIG. 5*c*, the GCP logic implements the NCS features of the PacketCable 1.0 specification including protocol transaction management, parsing, verification and formatting of protocol data units (PDUs) and other utility functions. The PacketCable protocol typically requires an acknowledgment that a request has been received. Therefore, the GCP logic includes transmitter queue 550 which registers all requests sent from the GCP logic to the call management server via a transmitter scheduler 552 and the MTA call client. A receive router 554 then analyzes packets received from the call management server via the MTA call client to determine if the received message is an acknowledgment or a new request. The receiver router 554 forwards new requests to a transaction queue 556. If the received packet is an acknowledgment of a request previously sent from the GCP logic to the call management server, the receiver router 554 clears that request that request by forwarding the acknowledgment 554 (*a*) to the transmitter queue 550. The transmitter queue 550 periodically retransmits buffered requests until an acknowledgment from the call management server is received.

The transaction queue 556 registers the receipt of a given request from the call management server as well as the transmission of an acknowledgment of that request from the GCP logic to the call management server. Further, in the described exemplary embodiment the transaction queue 556 detects and requests re-transmitted from the call management server for which an acknowledgment has already been sent. In addition, the transaction queue 556 parses the incoming requests according to the type of requests. The transaction queue 556 routes connection messages to a connection message parser 558. Connections messages are used to create or terminate a connection. The connection message parser 558 generates and forwards connection controls (including connection attributes) 558(a) to the MTA call client which are then communicated to the DSP 523 via the HAPI interface 522 or the MTA 140 via the VoHN interface 524 (see FIG. 5b). The transaction queue 556 routes request/notify messages to a request/notify message parser 560. Request/notify messages may be signal requests such as play dial tone, busy tone etc. or requests to detect events such as for example, detect DTMF digits, fax tone, modem tone etc. The request/notify message parser 560 can generate and forward signal requests 560(a) to the DSP via the MTA and HAPI interface or the MTA via the VoHN interface. The request/notify message parser 560 flags event detection requests 560(b) to an event filter 562.

Actual events detected by the DSP and the MTA (such as, for example, fax tone) or channel associated signaling (such as, for example, off hook detected) are forwarded to the event filter 562 via the MTA call client. The event filter 562 filters the events and only transmits those detected events that the call management server requested, as indicted by flags 560(b) communicated to the event filter by the request/notify message parser 560. The event filter 562 can forward detected events of interest to the call management server to a message formatter 564. The message formatter 564 formats the detected event into the appropriate protocol and forwards the detected event message to transmitter queue 550, which registers the message and will retransmit the message if an acknowledgment is not received in a timely manner via the receiver router 554(a). The transmitter queue 550 forwards the message to the transmitter scheduler 552 which bundles outgoing messages and forwards them to the MTA call client (not shown) for communication to the call management server.

The PacketCable 1.0 specification provides for the use of a digit map which is designed to reduce the number of messages communicated between the call management server and the MTA call client when a user is dialing a number. For example, the dialing of long distance number involves the use of ten digits (i.e. the area code and number) which would require ten requests and acknowledgments i.e. one per digit. In the alternative the call management server may provide a digit map to the MTA call client which instruct digit map logic 566 to collect detected digits from the voice and data processor according to a specified format, for example ten digits for long distance call. The digit map logic 566 then forwards for example all ten digits to the event filter 562 which filters the digit detection, and forwards events of interest to the message parser 564 for communication to the call management server as previously described through transmitter queue 550 and transmitter scheduler 552.

Event quarantine logic 568 buffers detected events received from the CAS or the DSP via the MTA call client for which the event filter 562 has not received a detect event request from the call server manager via the request/notify message parser flag 560(b). Responses or the result 570(a) of a connection or signal requests are forwarded from the MTA call client to a response formatter 570 within the GCP logic that formats the result into the proper protocol. The response formatter 570 then forwards that result to the transmitter scheduler 552 for communication to the call management server via the MTA call client. In addition, the response formatter 570 notifies the transaction queue 556 that an acknowledgment has been sent in response to a given request. The transaction queue 556 may then detect the retransmission of a request from the call management server should that acknowledgment be lost or otherwise not received by the call management server. The transaction queue 556 may instruct the response formatter 570 to retransmit an acknowledgment when the transaction queue 556 detects the retransmission of a request for which an acknowledgment had been previously sent.

Figure 5D:
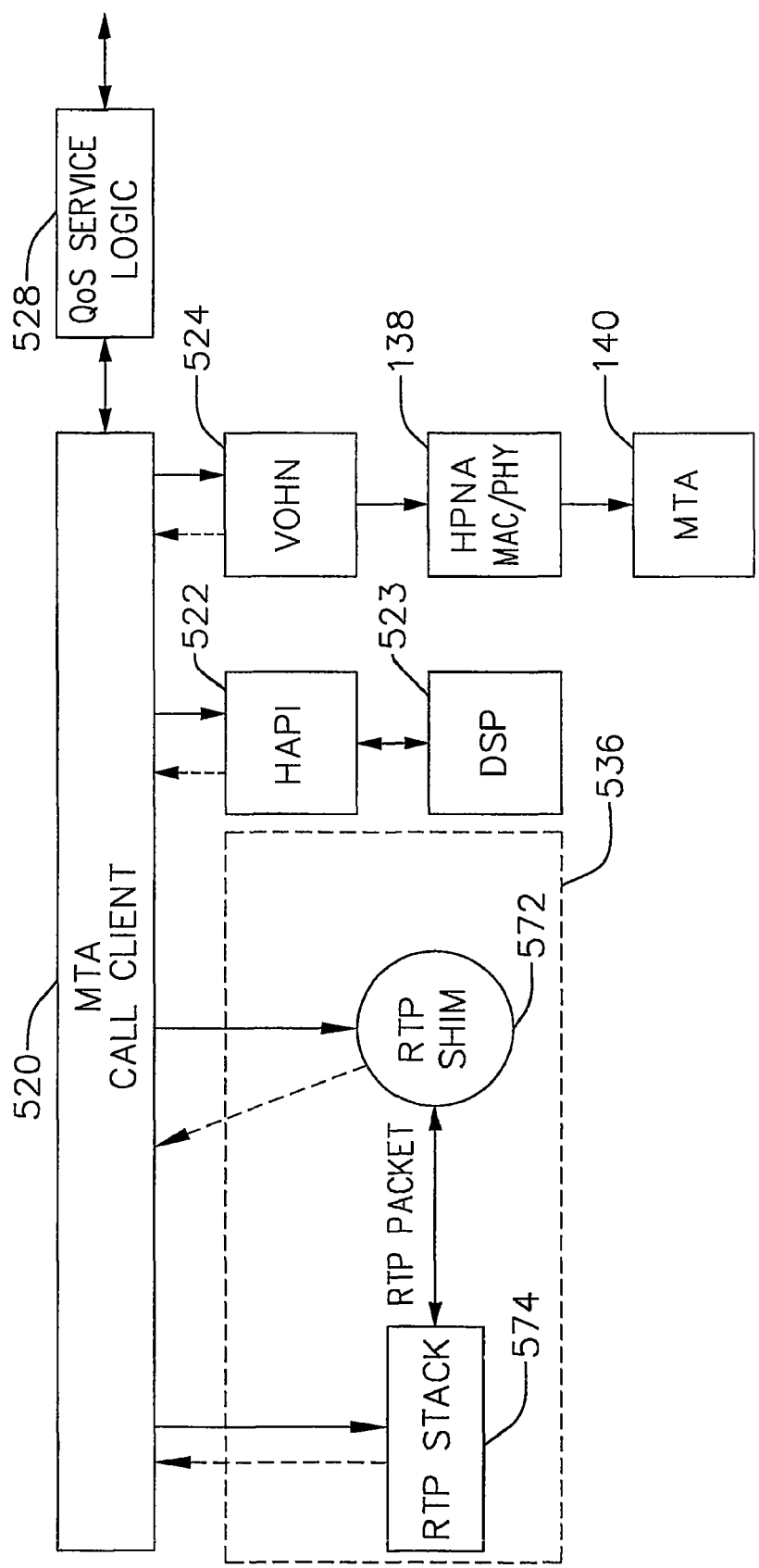
FIG. 5d is a block diagram of an exemplary method for converting between real time protocol packets from a WAN and an internal format protocol used by a voice and data processor in a residential gateway.

Referring to FIG. 5d, RTP logic 536 can convert RTP packets to the protocol independent packet format utilized by the VoHN interface 524 and the HAPI interface 522 and vice versa. In the described exemplary embodiment, the protocol independent packet payload can be identical to the RTP packet payload so that the RTP logic 536 need only convert between RTP and the headers used in the independent protocol. In the described exemplary embodiment a RTP shim 572 provides two way exchange of protocol independent packets with the MTA call client 520. The RTP shim 572 accepts these packets from the MTA call client 520, converts the packet header, to a RTP header and forwards the RTP packet to a RTP stack 574. The RTP stack 574 provides the statistical monitoring function required by the RTP protocol such as, for example, collecting statistics on the number of bytes sent and received, the number of packets lost as well as how much jitter was present. The RTP stack 574 provides two way exchange of RTP packet between the MTA call client 520 and the RTP logic 536, receiving RTP packets from the RTP shim 572 and forwarding them to the MTA call client 520 and vice versa.

Figure 5E:
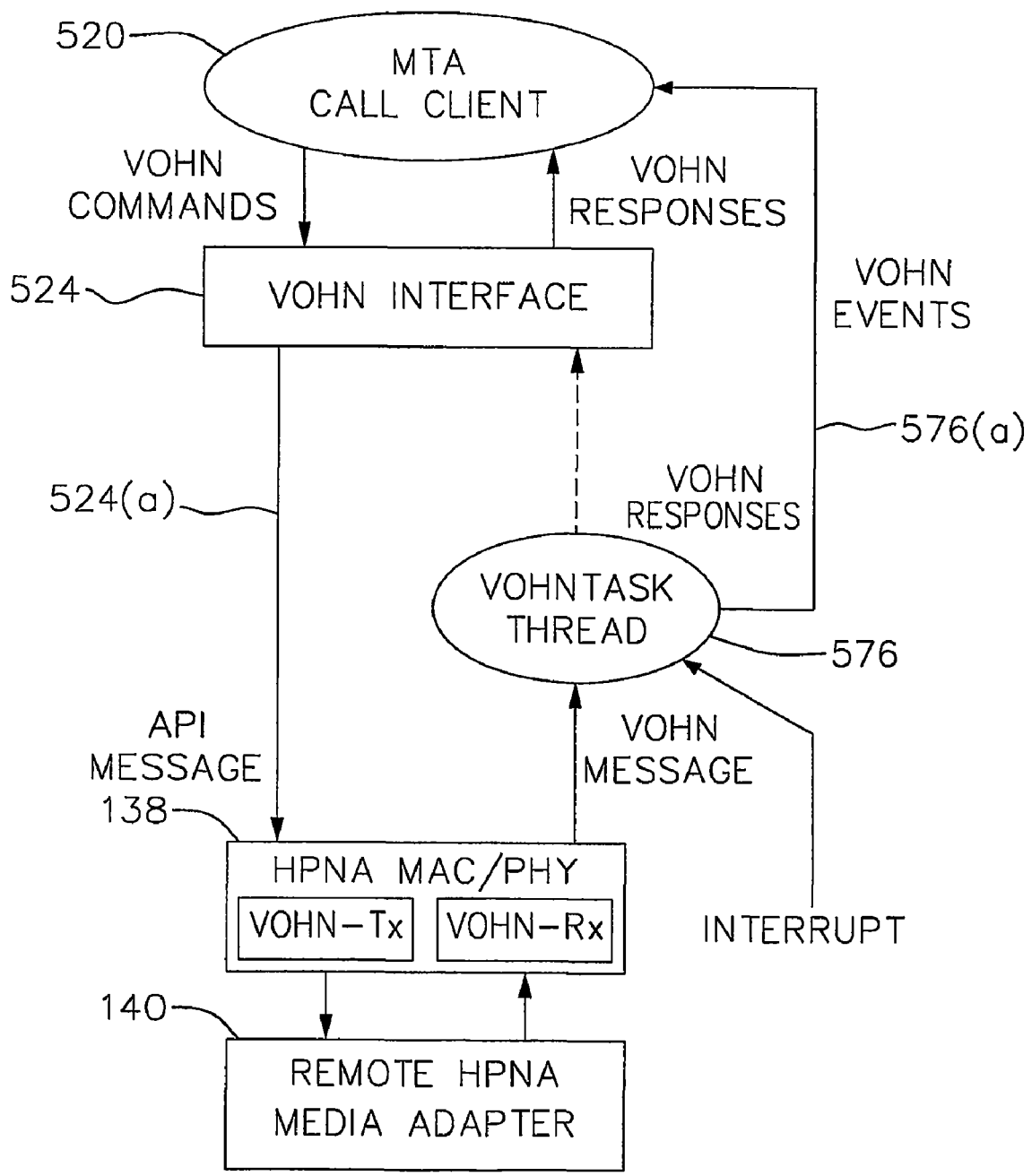
FIG. 5e is a block diagram of an exemplary software messaging interface between a DSP based voice and data processor in a residential gateway and a remote media terminal adapter.

Referring to FIG. 5e the described exemplary VoHN interface 524 provides a software messaging interface between the MTA call client 520 and the MTA 140. The VoHN interface 524 facilitates the issuing of commands from the MIPS core via the MTA call client 520 to the MTA 140 as well the sending of events from the MTA 140 to the MTA call client 520. The VoHN interface 524 may be scalable to support multiple channels as well as multiple media adapters. In addition the VoHN interface 524 is a thread safe environment, providing multi-threading capability to support multiple channels. Multi-threading provides multiple, simultaneously executing "threads" within a single application. The benefit of a multi-threaded application is similar to that of a multi-tasked operating system, the application may perform multiple tasks by using separate threads.

The described exemplary VoHN interface 524 receives commands from and issues responses to the MTA call client 520. The VoHN interface 524 processes incoming packets to identify the channel that should process the packet as well as other processing parameters such as for example, packet type (i.e. voice or fax), packet length, etc. For example, VoHN signaling messages are data link layer frames that are identified by a unique IEEE assigned Ethertype value in the frame header. Further, in the described exemplary embodiment, the frame header may also include one or more payload element fields. Each payload element may be variable length and multiple payload types such as for example voice, channel associated signaling, etc., may be concatenated in a single frame in any order.

For example, in the described exemplary embodiment, voice payload fields transfer packetized voice encoded to ITU standards such as, for example, G.711 a-law, G.711 u-law, G.728 or G.729A/B/E. The size of the frame depends on the voice encoder frame rate selected for the media stream, normally a multiple of 10 ms. Voice payload fields are transmitted at the selected frame rate while a voice path is established to the line termination. Some voice encoder algorithms incorporate voice activity detection (VAD) and reduce packet rate significantly during periods of silence.

In the described exemplary embodiment, voice-band data traffic (such as, for example, G.711 u-law/A-law) may be treated as a special case. Voice-band data is less sensitive to delay, but more sensitive to frame loss than voice traffic. Therefore, in operation, frames containing voice-band data contain two payload fields to increase delivery reliability over the HomePNA segment. In the described exemplary embodiment, the first payload field contains voice samples from the current frame period, and a second payload field contains a repeat of the voice samples from the most recent previous frame period.

In the described exemplary embodiment, signaling and voice payloads are encoded in frames that are transported as a Link Layer Protocol according to the formats and procedures for HomePNA 2.0 Link Layer Framing. The VoHN interface 524 forwards processed messages 524(a) to the HomePNA MAC/PHY 138 to provide access to the physical media and transparent transfer of link layer frames between the network gateway and MTA 140. In the described exemplary embodiment, individual line terminations are identified by single pre-defined/well-known MAC station addresses. Frames destined for a specific line termination are transmitted to the destination MAC address assigned for that line, rather than using the unique unicast MAC address of the network gateway or remote media adapter. The line termination or "station" addresses are actually multicast MAC addresses allowing multiple MTAs to share the same line termination and thus transmit/receive using the same station address. This addressing model permits implementation of distributed conferencing. Further, the sender of a communication may be identified from its unique unicast MAC station source address. The MAC may also performs error detection on received frames and silently discards frames with errors.

In the described exemplary embodiment, frames may be transmitted at one of two rates. For example, during static or quiescent periods when no state transitions are occurring, frames may be transmitted at a background rate on the order of about one frame every five seconds. However, when state information changes, frames may be transmitted at a foreground rate of one every 10 msec. In the described exemplary embodiment, frames are transmitted at the foreground rate until a quiescent period of at least about 50 msec has elapsed.

The MTA 140 forwards processed packets, such as, for example, encoded voice packets, to the HomePNA PHY/MAC 138 of the residential gateway. The HomePNA MAC/PHY 138 can reformat the response into a VoHN message and forwards the VoHN message to system memory. In addition, when a processed packet is written into system memory the MIPS core interrupts a VoHN Task Thread 576 that retrieves the processed VoHN message from the memory. The VoHN Task Thread 576 determines whether the message is an event such as, for example, a voice or fax packet or a DTMF detection which are forwarded directly to the MTA call client 520, or a response to a command/request from the MTA call client. For example, the MTA call client 520 may command the MTA 532 to turn off echo cancellation. Such a command is preferably processed by the VoHN interface 524 into the appropriate link layer format and forwarded to the HomePNA MAC/PHY 138. The MAC formats the message in accordance with HomePNA V.2 protocol and forwards the command over the HomePNA LAN to the MTA 140.

When the command has been complied with the MTA 140 returns an acknowledgment to the HomePNA PHY/MAC 138 of the residential gateway via the HomePNA LNA. The HomePNA MAC formats the response into a VPHN message and forwards it to the VoHN Task Thread 576 which then forwards it as a VoHN response to the VoHN interface 524. The VoHN interface 524 correlates the VoHN responses received from the VoHN Task Thread 576 to the corresponding command/request that prompted the response and forwards a VoHN response to the MTA call client 520.

The interaction of an exemplary embedded MTA call client and the MTA 140 may best be illustrated in the context of a typical voice communication across the DOCSIS network. The table set forth in FIG. 5f illustrates the call flow for an outgoing call origination. In this example, the network is initially in an idle state. The MTA call client and CAS of the residential gateway transmit a loop current feed (LCF) state indication to the MTA that returns a loop open or on hook indication. The user initiates a communication by going off hook. The MTA performs hook-switch monitoring on the SLIC and relays a loop closed offhook state indication to the residential gateway. The CAS logic detects an offhook state and forwards a detection event to the MTA call client. The MTA call client then instructs the GCP logic to generate an off hook signal. The GCP logic generates an off hook signal which is forwarded to the MTA call client and transmitted out the QoS service logic to the call management server via the DOCSIS MAC and upstream modulator of the residential gateway and the cable head end. The call management server typically would transmit a return signal via the cable modem head end, DOCSIS MAC and downstream demodulator of the residential gateway to the MTA call client via the QoS service logic. The MTA call client forwards that signal to the GCP logic that decodes the signal, typically play dial tone. The GCP logic would then signal the MTA call client to play dial tone. The MTA call client then sends a command to the remote media adapter via the VoHN interface and HomePNA MAC/PHY to play dial tone. The user then hears a dial tone.

Upon hearing a dial tone a user will then typically dial a number. The MTA includes a DTMF detector that detects the dialed digits and generates DTMF tone on and tone off events that are forwarded to the MTA call client as events via the HomePNA PHY/MAC and the VoHN interface. The MTA call client forwards the event to the GCP logic that encodes the dialed digits into a signaling message which is returned to the MTA call client. The MTA call client transmits the signaling message out the QoS service logic to the call management server via the DOCSIS MAC and upstream modulator of the residential gateway and the cable modem head end. The call management server would then instruct a called party MTA call client to generate a ring to the called number. If the call is answered by going off hook, the CAS of the called MTA call client would detect an offhook condition and signal the call management server. The call management server then instructs the MTA call client via the cable modem head end, and downstream demodulator, DOCSIS MAC and QoS service logic of the residential gateway to establish a voice connection with a given set of features, i.e. use echo cancellation, and silence suppression, use given coder etc. In addition, the MTA call client is given the IP address of the called party, to which the RTP voice packets should be sent. The MTA call client forwards the received message to the GCP logic that decodes the received message. The GCP logic generates attribute instructions for the MTA such as, for example, encoding method, use of echo cancellation, security parameters, etc. which are communicated to the remote media adapter via the MTA call client, the VoHN interface and the HomePNA MAC/PHY.

Voice packets are then exchanged. For example, if the calling party speaks, the MTA would process the voice and forward voice packets to the MTA call client via HomePNA PHY/MAC and the VoHN interface. The MTA call client forwards those voice packets to the RTP logic that converts the packet from a protocol independent packet format to the RTP format. The RTP voice packets are then returned to the MTA call client which transmits the RTP voice packet to the cable modem head end via the QoS service logic and the DOCSIS MAC and upstream demodulator of the residential gateway. The voice packets are then routed to the called party. Similarly, voice packets from the called party are communicated to the MTA call client of the call client via the QoS service logic. The MTA call client forwards the RTP voice packets to the RTP logic that converts the packet from the RTP format to the protocol independent packet format. The protocol independent voice packets are returned to the MTA call client that forwards them to the VoHN interface. The MTA decodes the packets and communicates a digital stream to the called party. Voice exchange would continue in a similar manner until an on hook condition is detected by either the calling or called party. The CAS would then forward an on hook detection event to its respective MTA call client. The MTA call client instructs the GCP logic to generate a hook detection signaling message that is returned to the MTA call client and forwarded to the call management server. The call management server generates a request to play (dial tone, silence or receiver off hook) which is forwarded to the opposite MTA call client. The MTA call client would forward the request to the GCP logic that would then instruct the MTA to play dial tone via the MTA call client, VoHN interface and HomePNA MAC/PHY.

Telephony calls in the other direction are similarly processed. For example, the call management server instructs the MTA call client to ring a dialed number. The MTA call client instructs the GCP logic to generate a command to ring the dialed number. The command is then forwarded to the CAS via the MTA call client. The CAS generates a ring signal and forwards that signal to the VoHN interface for communication across the network to the MTA. The MTA call client may also instruct the GCP logic to present call ID that preferably generates a command for the MTA to present caller ID. If the user picks up the phone the CAS would detect an off hook condition and signal an off hook event back to the MTA call client. The MTA call client then instructs the GCP logic to create an off hook detection signaling message, which when created is returned to the MTA call client and forwarded to the external call management server via the QoS service logic, DOCSIS MAC and upstream modulator of the residential gateway and the cable modem head end. A communication channel would again be established with a given set of attributes as previously described. In the described exemplary embodiment, the residential gateway transmits CAS and CLASS payload frames to a multicast MAC destination address that is associated with the line termination. In this way, ringing and caller ID messages are distributed to each MTA bound to the line. In the described exemplary embodiment, the residential gateway is responsible for timing of state transitions on the MTA loop interface. The residential gateway generates ring signal cadence and by timing ringer on and ringer off events and manages ring-trip removal. It is responsible for managing the timing between CAS state events and CLASS messages for on-hook and off-hook CLASS services, according to Bellcore GR-30. It is responsible for meeting for the ring-trip removal delay requirement. The proxy gateway performs hook-switch event detection based on the timing of hook-switch events reported from the MTA according to Bellcore GR-506. The Proxy Gateway is able to determine off-hook, on-hook and hook-flash events and report those events to the upstream telephony service.

In the described exemplary embodiment, the residential gateway may also transmit test payloads to the MTAs to perform loop test and diagnostic functions on the line termination handled by the remote media adapter. For example, a ping request payload requests that the receiving media adapter respond with a ping response payload containing the same payload data field as the request. An analog loopback payload requests that the receiving remote media adapter perform an analog loopback (i.e. as close to the SLIC interface as possible). In the analog loopback test, subsequent voice payloads received should be played out (D/A conversion) and re-encoded (A/D conversion) for transmission upstream. A digital loopback payload requests that the receiving MTA perform a digital loopback. Subsequent voice payloads received should be echoed back unchanged for transmission upstream.

Figure 5G:
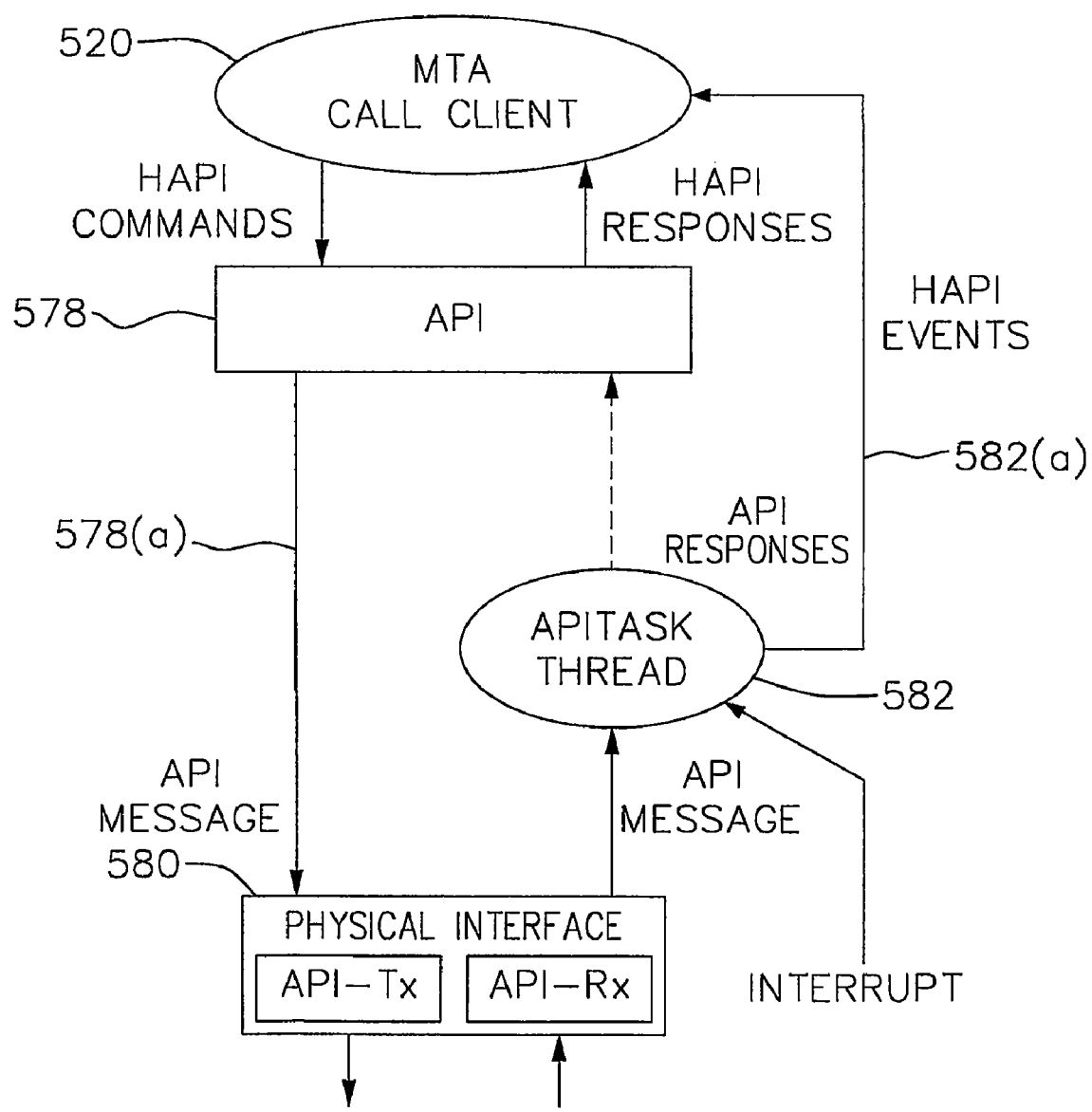
FIG. 5g is a block diagram of an exemplary software messaging interface between a DSP and a hardware abstraction layer for a voice and data processor.

Referring to FIG. 5g the described exemplary host application programming interface (HAPI) provides a software messaging interface between the MTA call client 520 and the DSP. The HAPI 522 facilitates the issuing of commands from the MIPS core via the MTA call client 520 to the DSP as well the sending of events from the DSP to the MTA call client 520. The HAPI interface 522 can be scalable to support multiple channels as well as multiple DSPs. In addition the HAPI interface 522 is a thread safe environment, providing multithreading capability to support multiple channels. Multithreading provides multiple, simultaneously executing "threads" within a single application. The benefit of a multithreaded application is similar to that of a multi-tasked operating system, the application may perform multiple tasks by using separate threads.

In the described exemplary HAPI, an application programming interface (API) 578 receives commands from and issues responses to the MTA call client 520. The API 578 processes incoming packets adding an additional header word to identify the channel that should process the packet as well as other processing parameters such as for example, packet type (i.e. voice or fax), packet length, etc. The API 578 forwards processed API messages 578($a$) to a physical interface (firmware layer) 580 that interfaces with the host port of the DSP underlying the voice and data processor so as to isolate the MTA call client software and the signal processing software from the underlying hardware. This methodology allows the software to be ported to various hardware platforms by porting only the hardware interface portions of the HAPI interface to the target hardware. The physical interface 580 formats the message in accordance with the underlying DSP and forwards or transmits the message to the telephony algorithms executing on the DSP.

Similarly, the underlying DSP forwards processed packets, such as, for example, encoded voice packets, to the physical interface 580. The physical interface 580 preferably reformats the response into an API message. When a processed packet is forwarded to the physical interface 580 the underlying DSP also interrupts an APITask Thread 582 that retrieves the processed API messages from the physical interface 580. The APITask Thread 582 determines whether the API message is an event such as, for example, a voice or fax packet or a DTMF detection which are forwarded directly to the MTA call client 582($a$), or a response to a command/request from the MTA call client 520. For example, the MTA call client 520 may command the voice and data processor to turn off the echo canceller. Such a command can be processed by the API interface 578 to add the appropriate header word and forwarded to the physical interface 580. The physical interface 580 formats the message in accordance with the underlying DSP and issues the command to the underlying voice channel to turn off the echo canceller.

When the command has been complied with a response is returned from the underlying DSP to the physical interface 580. The physical interface 580 formats the response into an API message and forwards it to the APITask thread 582 which then forwards it as an API response to the API interface 578. The API interface 578 correlates the API responses received from the APITask Thread 582 to the corresponding command/request that prompted the response and forwards a HAPI response to the MTA call client 520.

The operation of an exemplary embedded MTA call client and the voice and data processor may best be illustrated in the context of a typical voice communication across the DOCSIS network. The user initiates a communication by going off hook. The CAS detects the off hook condition from the SLIC and sends an off hook event to the MTA call client. The MTA call client then instructs the GCP logic to generate a off hook signal. The GCP logic generates an off hook signal which is forwarded to the MTA call client and transmitted out the QoS service logic to the call management server via the DOCSIS MAC and upstream modulator of the residential gateway and the cable modem head end. The call management server typically would transmit a return signal via the cable modem head end, DOCSIS MAC and downstream demodulator of the network gateway to the MTA call client via the QoS service logic. The MTA call client preferably forwards that signal to the GCP logic that decodes the signal, typically play dial tone. The GCP logic would then signal the MTA call client to play dial tone. The MTA call client then sends a command to the voice and data processor via the HAPI interface to play dial tone. The user then hears a dial tone.

Upon hearing a dial tone a user will typically dial a number. The voice and data processor includes a DTMF detector which detects the dialed digits and forwards the detected digits to the MTA call client as events via the HAPI interface. The MTA call client forwards the event to the GCP logic that encodes the dialed digits into a signaling message that is returned to the MTA call client. The MTA call client transmits the signaling message out the QoS service logic to the call management server via the DOCSIS MAC and upstream modulator of the residential gateway and the cable modem head end. The call management server would then instruct a called party MTA call client to generate a ring to the called number. If the called number answers by going off hook, the CAS of the called MTA call client would detect an off hook condition and signal the call management server. The call management server then instructs the MTA call client via the cable modem head end, and downstream demodulator, DOCSIS MAC and QoS service logic of the residential gateway to establish a voice connection with a given set of features, i.e. use echo cancellation, and silence suppression, use given coder etc. In addition, the MTA call client is given the IP address of the called party, to which the RTP voice packets should be sent. The MTA call client forwards the received message to the GCP logic that decodes the received message. The GCP logic generates attribute instructions for the voice and data processor such as, for example, encoding method, use of echo cancellation, security parameters, etc. that are communicated to the voice and data processor via the MTA call client and the HAPI interface.

Voice packets are then exchanged. For example, if the calling party speaks, the voice and data processor would process the voice and forward voice packets to the MTA call client via the HAPI interface. The MTA call client forwards the voice packet to the RTP logic that converts the packet from a protocol independent packet format to the RTP format. The RTP voice packets are then returned to the MTA call client which transmits the RTP voice packet to the cable modem head end via the QoS service logic and the DOCSIS MAC and upstream demodulator of the residential gateway. The voice packets are then routed to the called party. Similarly, voice packets from the called party are communicated to the MTA of the call client via the QoS service logic. The MTA call client forwards the RTP voice packets to the RTP logic that converts the packet from the RTP format to the protocol independent packet format. The protocol independent voice packets are returned to the MTA call client that forwards them to the voice and data processor via the HAPI interface. The voice and data processor decodes the packets and communicates a digital stream to the called party. Voice exchange would continue in a similar manner until an on hook condition is detected by either the calling or called party. The CAS would then forward an on hook detection event to its respective MTA call client. The MTA call client instructs the GCP logic to generate a hook detection signaling message which is returned to the MTA call client and forwarded to the call management server. The call management server generates a request to play (dial tone, silence or receiver off hook) which is forwarded to the opposite MTA call client. The MTA call client would forward the request to the GCP logic which would then instruct the voice and data processor to play dial tone via the MTA call client and HAPI interface.

Telephony calls in the other direction are similarly processed. For example, the call management server instructs the MTA call client to ring a dialed number. The MTA call client instructs the GCP logic to generates a command to ring the dialed number. The command is then forwarded to the CAS via the MTA call client. The CAS generates a ring signal and forwards that signal to the SLIC that then rings the called telephony device. The MTA call client may also instruct the GCP logic to present call ID that preferably generates a command for the voice and data processor to present caller ID. If the user picks up the phone the CAS would detect an off hook condition and signal an off hook event back to the MTA call client. The MTA call client instructs the GCP logic to create an off hook detection signaling message, which when created is returned to the MTA call client and forwarded to the external call management server via the QoS service logic, DOCSIS MAC and upstream modulator of the residential gateway and the cable modem head end. A communication channel would again be established with a given set of attributes as previously described.

Figure 5H:
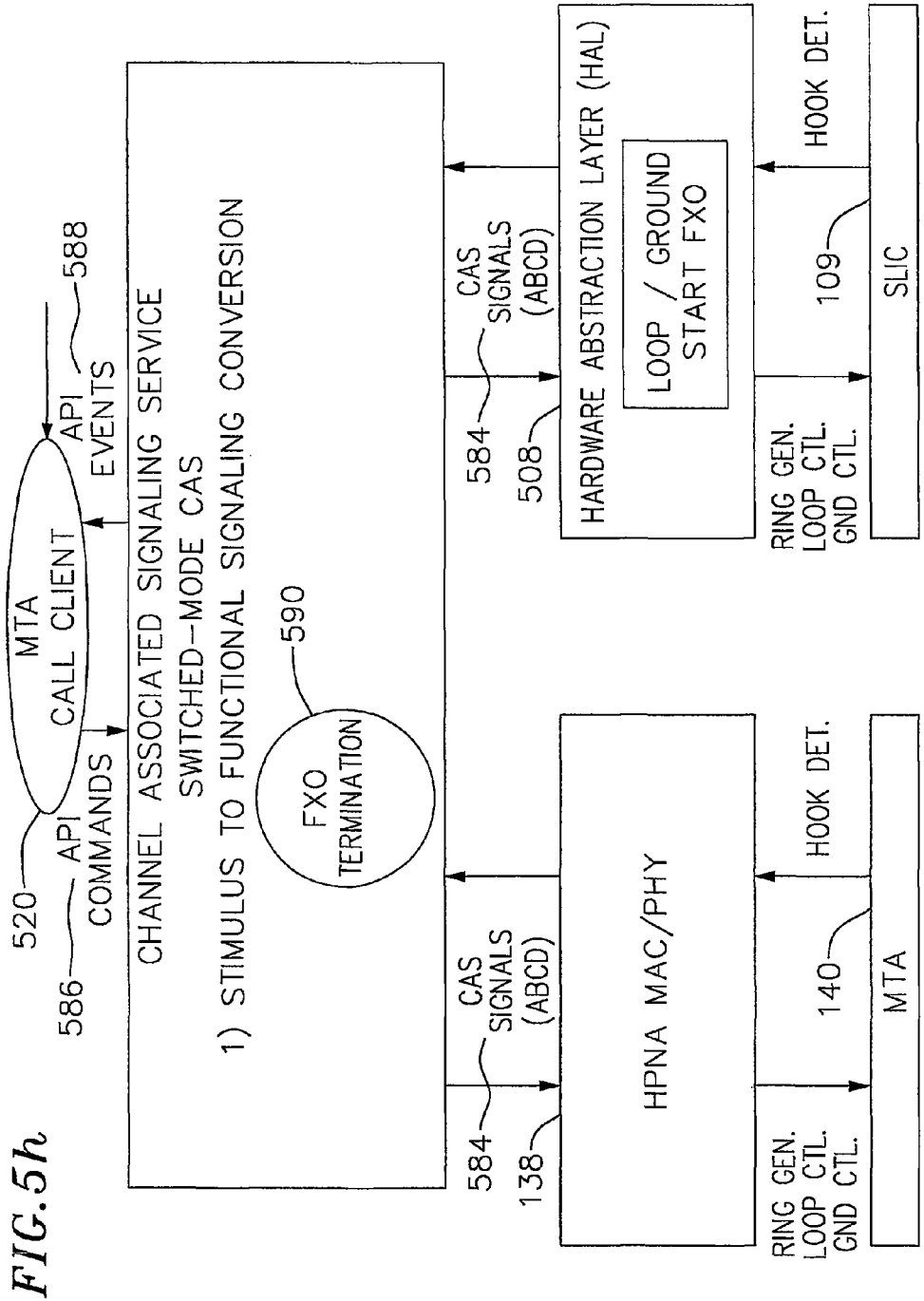
FIG. 5h is a block diagram of an exemplary channel associated signaling service logic for exchanging commands and events between a host applications layer for a voice and data processor and standard commercial analog loop/ground start devices such as for example plain old telephone sets.

Referring to FIG. 5h, the described channel associated signaling (CAS) logic 538 utilizes a foreign exchange office (FXO) interface to provide exchange of commands and detection of events between the MTA call client 520 and standard commercial analog loop/ground start devices such as, for example, plain old telephone sets (POTS), group three facsimiles, modems, answering machine or other similar devices. The CAS logic 538 can operate in switch mode, such that ABCD bits 584 are terminated within the CAS logic 534. The MTA call client 520 interfaces with the CAS logic 534 through high level commands 586 and events 588. For example, if the CAS logic 538 detects a phone going off the hook, a detection event is forwarded to the MTA call client 520 which may then notify the call management server as previously described. The MTA call client is also able to issue high level commands to the CAS logic 538.

For example, to ring a phone coupled to the network gateway via the voice and data processor, the MTA call client 520 sends a ring generation profile to the CAS logic 538. The CAS logic 538 reformats the command into raw CAS bits by FXO termination logic 590 to control the external interface via a hardware abstraction layer (HAL) 508 (see FIG. 5a). The HAL 508 provides a physical interface to the connected SLIC 109 (see FIG. 1a). The HAL 508 formats message signals in accordance with the underlying SLIC 109 and forwards or transmits the message signal to the connected POTS telephone 108 via the SLIC 109.

Ringing a telephony device via the HomePNA LAN proceeds similarly, with raw CAS bits generated by the FXO termination logic 590 are forwarded to the MTA 140 via the HomePNA MAC/PHY 138. Further, detected events, signaled from the SLIC 109 or the MTA 140, including on/off hook, flash hook and potentially pulse dial, are returned to the FXO termination logic 590 from the HAL 508 or HomePNA MAC/PHY 138 respectively as raw CAS bits.

The FXO termination logic 590 can verify the integrity of the detected event and forwards a detected event message to the MTA call client 520. The FXO termination logic 590 includes a state machine that monitors detected events signaled from the SLIC 109 via the HAL 508. The FXO termination logic 590 qualifies detected events signaled by the SLIC 109 to determine if a valid on/off hook, flash hook or pulse dial has been detected. The FXO termination logic 590 analyzes the period of the received signal to determine valid flash hook or pulse dial conditions. Similarly, the FXO termination logic 590 includes a state machine that associated with the ringing of connected phones. When the MTA call client 520 issues a command to ring a connected phone with a pre-defined cadence and the associated FXO termination state machine will ring the connected phone in accordance with the MTA command.

Those skilled in the art will appreciate that the proxy gateway functionality may be partitioned into a number of implementations depending of the particular application and overall design constraints. By way of example, the proxy gateway function can be implemented in the MIPS core rather than the voice and data processor. Alternatively, the proxy gateway functions can be split between the MIPS core and the voice processor. In yet another approach, the proxy gateway functions may be implemented in whole or part in a separate DSP, an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may be a microprocessor, but in the alternative, the processor may be any conventional processor, controller, microcontroller, or state machine. The software module could reside in RAM memory, flash memory, ROM memory, registers, hard disk, a removable disk, a CD-ROM, or any other form of storage medium known in the art.

1.2.2.2. Voice and Data Processing

The exemplary software architecture described above can be integrated into numerous telecommunications products. In an exemplary embodiment, the software architecture is designed to support telephony signals between telephony devices (and/or circuit switched networks) and packet based networks. A network VHD (NetVHD) is used to provide a single channel of operation and provide the signal processing services for transparently managing voice, fax, and modem data across a variety of packet based networks. More particularly, the NetVHD encodes and packetizes DTMF, voice, fax, and modem data received from various telephony devices and/or circuit switched networks and transmits the packets to the user application layer. In addition, the NetVHD disassembles DTMF, voice, fax, and modem data from the user application layer, decodes the packets into signals, and transmits the signals to the circuit switched network or device.

Figure 6:
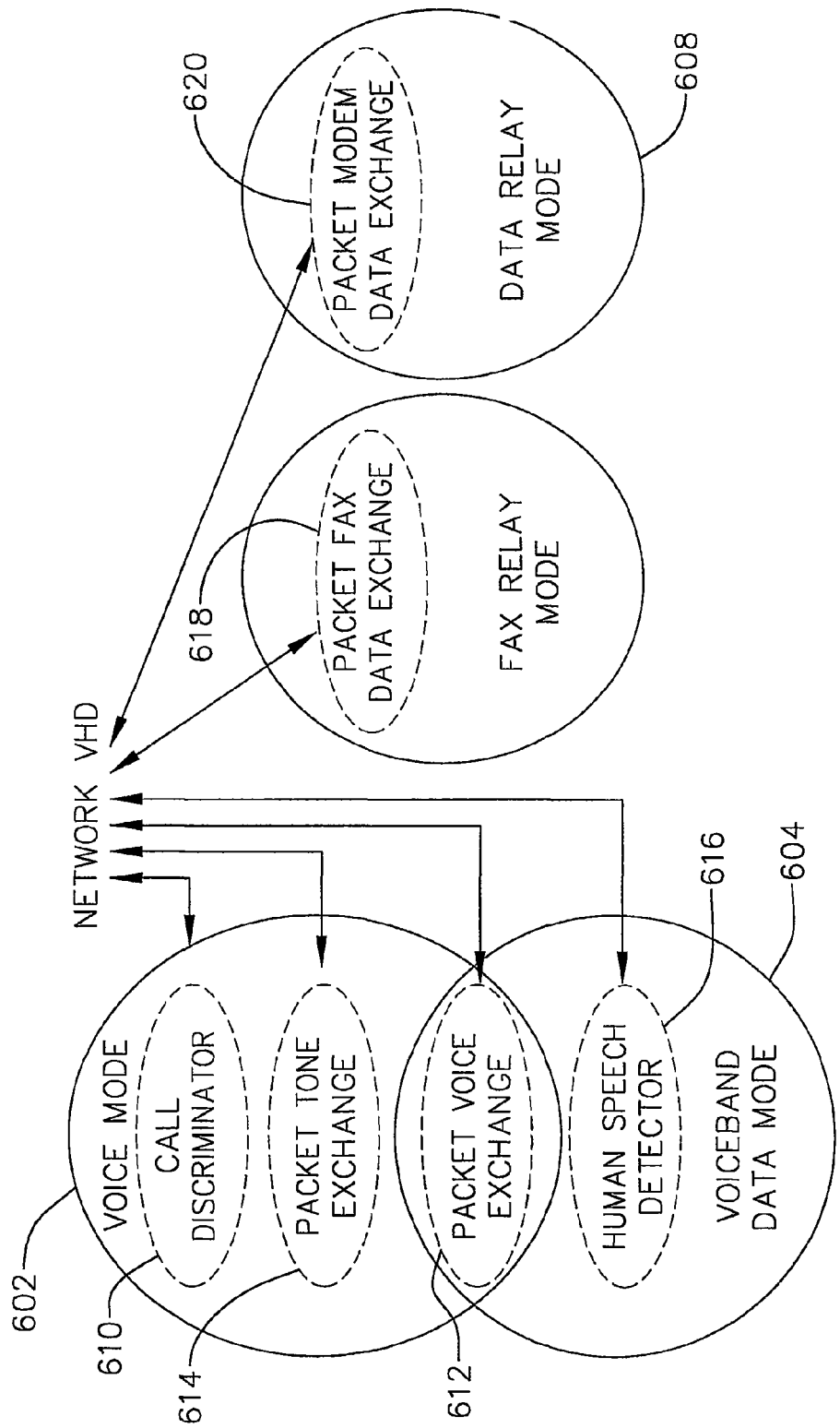
FIG. 6 is an exemplary state machine diagram of the operational modes of a virtual device driver for packet based network applications.

An exemplary embodiment of the NetVHD operating in the described software architecture is shown in FIG. 6. The NetVHD includes four operational modes, namely voice mode 602, voiceband data mode 604, fax relay mode 606, and data relay mode 608. In each operational mode, the resource manager invokes various services. For example, in the voice mode 602, the resource manager invokes call discrimination 610, packet voice exchange 612, and packet tone exchange 614. The packet voice exchange 612 may employ numerous voice compression algorithms, including, among others, Linear 128 kbps, G.711 u-law/A-law 64 kbps (ITU Recommendation G.711 (1988)—Pulse code modulation (PCM) of voice frequencies), G.726 16/24/32/40 kbps (ITU Recommendation G.726 (12/90)—40, 32, 24, 16 kbit/s Adaptive Differential Pulse Code Modulation (ADPCM)), G.729A 8 kbps (Annex A (11/96) to ITU Recommendation G.729—Coding of speech at 8 kbit/s using conjugate structure algebraic-code-excited linear-prediction (CS-ACELP)—Annex A: Reduced complexity 8 kbit/s CS-ACELP speech CODEC), and G.723 5.3/6.3 kbps (ITU Recommendation G.723.1 (03/96)—Dual rate coder for multimedia communications transmitting at 5.3 and 6.3 kbit/s). The contents of each of the foregoing ITU Recommendations being incorporated herein by reference as if set forth in full.

The packet voice exchange 612 is common to both the voice mode 602 and the voiceband data mode 604. In the voiceband data mode 604, the resource manager invokes the packet voice exchange 602 for exchanging transparently data without modification (other than packetization) between the telephony device (or circuit switched network) and the packet based network. This is typically used for the exchange of fax and modem data when bandwidth concerns are minimal as an alternative to demodulation and remodulation. During the voiceband data mode 604, a human speech detector service 616 is also invoked by the resource manager. The human speech detector 616 monitors the signal from the near end telephony device for speech. In the event that speech is detected by the human speech detector 616, an event is forwarded to the resource manager which, in turn, causes the resource manager to terminate the human speech detector service 616 and invoke the appropriate services for the voice mode 602 (i.e., the call discriminator, the packet tone exchange, and the packet voice exchange).

In the fax relay mode 606, the resource manager invokes a packet fax data exchange 618 service. The packet fax exchange 618 may employ various data pumps including, among others, V.17 which can operate up to 14,400 bits per second, V.29 which uses a 1700-Hz carrier that is varied in both phase and amplitude, resulting in 16 combinations of 8 phases and 4 amplitudes which can operate up to 9600 bits per second, and V.27ter which can operate up to 4800 bits per second.

Likewise, the resource manager invokes a packet modem data exchange 620 service in the data relay mode 608. The packet modem data exchange 620 may employ various data pumps including, among others, V.22bis/V.22 with data rates up to 2400 bits per second, V.32bis/V.32 which enables full-duplex transmission at 14,400 bits per second, and V.34 which operates up to 33,600 bits per second. The ITU Recommendations setting forth the standards for the foregoing data pumps are incorporated herein by reference as if set forth in full.

In the described exemplary embodiment, the applications layer does not need to manage any service directly. The applications layer manages the session using high-level commands directed to the NetVHD, which in turn directly runs the services. However, the applications layer can access more detailed parameters of any service if necessary to change, by way of example, default functions for any particular application.

In operation, the user application layer opens the NetVHD and connects it to the appropriate PXD. The applications layer may then may configure various operational parameters of the NetVHD, including, among others, default voice compression (Linear, G.711, G.726, G.723.1, G.723.1A, G.729A, G.729B), fax data pump (Binary, V.17, V.29, V.27ter), and modem data pump (Binary, V.22bis, V.32bis, V.34). The applications layer then loads an appropriate signaling service (not shown) into the NetVHD, configures it and sets the NetVHD to the On-hook state.

In response to events from the signaling service (not shown) via the POTS telephone 108 (hookswitch) (see FIG. 1*a*), or signal packets from the far end, the applications layer will set the NetVHD to the appropriate off-hook state, typically voice mode. In an exemplary embodiment, if the signaling service event is triggered by the POTS telephone, the packet tone exchange will generate dial tone. Once a DTMF tone is detected, the dial tone is terminated. The DTMF tones are packetized and forwarded to the applications layer for transmission on the packet based network via the DOCSIS MAC and the upstream modulator. The packet tone exchange could also play ringing tone back to the POTS telephone (when a far end telephony device is being rung), and a busy tone if the far end telephony device is unavailable. Other tones may also be supported to indicate all circuits are busy, or an invalid sequence of DTMF digits were entered on the POTS telephone.

Once a connection is made between the POTS telephone and far end telephony devices, the call discriminator is responsible for differentiating between a voice and machine call by detecting the presence of a 2100 Hz. tone (as in the case when the telephony device is a fax or a modem), a 1100 Hz. tone or V.21 modulated high level data link control (HDLC) flags (as in the case when the telephony device is a fax). If a 1100 Hz. tone, or V.21 modulated HDLC flags are detected, a calling fax machine is recognized. The NetVHD then terminates the voice mode and invokes the packet fax exchange to process the call. If however, 2100 Hz tone is detected, the NetVHD terminates voice mode and invokes the packet data exchange.

The packet data exchange service further differentiates between a fax and modem by continuing to monitor the incoming signal for V.21 modulated HDLC flags, which if present, indicate that a fax connection is in progress. If HDLC flags are detected, the NetVHD terminates packet data exchange service and initiates packet fax exchange service. Otherwise, the packet data exchange service remains operative. In the absence of an 1100 or 2100 Hz. tone, or V.21 modulated HDLC flags the voice mode remains operative.

1.2.2.2.1. The Voice Mode

Voice mode provides signal processing of voice signals. Voice mode enables the transmission of voice over a packet based system such as Voice over IP (VoIP, H.323), Voice over Frame Relay (VoFR, FRF-11), Voice Telephony over ATM (VTOA), or any other WAN. The voice mode should also permit voice to be carried over traditional media such as time division multiplex (TDM) networks and voice storage and playback systems.

The PXDs for the voice mode provide echo cancellation, gain, and automatic gain control. The network VHD invokes numerous services in the voice mode including call discrimination, packet voice exchange, and packet tone exchange. These network VHD services operate together to provide: (1) an encoder system with DTMF detection, call progress tone detection, voice activity detection, voice compression, and comfort noise estimation, and (2) a decoder system with delay compensation, voice decoding, DTMF generation, comfort noise generation and lost frame recovery.

Figure 7:
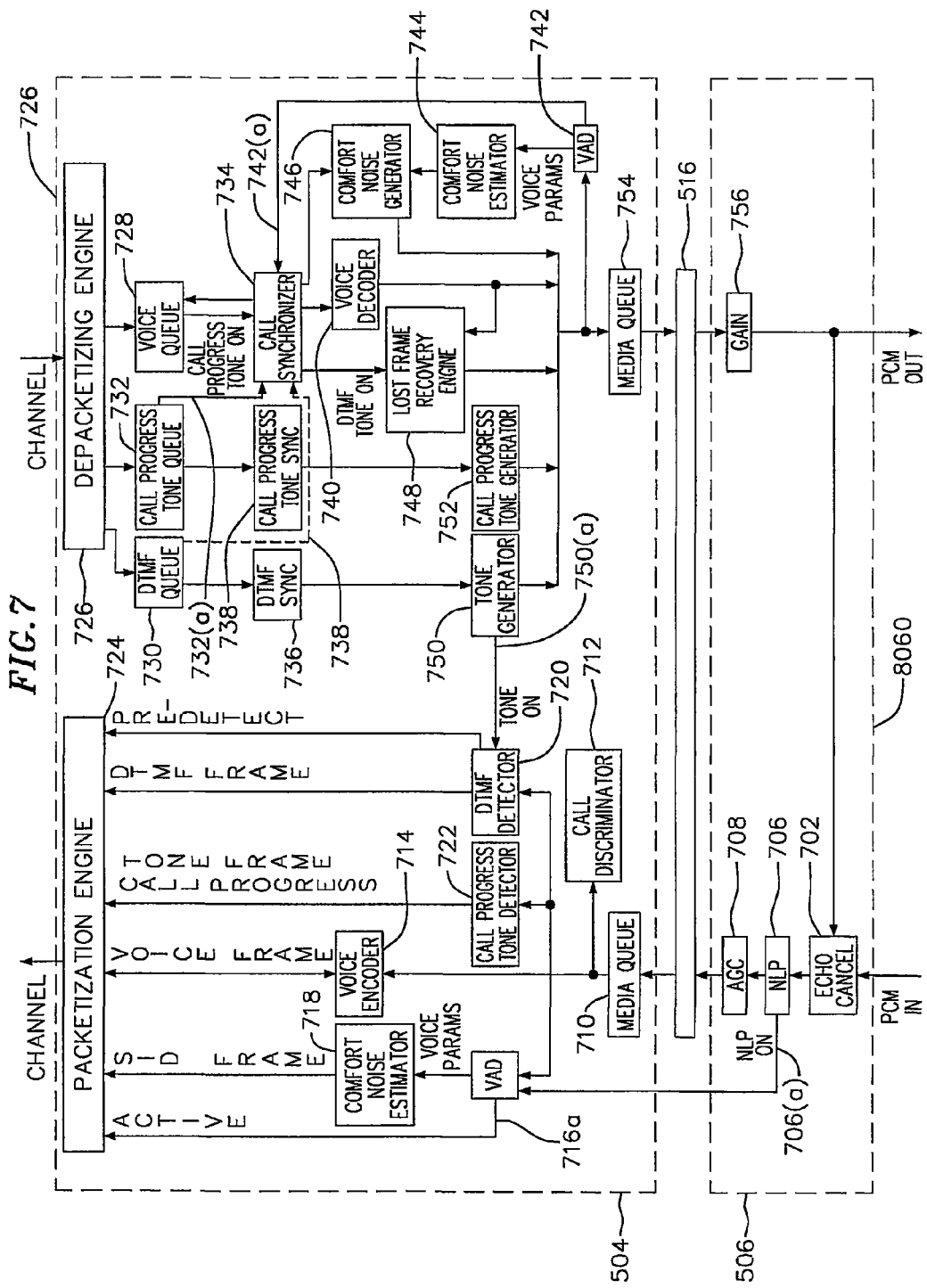
FIG. 7 is a system block diagram of an exemplary voice and data processor operating in a voice mode.

The services invoked by the network VHD in the voice mode and the associated PXD is shown schematically in FIG. 7. In the described exemplary embodiment, the PXD 506 provides two way communication with the POTS telephone 108 (see FIG. 1*a*) via the audio processor and the voice AFE (see FIG. 2). The incoming PCM signal from the audio processor is initially processed by the 506 to remove far end echos. As the name implies, echos in telephone systems is the return of the talker's voice resulting from the operation of the hybrid with its two-four wire conversion. If there is low end-to-end delay, echo from the far end is equivalent to sidetone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user.

An echo canceller 702 is used to remove echos from far end speech present on the incoming PCM signal before routing the incoming PCM signal back to the far end user over the WAN. The echo canceller 702 samples an outgoing PCM signal from the far end user and destined for the audio processor, filters it, and combines it with the incoming PCM signal. The echo canceller 702 may be followed by a nonlinear processor (NLP) 704 which mutes the digital voice samples when far end speech is detected in the absence of near end speech from the POTS telephone 108 (see FIG. 1*a*). The echo canceller 702 may also inject comfort noise which in the absence of near end speech from the POTS telephone may be roughly at the same level as the true background noise or at a fixed level.

After echo cancellation, the power level of the digital voice samples is normalized by an automatic gain control (AGC) 708 to ensure that the conversation is of an acceptable loudness. Alternatively, the AGC can be performed before the echo canceller 702, however, this approach would entail a more complex design because the gain would also have to be applied to the sampled outgoing PCM signal. In the described exemplary embodiment, the AGC 708 is designed to adapt slowly, although it should adapt fairly quickly if overflow or clipping is detected. The AGC adaptation should be held fixed if the NLP 706 is activated.

After AGC, the digital voice samples are placed in the media queue 710 in the network VHD 504 via the switchboard 516. In the voice mode, the network VHD 504 invokes three services, namely call discrimination, packet voice exchange, and packet tone exchange. The call discriminator 712 analyzes the digital voice samples from the media queue to determine whether a 2100 Hz, a 1100 Hz. tone or V.21 modulated HDLC flags are present. As described above with reference to FIG. 6, if either tone or HDLC flags are detected, the voice mode services are terminated and the appropriate service for fax or modem operation is initiated. In the absence of a 2100 Hz, a 1100 Hz. tone, or HDLC flags, the digital voice samples are coupled to the encoder system which includes a voice encoder 714, a voice activity detector (VAD)

716, a comfort noise estimator 718, a DTMF detector 720, a call progress tone detector 722 and a packetization engine 724.

Typical telephone conversations have as much as sixty percent silence or inactive content. Therefore, high bandwidth gains can be realized if digital voice samples are suppressed during these periods. The VAD 716, operating under the packet voice exchange, is used to accomplish this function. The VAD 716 attempts to detect digital voice samples that do not contain active speech. During periods of inactive speech, the comfort noise estimator 718 couples silence identifier (SID) packets to the packetization engine 724. The SID packets contain voice parameters that allow the reconstruction of the background noise at the far end.

From a system point of view, the VAD 716 may be sensitive to the change in the NLP 706. For example, when the NLP 706 is activated, the VAD 716 may immediately declare that voice is inactive. In that instance, the VAD 716 may have problems tracking the true background noise level. If the echo canceller 702 generates comfort noise during periods of inactive speech, it may have a different spectral characteristic from the true background noise. The VAD 716 may detect a change in noise character when the NLP 706 is activated (or deactivated) and declare the comfort noise as active speech. For these reasons, the VAD 716 should be disabled when the NLP 706 is activated. This is accomplished by a "NLP on" message 706a passed from the NLP 706 to the VAD 716.

The voice encoder 714, operating under the packet voice exchange, can be a straight 16 bit PCM encoder or any voice encoder which supports one or more of the standards promulgated by ITU. The encoded digital voice samples are formatted into a voice packet (or packets) by the packetization engine 724. These voice packets are formatted according to an applications protocol and outputted to the host (not shown). The voice encoder 714 is invoked only when digital voice samples with speech are detected by the VAD 716. Since the packetization interval may be a multiple of an encoding interval, both the VAD 716 and the packetization engine 724 should cooperate to decide whether or not the voice encoder 714 is invoked. For example, if the packetization interval is 10 msec and the encoder interval is 5 msec (a frame of digital voice samples is 5 ms), then a frame containing active speech should cause the subsequent frame to be placed in the 10 ms packet regardless of the VAD state during that subsequent frame. This interaction can be accomplished by the VAD 716 passing an "active" flag 716a to the packetization engine 724, and the packetization engine 724 controlling whether or not the voice encoder 714 is invoked.

In the described exemplary embodiment, the VAD 716 is applied after the AGC 708. This approach provides optimal flexibility because both the VAD 716 and the voice encoder 714 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated by reference as through set forth in full herein.

Operating under the packet tone exchange, a DTMF detector 720 determines whether or not there is a DTMF signal present at the POTS telephone 108 (see FIG. 1a). The DTMF detector 720 also provides a pre-detection flag 720a which indicates whether or not it is likely that the digital voice sample might be a portion of a DTMF signal. If so, the pre-detection flag 720a is relayed to the packetization engine 724 instructing it to begin holding voice packets. If the DTMF detector 720 ultimately detects a DTMF signal, the voice packets are discarded, and the DTMF signal is coupled to the packetization engine 724. Otherwise the voice packets are ultimately released from the packetization engine 724 to the applications layer (not shown). The benefit of this method is that there is only a temporary impact on voice packet delay when a DTMF signal is pre-detected in error, and not a constant buffering delay. Whether voice packets are held while the pre-detection flag 720a is active could be adaptively controlled by the user application layer.

Similarly, a call progress tone detector 722 also operates under the packet tone exchange to determine whether a precise signaling tone is present at the near end. Call progress tones are those which indicate what is happening to dialed phone calls. Conditions like busy line, ringing called party, bad number, and others each have distinctive tone frequencies and cadences assigned them. The call progress tone detector 722 monitors the call progress state, and forwards a call progress tone signal to the packetization engine to be packetized and transmitted across the packet based network. The call progress tone detector may also provide information regarding the hook status of the POTS telephone 108 (see FIG. 1a) which is relevant to the signal processing tasks. If the hook status is on hook, the VAD should preferably mark all frames as inactive, DTMF detection should be disabled, and SID packets should only be transferred if they are required to keep the connection alive.

The decoding system of the network VHD 504 essentially performs the inverse operation of the encoding system. The decoding system of the network VHD 504 comprises a depacketizing engine 726, a voice queue 728, a DTMF queue 730, a call progress tone queue 732, a voice synchronizer 734, a DTMF synchronizer 736, a call progress tone synchronizer 738, a voice decoder 740, a VAD 742, a comfort noise estimator 744, a comfort noise generator 746, a lost packet recovery engine 748, a tone generator 750, and a call progress tone generator 752.

The depacketizing engine 726 identifies the type of packets received from the host (i.e., voice packet, DTMF packet, call progress tone packet, SID packet), transforms them into frames which are protocol independent. The depacketizing engine 726 then transfers the voice frames (or voice parameters in the case of SID packets) into the voice queue 728, transfers the DTMF frames into the DTMF queue 730 and transfers the call progress tones into the call progress tone queue 732. In this manner, the remaining tasks are, by and large, protocol independent.

A jitter buffer is utilized to compensate for network impairments such as delay jitter caused by packets not arriving at the same time or in the same order in which they were transmitted. In addition, the jitter buffer compensates for lost packets that occur on occasion when the network is heavily congested. In the described exemplary embodiment, the jitter buffer for voice includes the voice synchronizer 734 that operates in conjunction with the voice queue 728 to provide an isochronous stream of voice frames to the voice decoder 740.

Sequence numbers embedded into the voice packets at the far end can be used to detect lost packets, packets arriving out of order, and short silence periods. The voice synchronizer 734 can analyze the sequence numbers, enabling the comfort noise generator 746 during short silence periods and performing voice frame repeats via the lost packet recovery engine 748 when voice packets are lost. SD packets can also be used as an indicator of silent periods causing the voice synchronizer 734 to enable the comfort noise generator 746. Otherwise, during far end active speech, the voice synchronizer 734 couples voice frames from the voice queue 728 in an isochronous stream to the voice decoder 740. The voice decoder 740 decodes the voice frames into digital voice samples suitable for the audio processor, such as a 64 kb/s PCM signal for a PSTN line. The output of the voice decoder 740 (or the comfort noise generator 746 or lost packet recovery engine 748 if enabled) is written into a media queue 754 for transmission to the PXD 506.

The comfort noise generator 746 provides background noise to the POTS telephone 108 (see FIG. 1a) during silent periods. If the protocol supports SID packets, (and these are supported for VTOA, FRF-11, and VoIP), the comfort noise estimator at the far end encoding system should transmit SID packets. Then, the background noise can be reconstructed by the near end comfort noise generator 746 from the voice parameters in the SID packets buffered in the voice queue 728. However, for some protocols, namely, FRF-11, the SID packets are optional, and other far end users may not support SID packets at all. In these systems, the voice synchronizer 8090 must continue to operate properly. In the absence of SID packets, the voice parameters of the background noise at the far end can be determined by running the VAD 742 at the voice decoder 740 in series with the comfort noise estimator 744.

In the described exemplary embodiment, the voice synchronizer 734 is not dependent upon sequence numbers embedded in the voice packet. The voice synchronizer 734 can invoke a number of mechanisms to compensate for delay jitter in these systems. For example, the voice synchronizer 734 can assume that the voice queue 728 is in an underflow condition due to excess jitter and perform packet repeats by enabling the lost frame recovery engine 748. Alternatively, the VAD 742 at the voice decoder 740 can be used to estimate whether or not the underflow of the voice queue 728 was due to the onset of a silence period or due to packet loss. In this instance, the spectrum and/or the energy of the digital voice samples can be estimated and the result 742a fed back to the voice synchronizer 734. The voice synchronizer 734 can then invoke the lost packet recovery engine 748 during voice packet losses and the comfort noise generator 746 during silent periods.

When DTMF packets arrive, they are depacketized by the depacketizing engine 726. DTMF frames at the output of the depacketizing engine 726 are written into the DTMF queue 730. The DTMF synchronizer 736 couples the DTMF frames from the DTMF queue 730 to the tone generator 750. Much like the voice synchronizer, the DTMF synchronizer 736 is employed to provide an isochronous stream of DTMF frames to the tone generator 750. Generally speaking, when DTMF packets are being transferred, voice frames should be suppressed. To some extent, this is protocol dependent. However, the capability to flush the voice queue 728 to ensure that the voice frames do not interfere with DTMF generation is desirable. Essentially, old voice frames which may be queued are discarded when DTMF packets arrive. This will ensure that there is a significant inter-digit gap before DTMF tones are generated. This is achieved by a "tone present" message 730a passed between the DTMF queue and the voice synchronizer 734.

The tone generator 750 converts the DTMF signals into a DTMF tone suitable for the POTS telephone 108 (see FIG. 1a). The tone generator 750 overwrites the media queue 754 to prevent leakage through the voice path and to ensure that the DTMF tones are not too noisy.

There is also a possibility that DTMF tone may be fed back as an echo into the DTMF detector 720. To prevent false detection, the DTMF detector 720 can be disabled entirely (or disabled only for the digit being generated) during DTMF tone generation. This is achieved by a "tone on" message 750a passed between the tone generator 750 and the DTMF detector 720. Alternatively, the NLP 706 can be activated while generating DTMF tones.

When call progress tone packets arrive, they are depacketized by the depacketizing engine 726. Call progress tone frames at the output of the depacketizing engine 726 are written into the call progress tone queue 732. The call progress tone synchronizer 738 couples the call progress tone frames from the call progress tone queue 732 to a call progress tone generator 752. Much like the DTMF synchronizer, the call progress tone synchronizer 738 is employed to provide an isochronous stream of call progress tone frames to the call progress tone generator 752. And much like the DTMF tone generator, when call progress tone packets are being transferred, voice frames should be suppressed. To some extent, this is protocol dependent. However, the capability to flush the voice queue 728 to ensure that the voice frames do not interfere with call progress tone generation is desirable. Essentially, old voice frames which may be queued are discarded when call progress tone packets arrive to ensure that there is a significant inter-digit gap before call progress tones are generated. This is achieved by a "tone present" message 732a passed between the call progress tone queue 732 and the voice synchronizer 734.

The call progress tone generator 752 converts the call progress tone signals into a call progress tone suitable for the POTS telephone 108 (see FIG. 1a). The call progress tone generator 752 overwrites the media queue 754 to prevent leakage through the voice path and to ensure that the call progress tones are not too noisy.

The outgoing PCM signal in the media queue 754 is coupled to the PXD 506 via the switchboard 516. The outgoing PCM signal is coupled to an amplifier 756 before being outputted on the PCM output line to the audio processor (see FIG. 2).

An exemplary voice signal processor is disclosed U.S. patent application Ser. No. 09/522,185, entitled "Voice and Data Exchange Over a Packet Based Network," the contents of which is hereby incorporated by reference as though fully set forth herein.

1.2.2.2.2. The Fax Relay Mode

Fax relay mode provides signal processing of fax signals. Fax relay mode enables the transmission of fax signals over a packet based system such as VoIP, VoFR, FRF-11, VTOA, or any other proprietary network. For the purposes of explanation, first fax machine is called a sending fax that is connected to the sending network gateway through a PSTN. The sending network gateway is connected to a cable head end via a HFC network. Additional fax machines may be on line connections coupled to the other end of the cable head end via a network gateway and a HFC network, or off line connections, coupled to the cable head end CMTS for example by a telephone residential gateway and a PSTN.

In the described exemplary embodiment, the residential gateway is shown only with a POTS telephone 108 (see FIG. 1a) coupled directly to the residential gateway. However, those skilled in the art will appreciate that additional POTS telephone can be connected to the residential gateway. Moreover, one or more fax machines can be connected directly to the residential gateway with additional subscriber ports. The additional fax machines should each have their own subscriber port, however, those skilled in the art will further recognize that one or more fax machines may share a common subscriber port using conventional multi-access techniques such as time-division multi-access or frequence-division multi-access. In applications supporting a fax machine connected directly to the residential gateway, fax signals between the near end fax machine and a far end fax machine will interface through the voice and data processor in the fax relay mode, the audio processor and the voice AFE (seeb FIG. 2).

The transfer of fax signals over packet based networks may be accomplished by at least three alternative methods. In the first method, fax data signals are exchanged in real time. Typically, the sending and receiving fax machines are spoofed to allow transmission delays plus jitter of up to about 1.2 seconds. The second, store and forward mode, is a non real time method of transferring fax data signals. Typically, the fax communication is transacted locally, stored into memory and transmitted to the destination fax machine at a subsequent time. The third mode is a combination of store and forward mode with minimal spoofing to provide an approximate emulation of a typical fax connection.

In the fax relay mode, the network VHD invokes the packet fax data exchange. The packet fax data exchange provides demodulation and re-modulation of fax data signals. This approach results in considerable bandwidth savings since only the underlying unmodulated data signals are transmitted across the packet based network. The packet fax data exchange also provides compensation for network jitter with a jitter buffer similar to that invoked in the packet voice exchange. Additionally, the packet fax data exchange compensates for lost data packets with error correction processing. Spoofing may also be provided during various stages of the procedure between the fax machines to keep the connection alive.

The packet fax data exchange is divided into two basic functional units, a demodulation system and a re-modulation system. In the demodulation system, the network VHD couples fax data signals from a circuit switched network, or a fax machine, to the packet based network. In the re-modulation system, the network VHD couples fax data signals from the packet network to the switched circuit network, or a fax machine directly.

During real time relay of fax data signals over a packet based network, the sending and receiving fax machines are spoofed to accommodate network delays plus jitter. Typically, the packet fax data exchange can accommodate a total delay of up to about 1.2 seconds. Preferably, the packet fax data exchange supports error correction mode (ECM) relay functionality, although a full ECM implementation is typically not required. In addition, the packet fax data exchange should preferably preserve the typical call duration required for a fax session over a PSTN/ISDN when exchanging fax data signals between two terminals.

Figure 8:
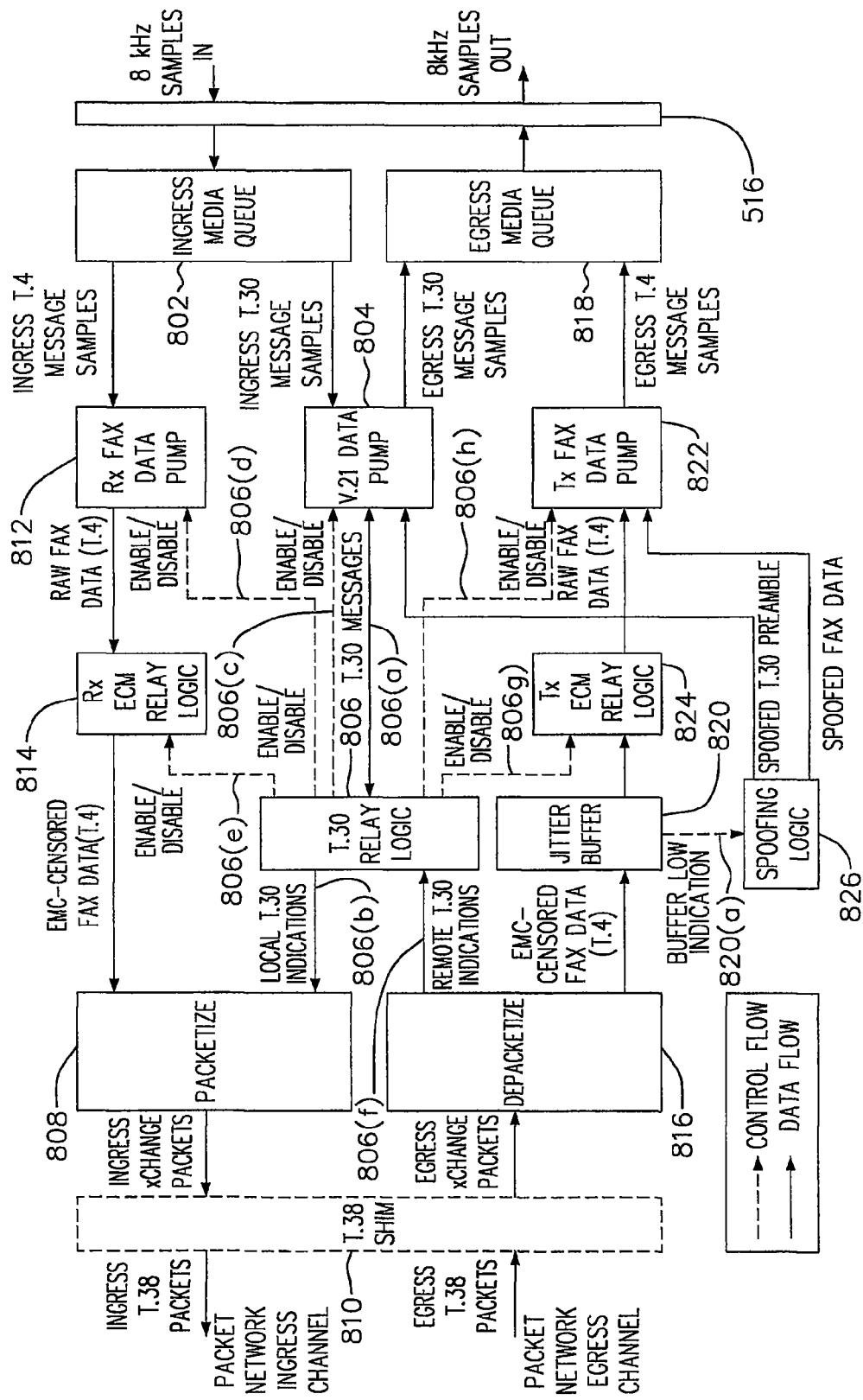
FIG. 8 is a system block diagram of an exemplary voice and data processor operating in a real time fax relay mode.

The packet fax data exchange for the real time exchange of fax data signals between a circuit switched network and a packet based network is shown schematically in FIG. 8. In this exemplary embodiment, a connecting PXD (not shown) connecting the fax machine to the switch board 8032' is transparent, although those skilled in the art will appreciate that various signal conditioning algorithms could be programmed into PXD such as echo cancellation and gain.

After the PXD (not shown), the incoming fax data signal is coupled to the demodulation system of the packet fax data exchange operating in the network VHD via the switchboard 516.

The incoming fax data signal is received and buffered in an ingress media queue 802. A V.21 data pump 804 demodulates incoming T.30 message so that T.30 relay logic 806 can decode the received T.30 messages 806a. Local T.30 indications 806b are packetized by a packetization engine 808 and if required, translated into T.38 packets via a T.38 shim 810 for transmission to a T.38 compliant remote network gateway (not shown) across the packet based network. The V.21 data pump 804 is selectively enabled/disabled 806c by the T.30 relay logic 806 in accordance with the reception/transmission of the T.30 messages or fax data signals. The V.21 data pump 804 is common to the demodulation and re-modulation system. The V.21 data pump 804 communicates T.30 messages such as for example called station tone (CED) and calling station tone (CNG) to support fax setup between a local fax device (not shown) and a remote fax device (not shown) via the remote network gateway.

The demodulation system further includes a receive fax data pump 812 which demodulates the fax data signals during the data transfer phase. The receive fax data pump 812 supports the V.27ter standard for fax data signal transfer at 2400/4800 bps, the V.29 standard for fax data signal transfer at 7200/9600 bps, as well as the V.17 standard for fax data signal transfer at 7200/9600/12000/14400 bps. The V.34 fax standard, once approved, may also be supported. The T.30 relay logic 806 enables/disables 806d the receive fax data pump 812 in accordance with the reception of the fax data signals or the T.30 messages.

If error correction mode (ECM) is required, receive ECM relay logic 814 performs high level data link control (HDLC) de-framing, including bit de-stuffing and preamble removal on ECM frames contained in the data packets. The resulting fax data signals are then packetized by the packetization engine 808 and communicated across the packet based network. The T.30 relay logic 806 selectively enables/disables 806e the receive ECM relay logic 814 in accordance with the error correction mode of operation.

In the re-modulation system, if required, incoming data packets are first translated from a T.38 packet format to a protocol independent format by the T.38 packet shim 810. The data packets are then de-packetized by a depacketizing engine 816. The data packets may contain T.30 messages or fax data signals. The T.30 relay logic 806 reformats the remote T.30 indications 806f and forwards the resulting T.30 indications to the V.21 data pump 804. The modulated output of the V.21 data pump 804 is forwarded to an egress media queue 818 for transmission in either analog format or after suitable conversion, as 64 kbps PCM samples to a local fax device.

De-packetized fax data signals are transferred from the depacketizing engine 816 to a jitter buffer 820. If error correction mode (ECM) is required, transmitting ECM relay logic 824 performs HDLC de-framing, including bit stuffing and preamble addition on ECM frames. The transmitting ECM relay logic 824 forwards the fax data signals, (in the appropriate format) to a transmit fax data pump 822 which modulates the fax data signals and outputs 8 KHz digital samples to the egress media queue 818. The T.30 relay logic selectively enables/disables (8394g) the transmit ECM relay logic 824 in accordance with the error correction mode of operation.

The transmit fax data pump 822 supports the V.27ter standard for fax data signal transfer at 2400/4800 bps, the V.29 standard for fax data signal transfer at 7200/9600 bps, as well as the V.17 standard for fax data signal transfer at 7200/9600/12000/14400 bps. The T.30 relay logic selectively enables/disables (8394h) the transmit fax data pump 8414 in accordance with the transmission of the fax data signals or the T.30 message samples.

If the jitter buffer 820 underflows, a buffer low indication 820a is coupled to spoofing logic 826. Upon receipt of a buffer low indication during the fax data signal transmission, the spoofing logic 826 inserts "spoofed data" at the appropriate place in the fax data signals via the transmit fax data pump 822 until the jitter buffer 820 is filled to a pre-determined level, at which time the fax data signals are transferred out of the jitter buffer 8200. Similarly, during the transmission of the T.30 message indications, the spoofing logic 826 can insert "spoofed data" at the appropriate place in the T.30 message samples via the V.21 data pump 804.

An exemplary fax relay is disclosed U.S. patent application Ser. No. 09/522,185, entitled "Voice and Data Exchange Over a Packet Based Network," the contents of which has been previously incorporated herein by reference.

1.2.2.2.3. Data Relay Mode

Data relay mode provides full duplex signal processing of data signals. Data relay mode enables the transmission of data signals over a packet based system such as VoIP, VoFR, FRF-11, VTOA, or any other proprietary network. The data relay mode should also permit data signals to be carried over traditional media such as TDM. The described exemplary embodiment of the residential gateway support the exchange of data signals with other network gateways via an HFC network and cable head end or off line devices via for example a circuit switched network such as the PSTN. By way of example, the Netscape computer 130 described in connection with FIG. 1*a* can communicate with another far end device using an internal modem and the residential gateway to access the WAN. The internal modem causes the voice and data processor in the residential gateway to invoke the packet modem data exchange for this purpose. For the purposes of explanation, the internal modem is referred to as a call modem. Far end modems are typically called answer modems.

In data relay mode, a local modem connection is established on each end of the packet based network. That is, the call modem and the residential gateway of FIG. 1*a* establish a local modem connection, as does the destination answer modem and its respective answer network gateway. Next, data signals are relayed across the packet based network. The voice and data processor in the residential gateway demodulates the data signal and formats the demodulated data signal for the particular packet based network. The answer network gateway compensates for network impairments and remodulates the encoded data in a format suitable for the destination answer modem. This approach results in considerable bandwidth savings since only the underlying demodulated data signals are transmitted across the packet based network.

In the data relay mode, the packet data modem exchange provides demodulation and modulation of data signals. With full duplex capability, both modulation and demodulation of data signals can be performed simultaneously. The packet data modem exchange also provides compensation for network jitter with a jitter buffer similar to that invoked in the packet voice exchange. Additionally, the packet data modem exchange compensates for system clock jitter between modems with a dynamic phase adjustment and resampling mechanism. Spoofing may also be provided during various stages of the call negotiation procedure between the modems to keep the connection alive.

Figure 9:
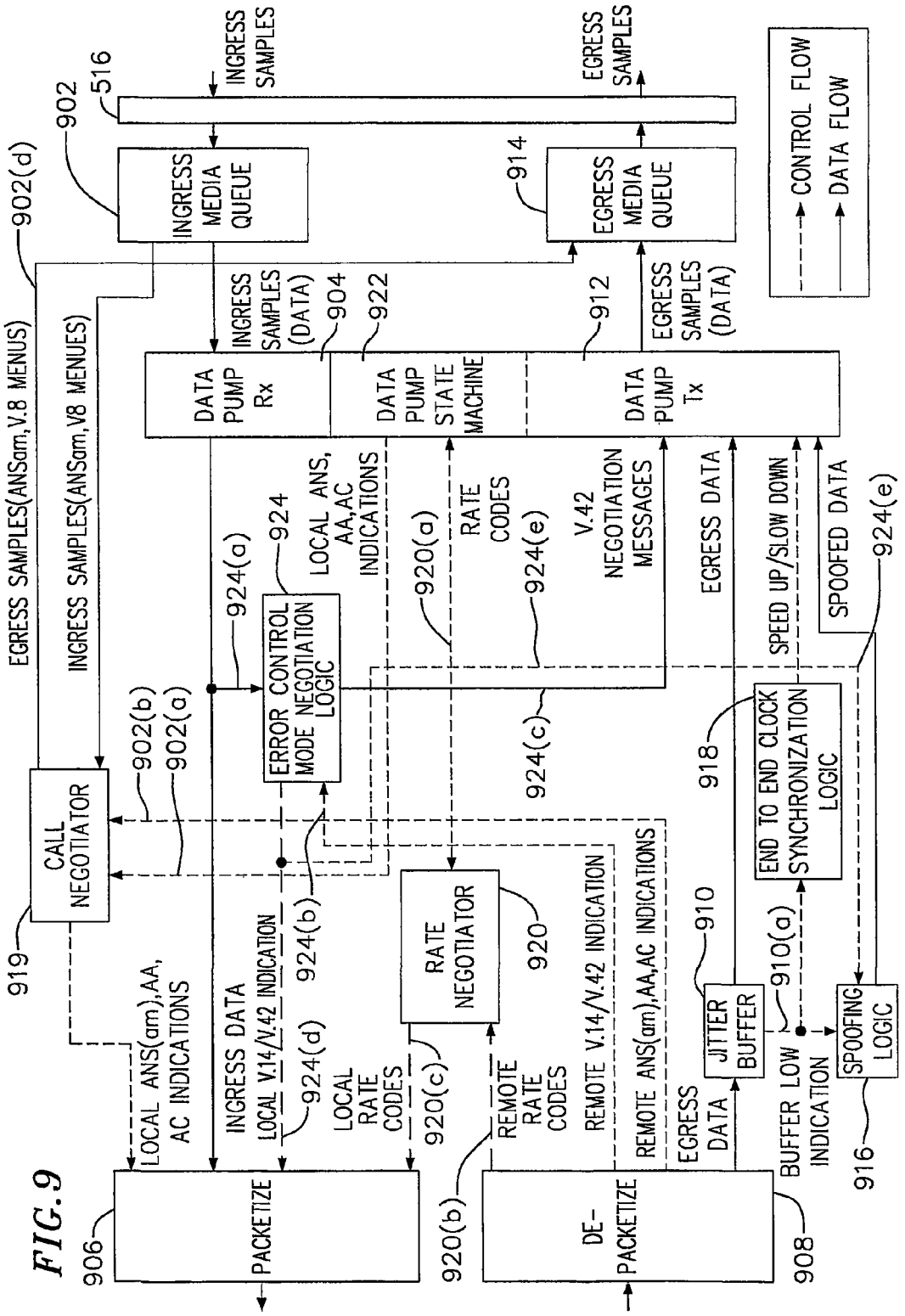
FIG. 9 is a system block diagram of an exemplary voice and data processor operating in a modem relay mode.

The packet data modem exchange invoked by the network VHD in the data relay mode is shown schematically in FIG. 9. In the described exemplary embodiment, a connecting PXD (not shown) connecting a modem to the switch board 516 is transparent, although those skilled in the art will appreciate that various signal conditioning algorithms could be programmed into the PXD such as filtering, echo cancellation and gain.

After the PXD, the data signals are coupled to the network VHD via the switchboard 516. The packet data modem exchange provides two way communication between the internal modem of the netscape computer and the packet based network with two basic functional units, a demodulation system and a remodulation system. In the demodulation system, the network VHD exchanges data signals from the internal modem to the packet based network. In the remodulation system, the network VHD exchanges data signals from the packet based network to the internal modem.

In the demodulation system, the data signals are received and buffered in an ingress media queue 902. A data pump receiver 904 demodulates the data signals from the ingress media queue 8500. The data pump receiver 904 supports the V.22bis standard for the demodulation of data signals at 1200/2400 bps; the V.32bis standard for the demodulation of data signals at 4800/7200/9600/12000/14400 bps, as well as the V.34 standard for the demodulation of data signals up to 33600 bps. Moreover, the V.90 standard may also be supported. The demodulated data signals are then packetized by the packetization engine 906 and coupled to the DOCSIS MAC.

In the remodulation system, packets of data signals from the packet based network are first depacketized by a depacketizing engine 908 and stored in a jitter buffer 910. A data pump transmitter 912 modulates the buffered data signals with a voiceband carrier. The modulated data signals are in turn stored in the egress media queue 914 before being output to the PXD (not shown) via the switchboard 516. The data pump transmitter 912 supports the V.22bis standard for the transfer of data signals at 1200/2400 bps; the V.32bis standard for the transfer of data signals at 4800/7200/9600/12000/14400 bps, as well as the V.34 standard for the transfer of data signal up to 33600 bps. Moreover, the V.90 standard may also be supported.

During jitter buffer underflow, the jitter buffer 910 sends a buffer low indication 910*a* to spoofing logic 916. When the spoofing logic 916 receives the buffer low signal indicating that the jitter buffer 910 is operating below a predetermined threshold level, it inserts spoofed data at the appropriate place in the data signal via the data pump transmitter 912. Spoofing continues until the jitter buffer 910 is filled to the predetermined threshold level, at which time data signals are again transferred from the jitter buffer 910 to the data pump transmitter 912.

End to end clock logic 918 also monitors the state of the jitter buffer 910. The clock logic 918 controls the data transmission rate of the data pump transmitter 912 in correspondence to the state of the jitter buffer 910. When the jitter buffer 910 is below a predetermined threshold level, the clock logic 918 reduces the transmission rate of the data pump transmitter 912. Likewise, when the jitter buffer 910 is above a predetermined threshold level, the clock logic 918 increases the transmission rate of the data pump transmitter 912.

Before the transmission of data signals across the packet based network, the connection between the two modems must first be negotiated through a handshaking sequence. This entails a two-step process. First, a call negotiator 919 determines the type of modem (i.e., V.22, V.32bis, V.34, V.90, etc.) connected to each end of the packet based network. Second, a rate negotiator 920 negotiates the data signal transmission rate between the two modems.

The call negotiator 919 determines the type of modem connected locally, as well as the type of modem connected remotely via the packet based network. The call negotiator 919 utilizes V.25 automatic answering procedures and V.8 auto-baud software to automatically detect modem capability. The call negotiator 919 receives protocol indication signals 8502*a* (ANSam and V.8 menus) from the ingress media queue 902, as well as AA, AC and other message indications 919*b* from the local modem via a data pump state machine 922, to determine the type of modem in use locally. The call negotiator 919 relays the ANSam answer tones and other indications 919*e* from the data pump state machine 922 to the remote modem via a packetization engine 906. The call negotiator also receives ANSam, AA, AC and other indications 919*c* from a remote modem (not shown) located on the opposite end of the packet based network via a depacketizing engine 908. The call negotiator 919 relays ANSam answer tones and other indications 919*d* to a local modem (not shown) via an egress media queue 914 of the modulation system. With the ANSam, AA, AC and other indications from the local and remote modems, the call negotiator 919 can then negotiate a common standard (i.e., V.22, V.32bis, V.34, V.90, etc.) in which the data pumps must communicate with the local modem and the remote modems.

The packet data modem exchange preferably utilizes indication packets as a means for communicating answer tones, AA, AC and other indication signals across the packet based network However, the packet data modem exchange supports data pumps such as V.22bis and V.32bis which do not include a well defined error recovery mechanism, so that the modem connection may be terminated whenever indication packets are lost. Therefore, either the packet data modem exchange or the application layer should ensure proper delivery of indication packets when operating in a network environment that does not guarantee packet delivery.

The packet data modem exchange can ensure delivery of the indication packets by periodically retransmitting the indication packet until some expected packets are received. For example, in V.32bis relay, the call negotiator operating under the packet data modem exchange on the answer network gateway periodically retransmits ANSam answer tones from the answer modem to the call modem, until the calling modem connects to the line and transmits carrier state AA.

Alternatively, the packetization engine can embed the indication information directly into the packet header. In this approach, an alternate packet format is utilized to include the indication information. During modem handshaking, indication packets transmitted across the packet based network include the indication information, so that the system does not rely on the successful transmission of individual indication packets. Rather, if a given packet is lost, the next arriving packet contains the indication information in the packet header. Both methods increase the traffic across the network. However, it is preferable to periodically retransmit the indication packets because it has less of a detrimental impact on network traffic.

The rate negotiator 920 synchronizes the connection rates at the network gateways. The rate negotiator receives rate control codes 920*a* from the local modem via the data pump state machine 922 and rate control codes 920*b* from the remote modem via the depacketizing engine 908. The rate negotiator 920 also forwards the remote rate control codes 920*a* received from the remote modem to the local modem via commands sent to the data pump state machine 922. The rate negotiator 920 forwards the local rate control codes 920*c* received from the local modem to the remote modem via the packetization engine 906. Based on the exchanged rate codes the rate negotiator 920 establishes a common data rate between the calling and answering modems. During the data rate exchange procedure, the jitter buffer 910 should be disabled by the rate negotiator 920 to prevent data transmission between the call and answer modems until the data rates are successfully negotiated.

Similarly error control (V.42) and data compression (V.42bis) modes should be synchronized at each end of the packet based network. Error control logic 924 receives local error control messages 924*a* from the data pump receiver 904 and forwards those V.14/V.42 negotiation messages 924*c* to the remote modem via the packetization engine 906. In addition, error control logic 924 receives remote V.14/V.42 indications 924*b* from the depacketizing engine 908 and forwards those V.14/V.42 indications 924*d* to the local modem. With the V.14/V.42 indications from the local and remote modems, the error control logic 924 can negotiate a common standard to ensure that the network gateways utilize a common error protocol. In addition, error control logic 924, communicates the negotiated error control protocol 924(*e*) to the spoofing logic 916 to ensure data mode spoofing is in accordance with the negotiated error control mode.

V.42 is a standard error correction technique using advanced cyclical redundancy checks and the principle of automatic repeat requests (ARQ). In accordance with the V.42 standard, transmitted data signals are grouped into blocks and cyclical redundancy calculations add error checking words to the transmitted data signal stream. The receiving modem calculates new error check information for the data signal block and compares the calculated information to the received error check information. If the codes match, the received data signals are valid and another transfer takes place. If the codes do not match, a transmission error has occurred and the receiving modem requests a repeat of the last data block. This repeat cycle continues until the entire data block has been received without error.

Various voiceband data modem standards exist for error correction and data compression. V.42bis and MNP5 are examples of data compression standards. The handshaking sequence for every modem standard is different so that the packet data modem exchange should support numerous data transmission standards as well as numerous error correction and data compression techniques.

An exemplary data relay is disclosed U.S. patent application Ser. No. 09/522,185, entitled "Voice and Data Exchange Over a Packet Based Network," the contents of which has been previously incorporated herein by reference.

1.3 HomePNA Controller and AFE

Figure 10:
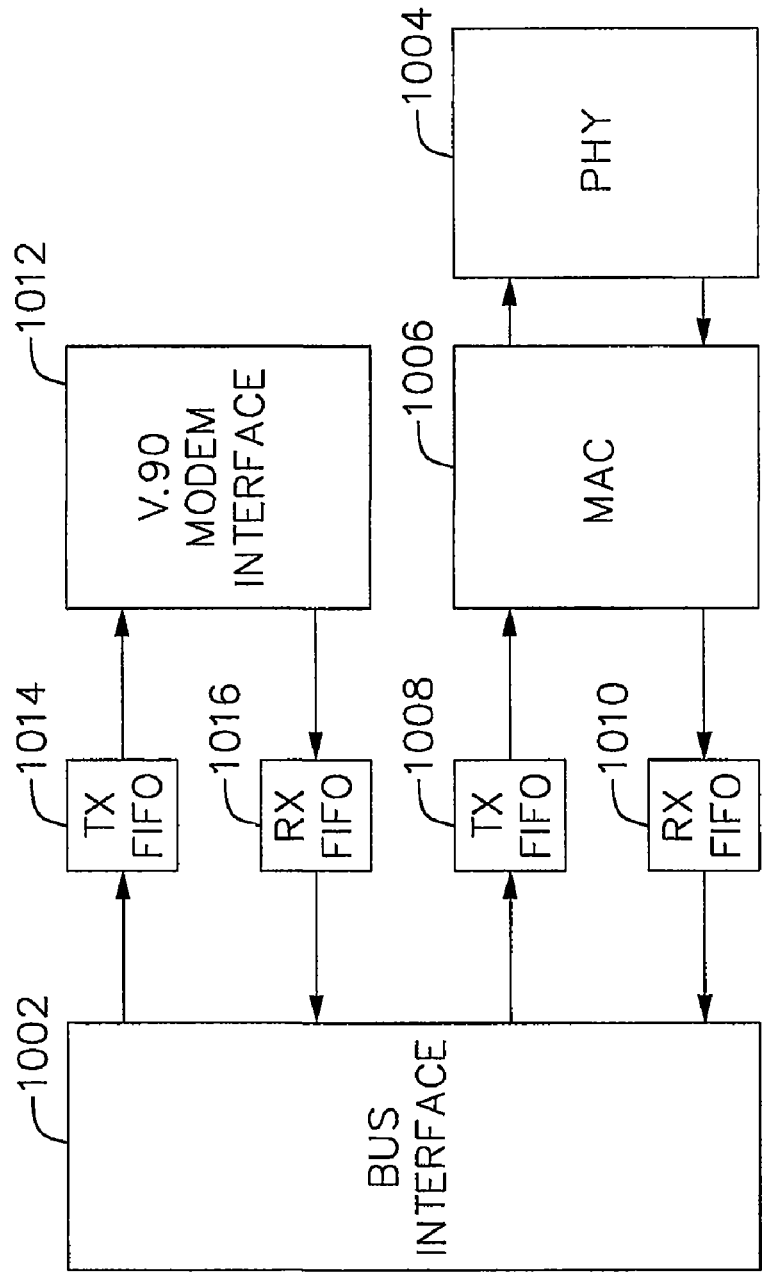
FIG. 10 is a system block diagram of an exemplary HomePNA controller.

The HomePNA controller and the AFE provides the interface between the voice and data processor and the HomePNA LAN (see FIG. 1*a*). Referring to FIG. 10, the exemplary HomePNA controller 138 (see FIG. 1*a*) can be a fully integrated MAC/PHY that transmits and receives data over the HomePNA LAN. In the described exemplary embodiment, the HomePNA controller includes a bus interface 1002, such as a PCI or MSI bus interface for communication in accordance with well-known PC-based and/or peripheral/internet appliance architectures.

The digital PHY 1004 having a FDQAM/QAM transmitter and receiver interfacing an AFE (not shown) with a MAC 1006. The HomePNA PHY uses 4 MBaud QAM modulation and 2 MBaud Frequency Diverse QAM (FDQAM), with two to eight bits-per-Baud constellation encoding. The PHY-layer payload modulation rate therefor ranges from 4 Mb/s to 32 Mb/s. The modulation techniques are set forth in U.S. patent application Ser. No. 09/169,552 entitled "Frequency Diverse Single Carrier Modulation For Robust Communication Over In-Premises Wiring", which is expressly incorporated herein by reference as though set forth in full. Information is transmitted on the HomePNA LAN in bursts. Each burst or physical layer frame consists of PHY-layer payload information encapsulated with a PHY preamble, header and postamble. The PHY-layer payload in each physical frame is that part of the Ethernet Link Level frame that follows the Ethertype field through the Frame Check Sequence (FCS), plus a CRC-16 and a pad field for the 4 Mbaud rate. Hereafter, "payload" refers to the PHY-layer payload unless otherwise specified.

The MAC 1106 is modeled after the carrier-sense multiple-access with collision detection (CSMA/CD) MAC function of Ethernet (IEEE Std 802.3, 1998 Edition), adapted to the V2 PHY and enhanced with quality-of-service (QoS) features. The Carrier Sense Multiple Access/Collision Detect (CSMA/CD) media access method is the means by which two or more stations share a common transmission channel. To transmit, a station waits (defers) for a quiet period on the channel (that is, no other station is transmitting) and then sends the intended message modulated as per the PHY characteristics. The transmission deferral is ordered by up to eight priority levels, implementing absolute priority among stations contending for access. If, after initiating a transmission, the message collides with that of another station, then each transmitting station ceases transmission and resolves the collision by choosing a backoff level and defers to other stations that have chosen a lower backoff level. The distributed algorithm for choosing backoff level tightly bounds the access latency.

The exemplary MAC 1006 therefore includes carrier sense logic, collision detection logic, and CSMA/CD collision resolution/rx frame synchronization logic. Carrier sense logic detects the starting and ending times of a valid frame transmission on the wire. This is used to determine when frames are present on the channel/transmission medium, as well as being used to determine the presence of a backoff signal in a signal slot. Collision detection logic detects the presence of a valid frame transmission from some other station during an active transmission, and for all stations, including non-transmitting stations, detects the received fragment that represents a transmission truncated by a collision. Collision resolution logic implements the distributed algorithm that controls backoff.

In the downstream direction the HomePNA controller 138 interfaces with the MIPS core 228 via a bus interface that is couple to the ISB 118. The MAC 1006 encapsulates messages with a data layer header and start of frame (SOF) indicator. The MAC 1006 may also add data trailer and end of frame indicators. The MAC header may include a source address (SA) to identify the node sending the message, and may also include a destination address (DA) to identify the intended recipient or group of recipients. The message with appended headers, trailers and indicators is then passed to the physical layer where it is passed on to network transmission medium through the network port of the residential gateway. In the upstream direction the reverse process occurs wherein the MAC 1006 receives messages from the physical layer and the MAC 1006 strips off the header and/or trailer information and places the message in system memory (SDRAM) 214 via the MIPS core 228 and ISB 218 for transmission upstream to the cable head end.

The MAC 1006 is coupled to the bus interface 1002 through a transmit (TX) FIFO 1008 and receive (RX) FIFO 1010. The bus interface 1002 is used to coupled HomePNA packets from the (RX) FIFO 1010 to system memory by the ISB 218 (see FIG. 2). Similarly, the bus interface 1002 is used to coupled HomePNA packets from system memory via the ISB and bus interface 1002 into the (TX) FIFO 1008. A transmit state machine initiates transmission of the HomePNA packets to the MAC/PHY when a FIFO watermark is reached or an end of packet is received. The bus interface 1002 also has the capability of similarly communicating with other devices, such as a V.90 modem through V.90 modem interface 1012 and its respective transmit (TX) FIFO 1014 and receive (RX) FIFO 1016.

Figure 11:
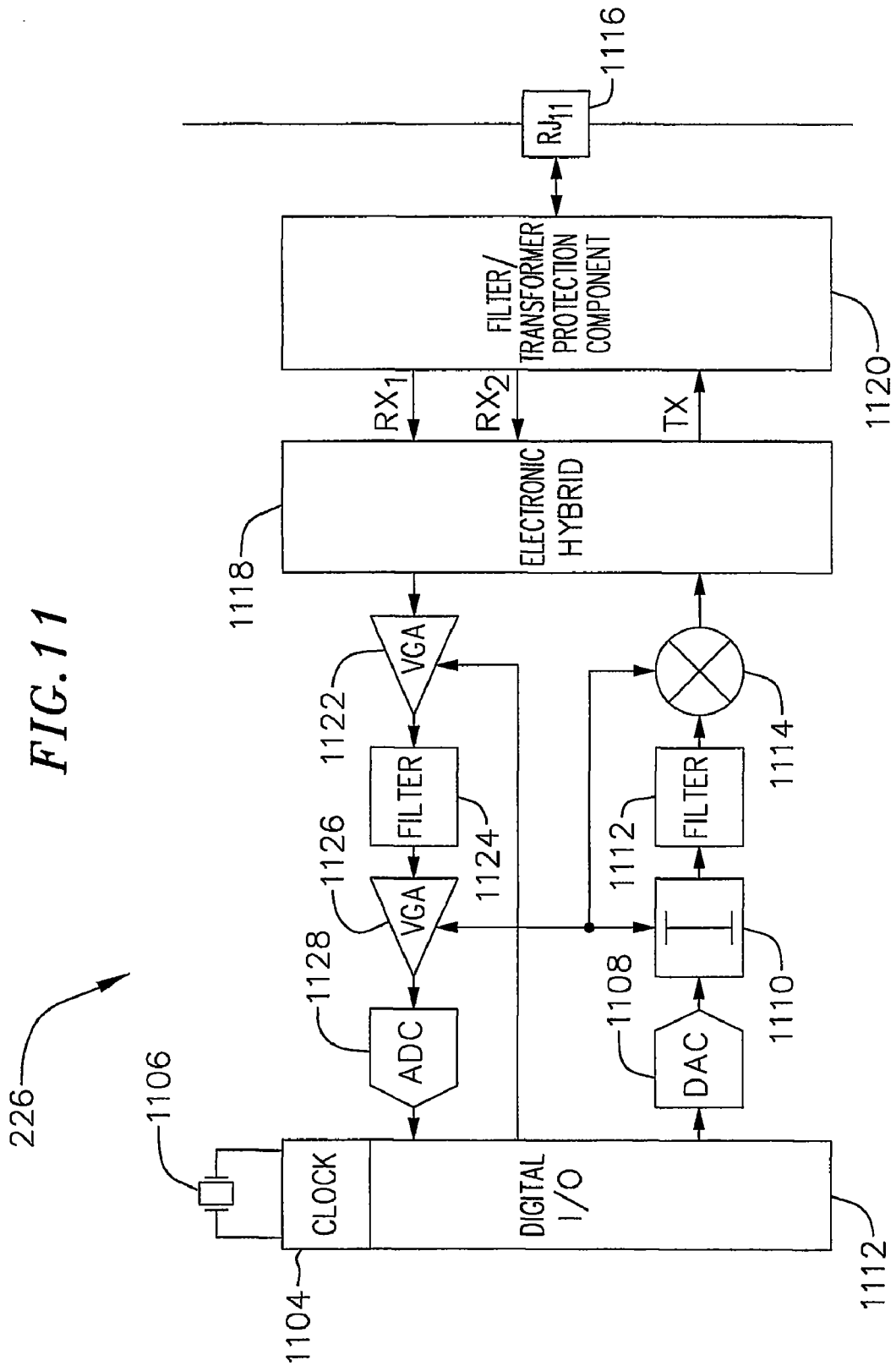
FIG. 11 is a block diagram of an exemplary HomePNA analog front end.

Referring to FIG. 11*a*, the HomePNA AFE 226 (see FIG. 2) couples the HomePNA Controller to the HomePNA LAN. The HomePNA AFE includes a digital input/output (I/O) circuit 1102 for transferring samples to and receiving samples from the HomePNA controller. The digital I/O 1102 includes a clock 1104 for driving the HomePNA controller. In the described exemplary embodiment, the clock is a 64 MHz +/−100 ppm clock generated by 64 MHz crystal 1106.

A transmit path of the HomePNA AFE includes a digital-to-analog converter 1108 for converting digitally sampled data from the HomePNA controller to an analog signal. The transmit path may further include an AGC (Automatic Gain Control) 1110 that adjust the gain of the analog signal in accordance with an input received by the digital I/O circuit 1102. A filter 1112 and transmit-off switch 1114 are coupled to the HomePNA LAN connector 1116, such as a UTP wiring RJ11 connector, through an electronic hybrid 1118 for buffering signals and filter transformer electronic protection circuit 1120.

The receive path includes a the filter transformer electronic protection circuit 1120 and the electronic hybrid 1118 at the input from the HomePNA LAN. The output of the electronic hybrid is amplified by a VGA (Voltage Gain Amplifier) 1122. The output of the VGA 1122 is coupled to a filter 1124 for low-pass anti-aliasing. The filtered output is then amplified by a second VGA 1126, and the amplified signal is applied to an analog-to-digital converter 1128. The analog-to-digital converter samples the analog signal from the HomePNA LAN and transmits the samples to the HomePNA controller through the digital I/O circuit 1102. The gain for the VGA's can be controlled externally though the digital I/O circuit 1102. The operation of the AFE is well known in the art.

An exemplary HomePNA system is disclosed U.S. patent application Ser. No. 09/826,239, entitled "A transceiver Method and Signal Therefor Embodied in a Carrier Wave for a Frame-Based Communication Network," the contents of which has been previously incorporated herein by reference.

2. Network Telephone

Figure 12:
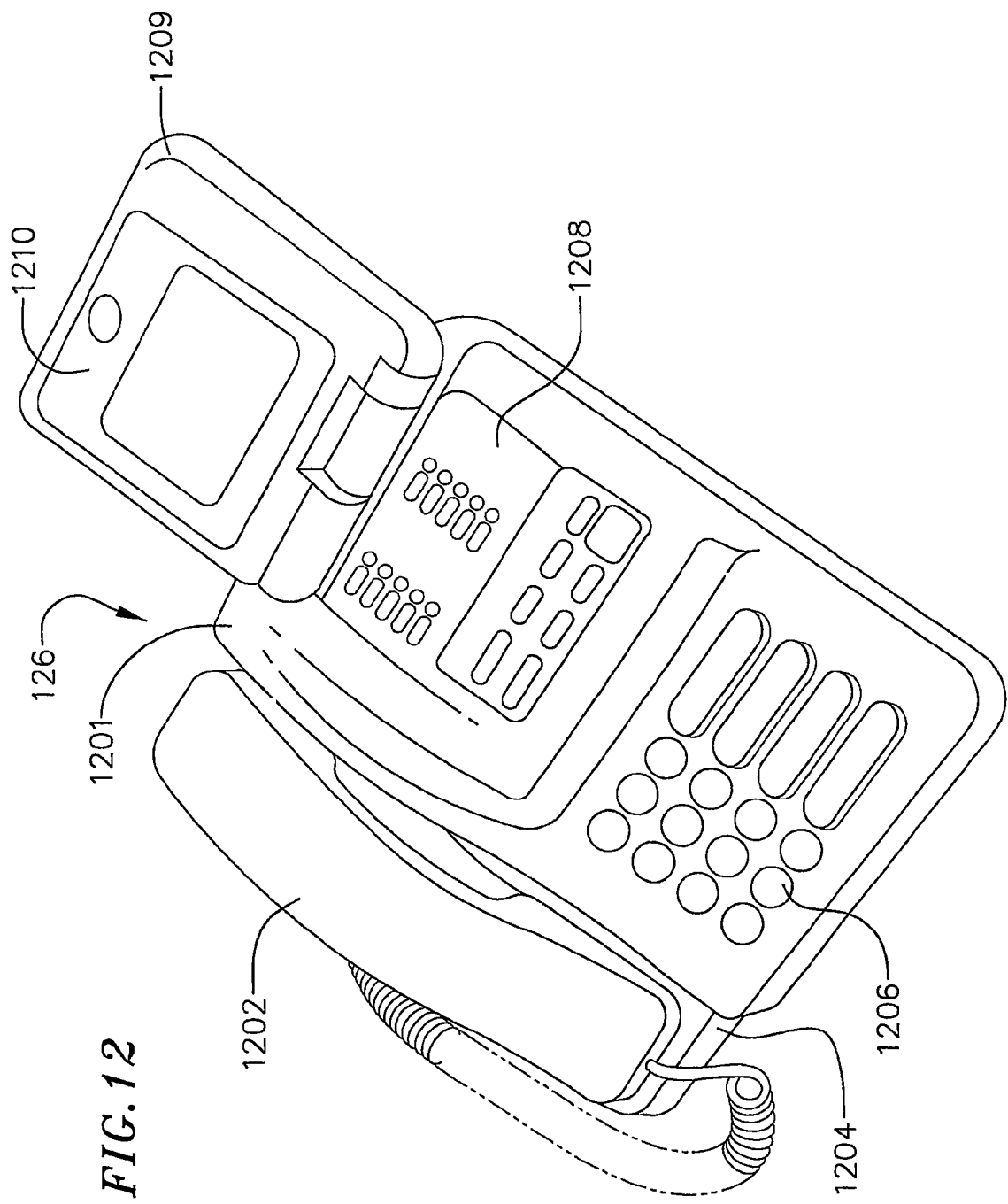
FIG. 12 is a perspective view of an exemplary HomePNA telephone.

FIG. 12 shows an exemplary network telephone such as the HomePNA telephone described in connection with FIG. 1*a*. The network telephone 126 has high density packaging with a light weight construction for home and portable applications. The network telephone 126 is shown with an exterior housing 1201 formed of a suitably sturdy material and includes a dialing device such as a keypad 1206. However, those skilled in the art will appreciate that various other types of dialing devices, e.g., touchpads, voice control, etc., are likewise suitable. A headset 1202 is positioned over an internal speaker 1204. The internal speaker is optionally part of the network telephone. An LCD housing 1209 is hinged to the top of the network telephone 126. The LCD housing 1209 may be may be opened to expose an LCD display 1210 and special function keys 1208.

The keypad 1206 is used to enter user inputs such as telephone numbers and passwords. The special function keys 1208 are used to enter control command inputs, establish communications and to select different modes of operation. The LCD display 1210 can provide the user with various forms of information including the dialed number, as well as any other desired information such as network status, caller identification, etc.

Figure 13:
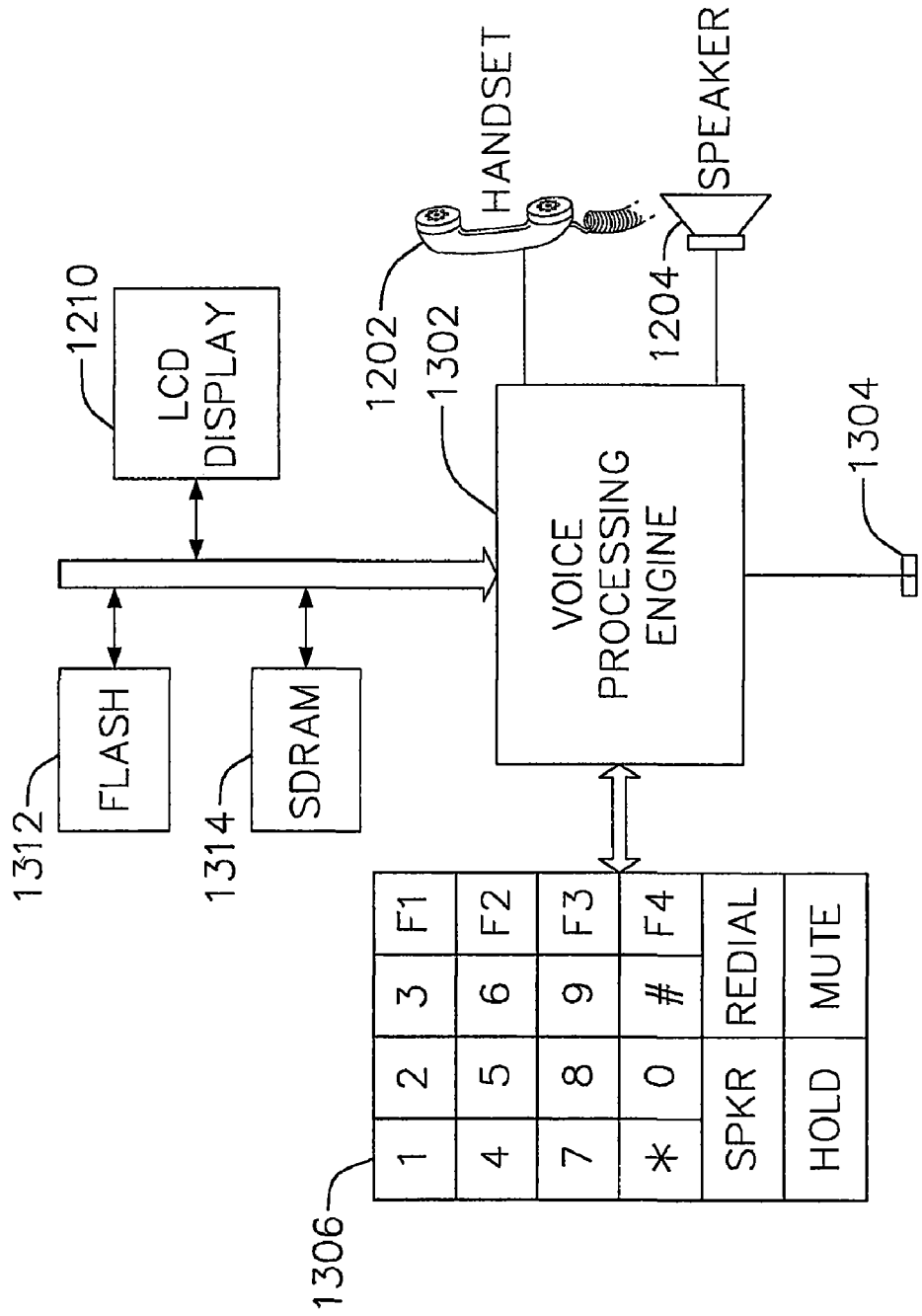
FIG. 13 is a system block diagram of the exemplary HomePNA telephone of FIG. 12.

FIG. 13 is a functional block diagram of the exemplary network telephone described in connection with FIG. 12. The handset 1202 is shown coupled to a voice processing engine 1302. The handset 1202 includes a transmitter (not shown) and a receiver (not shown). The transmitter is used to couple voice from a near end user to the voice processing engine 1302. The voice processing engine 1302 compresses the voice and parses the compressed voice into packets suitable for transport over a packet based network such as the HomePNA LAN described in connection with FIG. 1*a*. Alternatively, the voice processing engine 1302 can be configured with various voice compression algorithms and packetization methodologies to support any number of packet based networks including other LANs such as Ethernet, and WANs such as IP, FR, ATM, Public Digital Cellular Network such as TDMA (IS-13x), CDMA (IS-9x) or GSM for terrestrial wireless applications, or any other packet based system. The packetized compressed voice is outputted to the packet based network via a network port 1304.

The handset receiver includes a speaker (not shown) which allows the near end user to receive voice communications from a far end user. Specifically, the voice communications from the far end user is received by the voice processing engine 1302 in a compressed and packetized format suitable for transport on the packet based network connected to the network port 1304. In the described exemplary embodiment, the packet based network is the HomePNA LAN described in connection with FIG. 1*a*. However, as described above, the voice processing engine 1302 can be implemented with various voice decompression algorithms and packetization formats depending upon the particular network to which the network telephone is connected. The voice processing engine 1302 decodes the voice packets into voice signals, decompresses the voice signals, and transmits the voice signals to the speaker in the handset receiver as analog voice signals.

The keypad 1206 is coupled to the voice processing engine 1302 via a GPIO bus 1306. In the described exemplary embodiment, the keypad 1206 generates DTMF signals in response to a sequence of keys depressed by a user. The DTMF signals are coupled to the voice processing engine 1302 where they are further processed and packetized. The DTMF packets are coupled to the packet based network through the network port 1304.

The voice processing engine 1302 also controls the LCD display 1210 through a serial port interface bus 1308. External memory may also be provided through an external bus interface 1310. In the described exemplary embodiment, the external memory includes FLASH memory 1312 and a SDRAM 1314.

Figure 14:
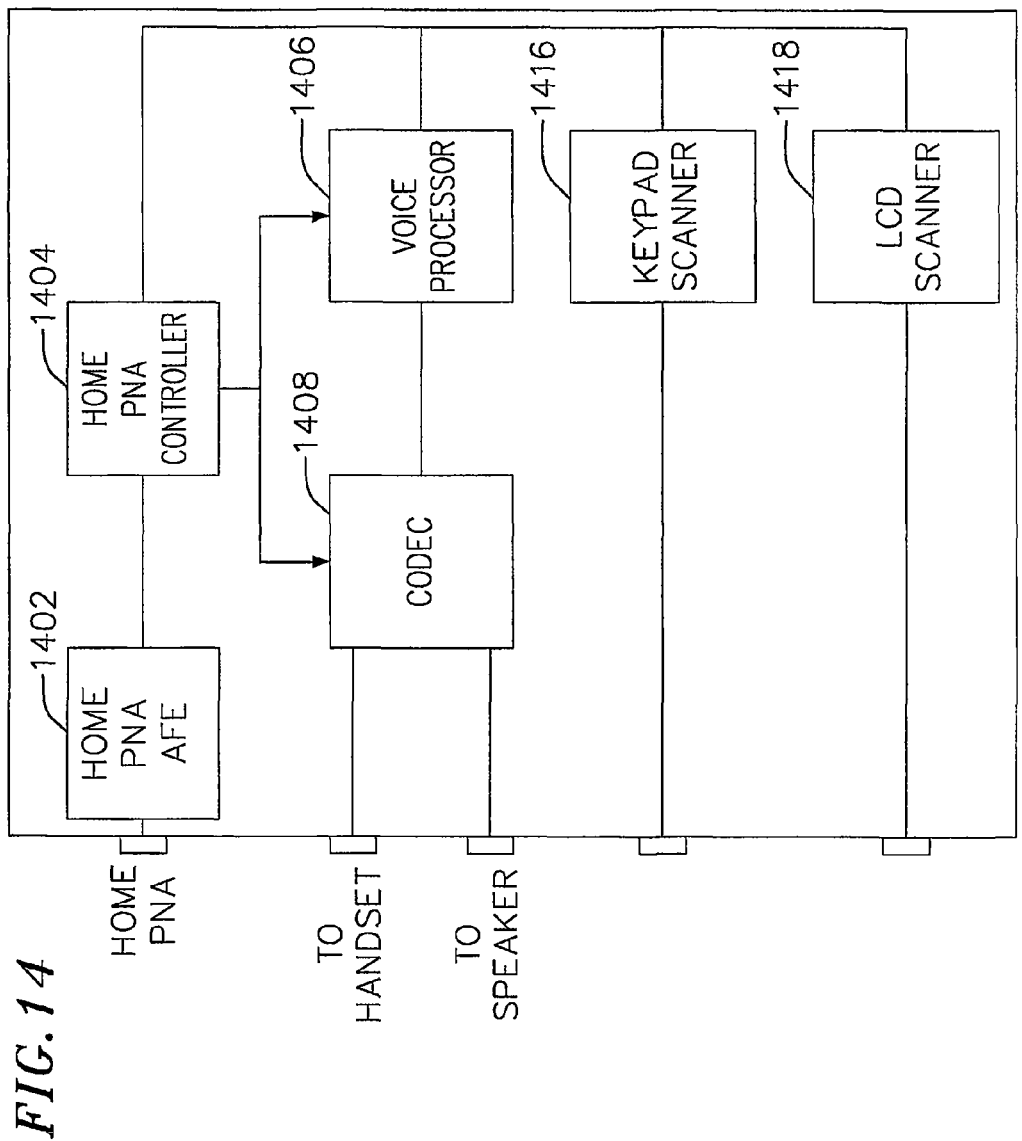
FIG. 14 is a system block diagram of an exemplary voice processing engine for the HomePNA telephone of FIG. 12.

The architecture for an exemplary embodiment of the voice processing engine for use in a HomePNA telephone is shown in FIG. 14. The voice processing engine includes a HomePNA AFE 1402. The HomePNA AFE 1402 is identical to the HomePNA AFE 226 described in connection with the residential gateway (see FIG. 11). The HomePNA AFE 1402 is coupled to a HomePNA controller 1404.

The HomePNA controller 1404 is similar to that described in connection with the HomePNA controller for the residential gateway 138 in that it enables a 4-32 Mbits/sec HomePNA LAN on existing in home telephone wiring. The HomePNA controller 1404 can be a fully integrated MAC/PHY device that provides bi-directional communication with other devices on HomePNA LAN as well as the HomePNA controller in the residential gateway.

Figure 15:
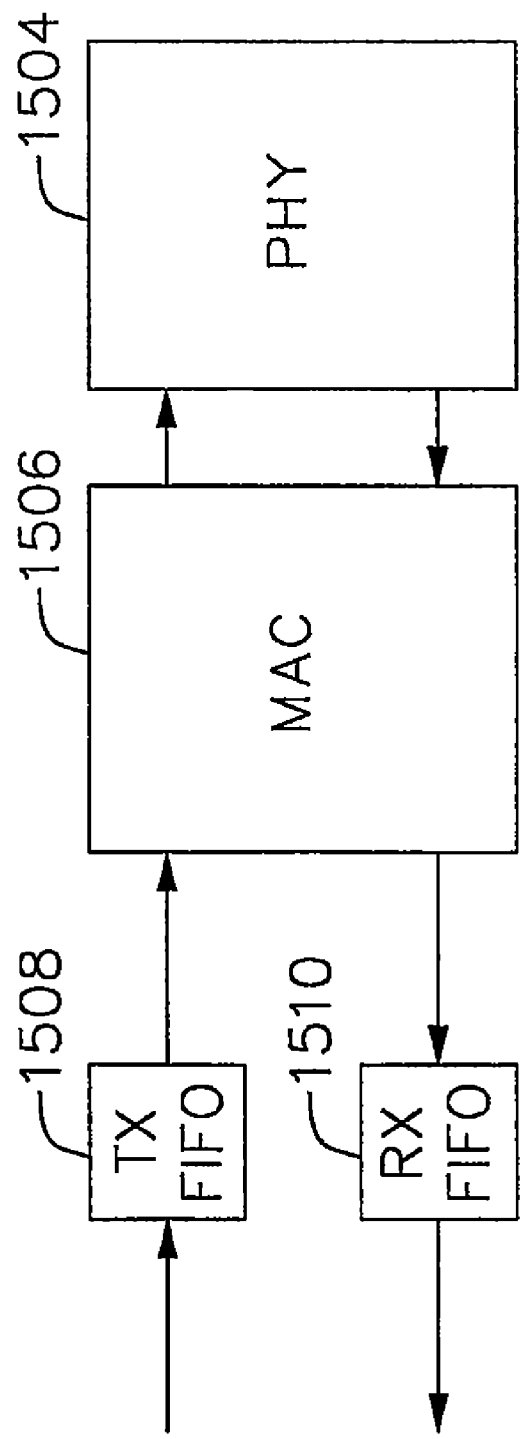
FIG. 15 is a system block diagram of an exemplary HomePNA controller for the HomePNA telephone of FIG. 12.

Referring to FIG. 15, the exemplary HomePNA controller 1404 includes a digital PHY 1504 having a FDQAM/QAM transmitter and receiver interfacing the HomePNA AFE (not shown) with a MAC 1506. The PHY 1504 is implemented with the same modulation techniques employed in the residential gateway. However, as those skilled in the art will appreciate, the PHY 1504 can be implemented with various modulation techniques depending upon the particular application and the overall design constraints. In the described exemplary embodiment, the PHY 1504 is slaved to the residential gateway, and therefore, should employ the same modulation techniques. To this end, the PHY 1504 uses 4 MBaud QAM modulation and 2 MBaud Frequency Diverse QAM (FDQAM), with two to eight bits-per-Baud constellation encoding. The PHY 1504 and similar to the HomePNA controller in the residential gateway. The PHY-layer payload modulation rate therefor ranges from 4 Mb/s to 32 Mb/s. The PHY 1506 utilizes a burst transmission methodology. Each burst or physical layer frame consists of PHY-layer payload information encapsulated with a PHY preamble, header and postamble. The PHY-layer payload in each physical frame is that part of the Ethernet Link Level frame that follows the Ethertype field through the Frame Check Sequence (FCS), plus a CRC-16 and a pad field for the 4 Mbaud rate.

The MAC 1506 may also take on many forms depending on various factors including the system application and overall design constraints. In the described exemplary embodiment, the MAC 1506 is implemented to be compatible with the residential gateway. To this end, the MAC 1506 is modeled after the carrier-sense multiple-access with collision detection (CSMA/CD) MAC function of Ethernet (IEEE Std 802.3, 1998 Edition), adapted to the V2 PHY and enhanced with quality-of-service (QoS) features. The MAC 1506 therefore includes carrier sense logic, collision detection logic, and CSMA/CD collision resolution/rx frame synchronization logic.

In the upstream direction the HomePNA controller 1404 interfaces directly with the HomePNA LAN via the HomePNA AFE. The MAC 1506 encapsulates messages with a data layer header and start of frame (SOF) indicator. The MAC 1506 may also add data trailer and end of frame indicators. The MAC header may include a source address (SA) to identify the node sending the message, and may also include a destination address (DA) to identify the intended recipient or group of recipients. The message with appended headers, trailers and indicators is then passed to the PHY 1504 where it is passed on to the HomePNA LAN. In the downstream direction the reverse process occurs wherein the MAC 1506 receives messages from the PHY 1504 and the MAC 1506 strips off the header and/or trailer information and transmits the data to the voice processor 1406 (see FIG. 14).

The MAC 1506 is coupled to the voice processor through a transmit (TX) FIFO 1508 and a receive (RX) FIFO 1510. A transmit state machine initiates transmission of the HomePNA packets to the MAC/PHY when a FIFO watermark is reached or an end of packet is received.

Turning back to FIG. 14, the HomePNA controller 1404 interfaces with the voice processor 1506 over a data bus 1508. The voice processor 1506 performs a translation function between VoHN packets and PCM voice samples. The synchronization of the VoHN packets and the PCM voice samples is performed by the HomePNA controller. The specific translation is direction dependent. Packets arriving from the HomePNA controller are translated to PCM voice samples and delivered to a CODEC 1408. PCM voice samples arriving from the CODEC 1408 are translated to a VoHN format and delivered to the HomePNA controller. The HomePNA controller 1404 is used to synchronize the CODEC sampling rate.

An exemplary voice processor can be implemented in a variety of fashions including, by way of example, the programmable DSP software architecture described above in connection with FIG. 5. The exemplary software architecture described above can be integrated into numerous telecommunications products and support multiple voice channels. In the context of an HomePNA telephone, only a single NetVHD is needed. The NetVHD encodes and packetizes DTMF tones from the keypad and voice from the handset and transmits the packets to the applications layer. In addition, the NetVHD disassembles DTMF tones and voice from the the applications layer, decodes the packets into signals, and transmits the signals to the CODEC 1408.

An exemplary embodiment of the NetVHD in the described software architecture operating in the HomePNA telephone includes only a voice mode. However, those skilled in the art will appreciate that all four operational modes can implemented for expansion capability to other functions. By way of example, a fax machine could be plugged directly into the HomePNA phone and supported by the NetVHD operating in either the voiceband mode or the fax relay mode. As described above, the voice mode is implemented with a number of services provided by a packet voice exchange and a packet tone exchange. The packet voice exchange may employ numerous voice compression algorithms, including, among others, Linear 128 kbps, G.711 u-law/A-law 64 kbps (ITU Recommendation G.711 (1988)—Pulse code modulation (PCM) of voice frequencies), G.726 16/24/32/40 kbps (ITU Recommendation G.726 (12/90)—40, 32, 24, 16 kbit/s Adaptive Differential Pulse Code Modulation (ADPCM)), G.729A 8 kbps (Annex A (11/96) to ITU Recommendation G.729—Coding of speech at 8 kbit/s using conjugate structure algebraic-code-excited linear-prediction (CS-ACELP)—Annex A: Reduced complexity 8 kbit/s CS-ACELP speech CODEC), and G.723 5.3/6.3 kbps (ITU Recommendation G.723.1 (03/96) Dual rate coder for multimedia communications transmitting at 5.3 and 6.3 kbit/s).

In operation, the applications layer opens the NetVHD and connects it to the PXD. In the described exemplary embodiment only one PXD is needed to support the HomePNA telephone. However, those skilled in the art will appreciate that the DSP software architecture can be implemented with numerous PXD's to support expansion capability. The applications layer configures various operational parameters of the NetVHD, including, among others, default voice compression (Linear, G.711, G.726, G.723.1, G.723.1A, G.729A, G.729B). The applications layer then loads an appropriate signaling service (not shown) into the NetVHD, configures it and sets the NetVHD to the On-hook state.

In response to events from the signaling service (not shown) via the handset and keypad, or HomePNA packets from the HomePNA LAN, the applications layer will set the NetVHD to the off-hook state. In an exemplary embodiment, if the signaling service event is triggered by the handset, the packet tone exchange will generate dial tone. Once a DTMF tone is detected, the dial tone is terminated. The DTMF tones are packetized and forwarded to the applications layer for transmission on the HomePNA LAN. The packet tone exchange could also play ringing tone back to the handset (when a far end telephony device is being rung), and a busy tone if the far end telephony device is unavailable. Other tones may also be supported to indicate all circuits are busy, or an invalid sequence of DTMF digits were entered on the keypad. Once a connection is made between the HomePNA telephone and far end telephony devices, the packet tone exchange is terminated in favor of the packet voice exchange.

The PXD for the voice mode provides echo cancellation, gain, and automatic gain control. The network VHD invokes numerous services packet voice exchange and packet tone exchange. The network VHD services operate together to provide: (1) an encoder system with DTMF detection, call progress tone detection, voice activity detection, voice compression, and comfort noise estimation, and (2) a decoder system with delay compensation, voice decoding, DTMF generation, comfort noise generation and lost frame recovery. The services invoked by the network VHD and the associated PXD is the same as that described above in connection with FIG. 7.

The exemplary voice processor is implemented in the HomePNA telephone to minimize end-to-end delay and jitter. One of skill in the art will appreciate that the partition of functionality of the voice processor between the residential gateway and the HomePNA telephone may vary. By way of example, the voice processor could be housed partially or entirely in the residential gateway. Alternatively, the voice and data processor 213 (see FIG. 2) could be used to support voice compression and decompression for communications over the HomePNA LAN in addition to supporting the conventional POTS telephone 108 connected directly to the residential gateway as shown in FIG. 1*a*. The partitioning of functionality will depend on various factors including the specific application, the overall design constraints and other relevant factors.

The voice processor 1406 is coupled to the CODEC 1408. The CODEC 1408 includes an analog-to-digital converter (ADC) for digitizing voice from the handset and a digital-to-analog converter (DAC) for reconstructing voice prior to delivery to the handset. The CODEC may also include a bandlimiting filter for the ADC and a reconstruction smoothing filter for the output of the DAC. The sampling rate of the ADC and DAC is controlled by the HomePNA controller 1404.

A keypad scanner 1416 provides an interface between the keypad and the voice processing engine. The LCD interface 1418 provides an interface between LCD display and the voice processing engine.

3. HomePNA Adapter

The HomePNA adapter is a device that allows a conventional POTS telephone, or other conventional telephony device, to communicate with the residential gateway on the HomePNA LAN. The HomePNA adapter can be physically housed in a variety of structures and physically located in accordance with the specific application. In the exemplary embodiment described in connection with FIG. 1*a*, two HomePNA adapters are shown, one to support a conventional POTS telephone 120 and another to support a conventional fax machine 124. In this embodiment, the HomePNA adapters can be a wall dongle with a male RJ-11 plug for connecting directly into the telephone wall jack in the home. An RJ-11 female plug may also be provided for connection to the POTS telephone or fax machine by a conventional telephone wire. Alternatively, the HomePNA adapter can be a device dongle with the male RJ-11 plug connected directly to the POTS telephone or fax machine and the female RJ-11 plug supporting a telephone wire connection between the particular device and the wall jack.

Figure 16:
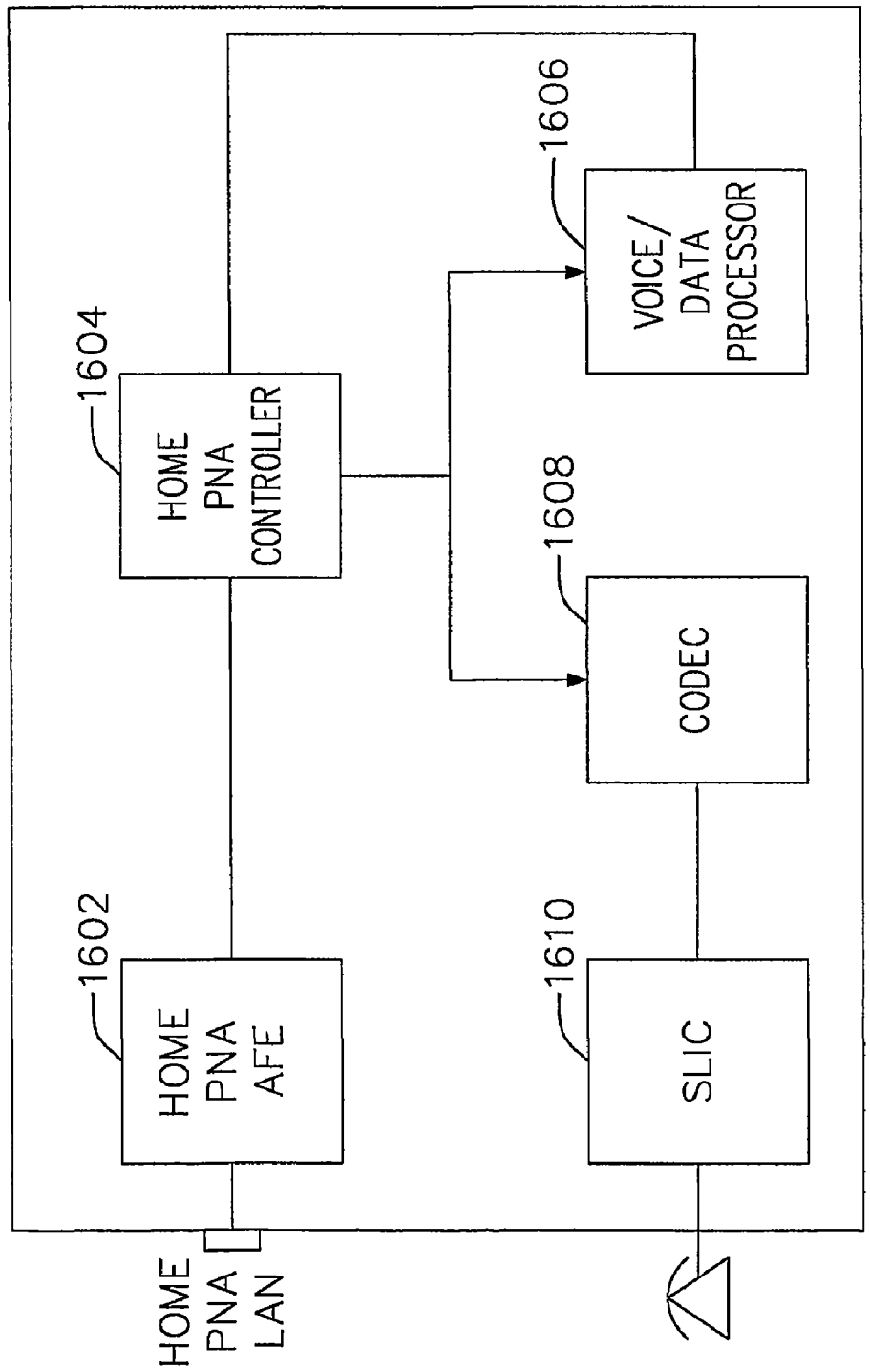
FIG. 16 is a system block diagram of an exemplary voice processing engine for a HomePNA adapter.

The HomePNA adapter is similar to the voice processing engine described in connection with FIG. 14 above in that it provides two-way translations between translates VoHN packets and PCM voice signals. The architecture for an exemplary embodiment of the voice processing engine for use in a HomePNA adapter is shown in FIG. 16.

The voice processing engine includes a HomePNA AFE 1602 and a HomePNA controller 1604 to interface the HomePNA adapter to the HomePNA LAN. The HomePNA AFE 1602 is identical to that described in connection with the residential gateway as set forth in FIG. 11. Likewise, the HomePNA controller 1404 is similar to that described in connection with the HomePNA telephone and the residential gateway in that it enables a 4-32 Mbits/sec HomePNA LAN on existing in home telephone wiring. The HomePNA controller 1404 can be a fully integrated MAC/PHY device that provides bidirectional communication with other devices on HomePNA LAN as well as the HomePNA controller in the residential gateway. The specific details of the HomePNA controller 1604 is discussed with reference to the HomePNA telephone in connection with FIG. 15 above.

The HomePNA controller 1604 interfaces with a voice processor 1606 over a data bus 1608. The voice processor 1606 performs a translation function between VoHN packets and PCM voice samples. The HomePNA controller 1604 synchronizes the translation between the VoHN packets and the PCM voice samples. The specific translation is direction dependent. Packets arriving from the HomePNA controller 1604 are translated to PCM voice samples and delivered to a CODEC 1608. PCM voice samples arriving from the CODEC 1608 are translated to a VoHN format and delivered to the HomePNA controller 1604. A packet synchronizer 1610 is used to synchronize the PCM voice samples with VoHN packets under control of the HomePNA controller 1604.

An exemplary voice processor can be implemented in a variety of fashions including, by way of example, the programmable DSP software architecture described above in connection with FIG. 5. The exemplary software architecture described above can be integrated into numerous telecommunications products and support multiple voice, fax and modem channels. More particularly, the exemplary software architecture described above can utilize NetVHDs for transparently managing voice, fax, and modem data across a variety of packet based networks, including by way of example, the HomePNA LAN described in connection with FIG. 1*a* above. The NetVHD encodes and packetizes DTMF, voice, fax, and modem data received from its respective telephony device. and transmits the packets to the applications layer. In addition, the NetVHD disassembles DTMF, voice, fax, and modem data from the applications layer, decodes the packets into signals, and transmits the signals to its respective telephony device. Although a single telephony device is shown connected to the HomePNA adapter in FIG. 1*a*, those skilled in the art will appreciate that the HomePNA device can be configured to support multiple channels of voice, fax and modem from one or more telephony devices. In these configurations, multiple NetVHDs, PXDs and services may be utilized in a manner described above in connection with the voice and data processor in the residential gateway. To this end, the exemplary NetVHD includes four operational modes, namely voice mode, voiceband data mode 604, fax relay mode 606, and data relay mode 608. In each operational mode, the resource manager invokes various services. For example, in the voice mode 602, the resource manager invokes call discrimination 610, packet voice exchange 612, and packet tone exchange 614. The packet voice exchange 612 may employ numerous voice compression algorithms, including, among others, Linear 128 kbps, G.711 u-law/A-law 64 kbps (ITU Recommendation G.711 (1988)—Pulse code modulation (PCM) of voice frequencies), G.726 16/24/32/40 kbps (ITU Recommendation G.726 (12/90)—40, 32, 24, 16 kbit/s Adaptive Differential Pulse Code Modulation (ADPCM)), G.729A 8 kbps (Annex A (11/96) to ITU Recommendation G.729 Coding of speech at 8 kbit/s using conjugate structure algebraic-code-excited linear-prediction (CS-ACELP)—Annex A: Reduced complexity 8 kbit/s CS-ACELP speech CODEC), and G.723 5.3/6.3 kbps (ITU Recommendation G.723.1 (03/96)—Dual rate coder for multimedia communications transmitting at 5.3 and 6.3 kbit/s).

In the fax relay mode, the resource manager invokes a packet fax data exchange service. The packet fax exchange may employ various data pumps including, among others, V.17 which can operate up to 14,400 bits per second, V.29 which uses a 1700-Hz carrier that is varied in both phase and amplitude, resulting in 16 combinations of 8 phases and 4 amplitudes which can operate up to 9600 bits per second, and V.27ter which can operate up to 4800 bits per second.

Likewise, the resource manager invokes a packet modem data exchange service in the data relay mode. The packet modem data exchange may employ various data pumps including, among others, V.22bis/V.22 with data rates up to 2400 bits per second, V.32bis/V.32 which enables full-duplex transmission at 14,400 bits per second, and V.34 which operates up to 33,600 bits per second.

In operation, the applications layer opens the NetVHD and connects it to the appropriate PXD. The applications layer may then may configure various operational parameters of the NetVHD, including, among others, default voice compression (Linear, G.711, G.726, G.723.1, G.723.1A, G.729A, G.729B), fax data pump (Binary, V.17, V.29, V.27ter), and modem data pump (Binary, V.22bis, V.32bis, V.34). The applications layer then loads an appropriate signaling service (not shown) into the NetVHD, configures it and sets the NetVHD to the On-hook state.

In response to events from the signaling service (not shown) via the telephony device connected to the HomePNA adapter, or signal packets from the far end, the applications layer will set the NetVHD to the appropriate off-hook state, typically voice mode. In an exemplary embodiment, if the signaling service event is triggered by the connected telephony device, the packet tone exchange will generate dial tone. Once a DTMF tone is detected, the dial tone is terminated. The DTMF tones are packetized and forwarded to the applications layer for transmission on the HomePNA LAN via the HomePNA controller. The packet tone exchange could also play ringing tone back to the connected telephony device (when a far end telephony device is being rung), and a busy tone if the far end telephony device is unavailable. Other tones may also be supported to indicate all circuits are busy, or an invalid sequence of DTMF digits were entered on the connected telephony device.

Once a connection is made between the connected telephony device and far end telephony devices, the call discriminator is responsible for differentiating between a voice and machine call by detecting the presence of a 2100 Hz. tone (as in the case when the telephony device is a fax or a modem), a 1100 Hz. tone or V.21 modulated high level data link control (HDLC) flags (as in the case when the telephony device is a fax). If a 1100 Hz. tone, or V.21 modulated HDLC flags are detected, a calling fax machine is recognized. The NetVHD then terminates the voice mode and invokes the packet fax exchange to process the call. If however, 2100 Hz tone is detected, the NetVHD terminates voice mode and invokes the packet data exchange.

The packet data exchange service further differentiates between a fax and modem by continuing to monitor the incoming signal for V.21 modulated HDLC flags, which if present, indicate that a fax connection is in progress. If HDLC flags are detected, the NetVHD terminates packet data exchange service and initiates packet fax exchange service. Otherwise, the packet data exchange service remains operative. In the absence of an 1100 or 2100 Hz. tone, or V.21 modulated HDLC flags the voice mode remains operative.

Voice mode provides signal processing of voice signals. The PXDs for the voice mode provide echo cancellation, gain, and automatic gain control. The network VHD invokes numerous services in the voice mode including call discrimination, packet voice exchange, and packet tone exchange. These network VHD services operate together to provide: (1) an encoder system with DTMF detection, call progress tone detection, voice activity detection, voice compression, and comfort noise estimation, and (2) a decoder system with delay compensation, voice decoding, DTMF generation, comfort noise generation and lost frame recovery.

In the fax relay mode, the network VHD invokes the packet fax data exchange. The packet fax data exchange provides demodulation and re-modulation of fax data signals. This approach results in considerable bandwidth savings since only the underlying unmodulated data signals are transmitted across the packet based network. The packet fax data exchange also provides compensation for network jitter with a jitter buffer similar to that invoked in the packet voice exchange. Additionally, the packet fax data exchange compensates for lost data packets with error correction processing. Spoofing may also be provided during various stages of the procedure between the fax machines to keep the connection alive.

In the data relay mode, the packet data modem exchange provides demodulation and modulation of data signals. With full duplex capability, both modulation and demodulation of data signals can be performed simultaneously. The packet data modem exchange also provides compensation for network jitter with a jitter buffer similar to that invoked in the packet voice exchange. Additionally, the packet data modem exchange compensates for system clock jitter between modems with a dynamic phase adjustment and resampling mechanism. Spoofing may also be provided during various stages of the call negotiation procedure between the modems to keep the connection alive.

The details of the voice processor 1606 are described above in connection with residential gateway.

The voice processor 1606 is coupled to the CODEC 1608. The CODEC 1608 includes an analog-to-digital converter (ADC) for digitizing voice from the handset and a digital-to-analog converter (DAC) for reconstructing voice prior to delivery to the handset. The CODEC may also include a bandlimiting filter for the ADC and a reconstruction smoothing filter for the output of the DAC. The sampling rate of the DAC and ADC is controlled by the HomePNA controller 1604 in a manner to be described in greater detail below.

The CODEC 1608 is coupled to a SLIC 1610. The SLIC 1610 is used to deliver POTS (Plain Old Telephone Service) to a conventional telephony device, such as the POTS telephone 120 of FIG. 1a. The SLIC performs a voltage level conversion delivering the voltage levels required by the POTS telephone. An exemplary voice signal processor is disclosed U.S. patent application Ser. No. 09/579,932, entitled "SLIC Architecture and Interfaces," the contents of which have been incorporated previously by reference.

Those of skill in the art would understand that the various illustrative logical blocks, modules, circuits, and algorithm steps described in connection with the embodiments disclosed herein may be implemented in any number of way including electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

Although exemplary embodiments of the present invention has been described, it should not be construed to limit the scope of the appended claims. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A communications gateway, configured to receive a packet payload, the packet payload being formatted according to a first communications protocol, comprising:
   a Media Access Controller/Physical Layer Interface (MAC/PHY) configured to determine whether the packet payload is one of a voice packet or a data packet and to translate the packet payload from the first communications protocol to a second communications protocol;
   a proxy gateway configured to determine whether the packet payload is to be formatted according to a third communications protocol or a fourth communications protocol when the packet payload is the voice packet;
   a controller configured to translate the packet payload from the second communications protocol to the third communications protocol when the packet payload is the voice packet that is to be formatted according to the third communications protocol or is the data packet; and
   a processor configured to translate the packet payload from the second communications protocol to the fourth communications protocol when the packet payload is the voice packet that is to be formatted according to the fourth communications protocol.

2. The gateway of claim 1, wherein the first communications protocol is a Data Over Cable Service Interface Specification (DOCSIS) communications protocol.

3. The gateway of claim 1, wherein the third communications protocol is a Home Phoneline Network Alliance (HomePNA) communications protocol.

4. The gateway of claim 1, wherein the fourth communications protocol is a baseband protocol capable of delivering Plain Old Telephone Service (POTS) to one or more analog telephones.

5. The gateway of claim 1, wherein the proxy gateway is configured to determine the packet payload is to be formatted according to the third communications protocol when a first device that is configured to communicate using the third communications protocol goes off hook and the packet payload is to be formatted according to the fourth communications protocol when a second device that is configured to communicate using the fourth communications protocol goes off hook.

6. The gateway of claim 1, wherein the proxy gateway is configured to determine whether the packet payload is to be formatted according to the third communications protocol or the fourth communications protocol based upon a destination address within the packet payload.

7. The gateway of claim 1, wherein the second communications protocol is an internal communications protocol, the internal communications protocol being independent of the first communications protocol, the third communications protocol, and the fourth communications protocol.

8. The gateway of claim 1, wherein the processor is further configured to decompress and depacketize the packet payload and to format the packet payload according to the fourth communications protocol to translate the packet payload from the second communications protocol to the fourth communications protocol.

9. The gateway of claim 1, wherein the controller is further configured to format the packet payload according to the third communications protocol to translate the packet payload from the second communications protocol to the third communications protocol.

10. The gateway of claim 1, wherein the proxy gateway comprises:
   a voice and data processor configured to determine whether the packet payload is to be formatted according to the third communications protocol or the fourth communications protocol.

11. A method for translating a packet payload, comprising:
   (a) determining whether the packet payload is one of a voice packet or a data packet;
   (b) translating the packet payload from a first communications protocol to a second communications protocol;
   (c) determining whether the packet payload is to be formatted according to a third communications protocol or a fourth communications protocol when the packet payload is the voice packet;
   (d) translating the packet payload from the second communications protocol to the third communications protocol when the packet payload is the voice packet that is to be formatted according to the third communications protocol or is the data packet; and
   (e) decompressing and depacketizing the packet payload then translating the packet payload from the second communications protocol to the fourth communications protocol when the packet payload is the voice packet that is to be formatted according to the fourth communications protocol.

12. The method of claim 11, wherein step (b) comprises:
   (b)(i) translating the packet payload from a Data Over Cable Service Interface Specification (DOCSIS) communications protocol to the second communications protocol.

13. The method of claim 11, wherein step (d) comprises:
   (d)(i) translating the packet payload from the second communications protocol to a Home Phoneline Network Alliance (HomePNA) communications protocol.

14. The method of claim 11, wherein step (e) comprises:
   (e)(i) translating the packet payload from the second communications protocol to a baseband protocol capable of delivering Plain Old Telephone Service (POTS) to one or more analog telephones.

15. A method for translating a packet payload, comprising:
   (a) determining whether the packet payload is one of a voice packet or a data packet;
   (b) translating the packet payload from a first communications protocol to a second communications protocol;
   (c) determining the packet payload is to be formatted according to a third communications protocol when a first device that is configured to communicate using the third communications protocol goes off hook and the packet payload is to be formatted according to a fourth communications protocol when a second device that is configured to communicate using the fourth communications protocol goes off hook;
   (d) translating the packet payload from the second communications protocol to the third communications protocol when the packet payload is the voice packet that is to be formatted according to the third communications protocol or is the data packet; and
   (e) translating the packet payload from the second communications protocol to the fourth communications protocol when the packet payload is the voice packet that is to be formatted according to the fourth communications protocol.

16. The method of claim 11, wherein step (b) comprises:
   (b)(i) translating the packet payload from the first communications protocol to an internal communications protocol, the internal communications protocol being independent of the first communications protocol, the third communications protocol, and the fourth communications protocol.

17. The method of claim 11, wherein step (c) comprises:
   (c)(i) determining whether the packet payload is to be formatted according to a third communications protocol or a fourth communications protocol when the packet payload is the voice packet based upon a destination address.

18. The method of claim 11, wherein step (d) comprises:
   (d)(i) formatting the packet payload according to the third communications protocol to translate the packet payload from the second communications protocol to the third communications protocol.

* * * * *